US012694572B2

(12) United States Patent
Guleryuz et al.

(10) Patent No.: US 12,694,572 B2
(45) Date of Patent: Jul. 28, 2026

(54) NONLINEAR PERI-CODEC OPTIMIZATION FOR IMAGE AND VIDEO CODING

(71) Applicant: Google LLC, Mountain View, CA (US)

(72) Inventors: Onur G. Guleryuz, San Francisco, CA (US); Ruofei Du, San Francisco, CA (US); Hugues H. Hoppe, Mercer Island, WA (US); Sean Ryan Francesco Fanello, San Francisco, CA (US); Philip Andrew Chou, Bellevue, WA (US); Danhang Tang, Los Angeles, CA (US); Philip Davidson, Arlington, MA (US)

(73) Assignee: GOOGLE LLC, Mountain View, CA (US)

( * ) Notice: Subject to any disclaimer, the term of this patent is extended or adjusted under 35 U.S.C. 154(b) by 285 days.

(21) Appl. No.: 18/570,562

(22) PCT Filed: Jun. 16, 2021

(86) PCT No.: PCT/US2021/037593
§ 371 (c)(1),
(2) Date: Dec. 14, 2023

(87) PCT Pub. No.: WO2022/265627
PCT Pub. Date: Dec. 22, 2022

(65) Prior Publication Data
US 2025/0045968 A1 Feb. 6, 2025

(51) Int. Cl.
*G06T 9/00* (2006.01)
*G06V 10/82* (2022.01)

(52) U.S. Cl.
CPC ............... *G06T 9/00* (2013.01); *G06V 10/82* (2022.01)

(58) Field of Classification Search
CPC .. G06V 10/82; G06T 1/20; G06T 3/04; G06T 3/06; G06T 3/14; G06T 3/40; G06T 3/60;
(Continued)

(56) References Cited

U.S. PATENT DOCUMENTS

| | | | | |
|---|---|---|---|---|
| 10,237,562 B2 * | 3/2019 | Lim | ..................... | H04N 19/176 |
| 2017/0230675 A1 * | 8/2017 | Wierstra | ................. | G06T 9/002 |

(Continued)

FOREIGN PATENT DOCUMENTS

| | | | | |
|---|---|---|---|---|
| CA | 3143885 A1 * | 12/2020 | ........... | H04N 19/105 |
| CN | 109922340 B * | 10/2021 | ........... | H04N 19/122 |

(Continued)

OTHER PUBLICATIONS

Hao-Yang Li et al.,"Intelligent Electromagnetic Sensing with Learnable Data Acquisition and Processing," Apr. 10, 2020, Patterns, ACell Press journal, Voluem 1, Issue 1, pp. 1-6.*
(Continued)

*Primary Examiner* — Omar S Ismail
(74) *Attorney, Agent, or Firm* — Young Basile Hanlon & MacFarlane. P.C.

(57) ABSTRACT

Nonlinear peri-codec optimization for image and video coding includes obtaining a source image including pixel values expressed in a first defined image sample space, generating a neuralized image representing the source image, the neuralized image including pixel values that are expressed as neural latent space values, encoding the input image wherein the neural latent space values are used as pixel values in a second defined image sample space and the input image is in an operative image format of the encoder, such that a decoder decodes the encoded image to obtain a reconstructed image in the second defined image sample space, wherein the reconstructed image is a reconstructed neuralized image including reconstructed neural latent space (Continued)

values, such that a deneuralized reconstructed image corresponding to the source image is obtained by a nonlinear post-codec image processor in the first defined image sample space.

20 Claims, 18 Drawing Sheets

(58) Field of Classification Search
CPC .... G06T 5/20; G06T 5/73; G06T 5/90; G06T 7/10; G06T 7/20; G06T 7/30; G06T 7/40; G06T 7/50; G06T 7/60; G06T 7/70; G06T 9/20; G06T 9/40; G06T 13/20; G06T 13/80; G06T 15/10; G06T 15/50; G06T 19/20
See application file for complete search history.

(56) References Cited

U.S. PATENT DOCUMENTS

| | | | | |
|---|---|---|---|---|
| 2019/0116359 A1* | 4/2019 | Dong | .................... | H04N 19/14 |
| 2021/0021866 A1* | 1/2021 | Djokovic | .............. | H04N 19/59 |
| 2021/0044811 A1* | 2/2021 | Hodgkinson | .......... | G06N 3/088 |
| 2022/0103839 A1* | 3/2022 | Van Rozendaal | .... | H04N 19/184 |
| 2022/0385907 A1* | 12/2022 | Zhang | ................. | H04N 19/172 |
| 2023/0062752 A1* | 3/2023 | Lainema | ................ | G06N 3/045 |

FOREIGN PATENT DOCUMENTS

| | | | | | | |
|---|---|---|---|---|---|---|
| EP | 3633990 A1 | * | 4/2020 | | ........... | H04N 19/109 |
| KR | 20100138735 A | * | 12/2010 | | ........... | H04N 19/159 |
| KR | 20220159454 A | * | 12/2022 | | ........... | H04N 19/154 |

OTHER PUBLICATIONS

Hao-Yang Li et al.,"ntelligent Electromagnetic Sensing with Learnable Data Acquisition and Processing," Apr. 10, 2020, Patterns, ACell Press journal, vol. 1, Issue 1, pp. 1-6.*
Simeng Sun et al., "Semantic Structured Image Coding Framework for Multiple Intelligent Applications, "Dec. 4, 2020, IEEE Transactions On Circuits and Systems for Video Technology, vol. 31, No. 9, Sep. 2021, pp. 3631-3641.*
Hilmi E. Egilmez et al., "Transform Network Architectures for Deep Learning Based End-to-End Image/Video Coding in Subsampled Color Spaces," Jun. 24, 2021, IEEE Open Journal of Signal Processing, vol. 2, 2021, pp. 441-447.*
Hao-Yang Li et al.,"Intelligent Electromagnetic Sensing with Learnable Data Acquisition and Processing," Apr. 10, 2020, Patterns, ACell Press journal, vol. 1, Issue 1, pp. 1-6.*
Siwei Ma et al.,"Image and Video Compression With Neural Networks: A Review," Apr. 17, 2019, IEEE Transactions On Circuits and Systems for Video Technology, vol. 30, No. 6, Jun. 2020, pp. 1683-1694.*

Alex Golts et al., "Image compression optimized for 3D reconstruction by utilizing deep neural networks," Jul. 2, 2021, J. Vis. Commun. Image R. 79 (2021), pp. 1-9.*
Haojie Liu, "End-to-End Neural Video Coding Using a Compound Spatiotemporal Representation," Feb. 8, 2022, IEEE Transactions On Circuits and Systems for Video Technology, vol. 32, No. 8, Aug. 2022, pp. 5650-5657.*
Jiawei Shao et al., "BottleNet++: An End-to-End Approach for Feature Compression in Device-Edge Co-Inference Systems," Jul. 21, 2020, 2020 IEEE International Conference on Communications Workshops (ICC Workshops), pp. 1-4.*
Tianyu He et al., "Beyond Coding: Detection-driven Imagem Compression with Semantically Structured Bit-stream," Jan. 9, 2020, 2019 Picture Coding Symposium (PCS), pp. 1-4.*
Linwei Zhu et al., "Convolutional Neural Network-Based Synthesized View Quality Enhancement for 3D Video Coding, " Jul. 20, 2018, IEEE Transactions On Image Processing, vol. 27, No. 11, Nov. 2018, pp. 5366-5372.*
International Search Report and Written Opinion of International Application No. PCT/US2021/037593 dated Mar. 17, 2022, 20 pgs.
Zhuo Chen et al, "VCM CNN Feature Map Coding for Cloud-based Visual Analysis", Motion Picture Expert Group or ISO/IEC JTEC/ SC29/WG11; No. m52162; Jan. 7, 2020, 8 pgs.
Johannes Ballé et al, "Variational Image Compression with a Scale Hyperprior", arxiv.org, Cornell University Library, Feb. 1, 2018, 23 pgs.
Xia Menghan et al, "Invertible Grayscale"; ACM Transactions on Graphics, vol. 37, No. 6; Dec. 4, 2018, pp. 1-10.
Blanch Marc Gorriz et al, "Chroma Intra Prediction With Attention-Based CNN Architectures", 2020 IEEE International Conference on Image Processing (ICIP), IEEE, Oct. 25, 2020, pp. 783-787.
Hilmi E Egilmez et al, "Transform Network Architectures for Deep Learning based End-to-End Image/Video Coding in Subsampled Color Spaces", arxiv.org, Cornell University Library (Ithaca, NY), Feb. 27, 2021, pp. 1-10.
Johannes Ballé et al, "End-to-end Optimized Image Compression", Apr. 24, 2017, Retrieved from the Internet : URL :https://www. researchgate.net/profile/Johannes_Balle2/publication/309737992_ End-to-end_Optimized_Image_Compression/links/ 58baca8292851c471d53102c/End-to-end-Optimized-Image-Compression.pdf [retrieved on Aug. 2, 2019, 28 pgs.
Shao Jiawei et al, "BottleNet++: An End-to-End Approach for Feature Compression in Device-Edge Co-Inference Systems" , 2020 IEEE International Conference On Communications Workshops (ICC Workshops), Jan. 18, 2020, pp. 1-6.
Haojie Liu et al, "[DNNVC] End-to-End Neural Video Coding—From Pixel Prediction to Feature Sensing", 131, MPEG Meeting, Motion Picture Expert Group or ISO/IEC JTC1/SC29/WG11, No. rn54341, Jun. 24, 2020, 17 pgs.
Ye et al, "[DNNVC] AhG on deep neural networks based video coding", 20, JVET Meeting, Teleconference, the Joint Video Exploration Team of ISO/IEC JTC1/SC29/WG11 and ITU-T SG.16, No. JVET-T0121, Oct. 13, 2020, 7 pgs.

* cited by examiner

900

NONLINEAR PERI-CODEC OPTIMIZATION FOR IMAGE AND VIDEO CODING

BACKGROUND

Digital images and video can be used, for example, on the internet, for remote business meetings via video conferencing, high-definition video entertainment, video advertisements, or sharing of user-generated content. Due to the large amount of data involved in transferring and processing image and video data, high-performance compression may be advantageous for transmission and storage. Accordingly, it would be advantageous to provide high-resolution image and video transmitted over communications channels having limited bandwidth.

SUMMARY

This application relates to encoding and decoding of image data, video stream data, or both, for transmission and storage. Disclosed herein are aspects of systems, methods, and apparatuses for nonlinear peri-codec optimization for image and video coding.

An aspect is a method for image coding using nonlinear peri-codec optimization. Image coding using nonlinear peri-codec optimization may include obtaining a reconstructed image output by decoding, by a decoder, encoded image data from an encoded bitstream, wherein the reconstructed image includes reconstructed pixel values expressed in a first defined image sample space. Image coding using nonlinear peri-codec optimization may include identifying the reconstructed image as a reconstructed neuralized image wherein the reconstructed pixel values are reconstructed neural latent space values. Image coding using nonlinear peri-codec optimization may include obtaining, by a nonlinear post-codec image processor in response to the reconstructed neuralized image, a deneuralized reconstructed image including reconstructed pixel values in a second defined image sample space. Image coding using nonlinear peri-codec optimization may include outputting the deneuralized reconstructed image as the reconstructed image.

Another aspect is an apparatus for image coding using nonlinear peri-codec optimization. The apparatus may include a processor configured to execute instructions stored on a non-transitory computer accessible memory to perform image coding using nonlinear peri-codec optimization. To perform image coding using nonlinear peri-codec optimization the processor may execute the instructions to obtain a reconstructed image output by decoding, by a decoder, encoded image data from an encoded bitstream, wherein the reconstructed image includes reconstructed pixel values expressed in a first defined image sample space. To perform image coding using nonlinear peri-codec optimization the processor may execute the instructions to identify the reconstructed image as a reconstructed neuralized image wherein the reconstructed pixel values are reconstructed neural latent space values. To perform image coding using nonlinear peri-codec optimization the processor may execute the instructions to obtain, by a nonlinear post-codec image processor in response to the reconstructed neuralized image, a deneuralized reconstructed image including reconstructed pixel values in a second defined image sample space. To perform image coding using nonlinear peri-codec optimization the processor may execute the instructions to output the deneuralized reconstructed image as the reconstructed image.

Another aspect is a non-transitory computer-readable medium storing computer instructions for image coding using nonlinear peri-codec optimization. The instructions stored on the non-transitory computer readable medium may be executed by a processor to perform image coding using nonlinear peri-codec optimization. Image coding using nonlinear peri-codec optimization may include obtaining a reconstructed image output by decoding, by a decoder, encoded image data from an encoded bitstream, wherein the reconstructed image includes reconstructed pixel values expressed in a first defined image sample space. Image coding using nonlinear peri-codec optimization may include identifying the reconstructed image as a reconstructed neuralized image wherein the reconstructed pixel values are reconstructed neural latent space values. Image coding using nonlinear peri-codec optimization may include obtaining, by a nonlinear post-codec image processor in response to the reconstructed neuralized image, a deneuralized reconstructed image including reconstructed pixel values in a second defined image sample space. Image coding using nonlinear peri-codec optimization may include outputting the deneuralized reconstructed image as the reconstructed image.

In the aspects described herein, the source image may be an image captured by an electromagnetic sensor, a computer graphics image, or a normal map image. In the aspects described herein, the source image has a resolution that is greater than a maximum available resolution for the operative image format of the encoder, the input image has the maximum available resolution for the operative image format of the encoder, the reconstructed image has the maximum available resolution for the operative image format of the decoder, and the deneuralized reconstructed image has the resolution of the source image.

In the aspects described herein, the source image has a bit-depth that is greater than a maximum available bit-depth for the operative image format of the encoder, the input image has the maximum available bit-depth for the operative image format of the encoder, the reconstructed image has the maximum available bit-depth for the operative image format of the encoder, and the deneuralized reconstructed image has the bit-depth of the source image.

In the aspects described herein, the source image has a first cardinality of channels, the operative image format of the decoder has a second cardinality of channels, the input image has the second cardinality of channels, the reconstructed image has the second cardinality of channels, and the deneuralized reconstructed image has the first cardinality of channels, wherein the first cardinality is greater than the second cardinality. In the aspects described herein, the first cardinality of channels is greater than one, such that the source image is multichromatic and the deneuralized reconstructed image is multichromatic.

In the aspects described herein, the second cardinality of channels is one such that the operative image format of the encoder is monochromatic, the input image is monochromatic, and the reconstructed image is monochromatic. In the aspects described herein, the encoder is compliant with a defined image coding standard. In the aspects described herein, the decoder is compliant with the defined image coding standard. In the aspects described herein, the source image has a resolution that is greater than a maximum available resolution for the operative image format of the encoder, the input image has the maximum available resolution for the operative image format of the encoder, the reconstructed image has the maximum available resolution for the operative image format of the encoder, and the deneuralized reconstructed image has the resolution of the source image. In the aspects described herein, the source image is multichromatic, the operative image format of the encoder is monochromatic, the input image is monochromatic, the reconstructed image is monochromatic, and the deneuralized reconstructed image is multichromatic.

In the aspects described herein, the source image has a bit-depth that is greater than a maximum available bit-depth for the operative image format of the encoder, the input image has the maximum available bit-depth for the operative image format of the encoder, the reconstructed image has the maximum available bit-depth for the operative image format of the encoder, and the deneuralized reconstructed image has the bit-depth of the source image. In the aspects described herein, the neuralizer is a nonlinear pre-codec image processor that implements a trained neural network model to generate the neuralized image in response to the source image, wherein the trained neural network model is trained to output the neuralized image in a target defined image format that is compatible with the operative image format of the encoder. In the aspects described herein, the encoder is compliant with a defined image coding standard. In the aspects described herein, the decoder is compliant with the defined image coding standard.

The aspects described herein may include performing any combination of obtaining the reconstructed image such that the encoded image data is image data generated, prior to obtaining the reconstructed image, by an encoder by encoding an input image in an operative image format of the encoder corresponding to an operative image format of the decoder; obtaining the reconstructed image such that the input image is a neuralized image identified as the input image such that neural latent space values from the neuralized image are used as pixel values in the second defined image sample space; obtaining the reconstructed image such that the neuralized image is image data generated by a neuralizer representing a source image; obtaining the reconstructed image such that the source image includes pixel values expressed in the first defined image sample space; decoding the encoded image data includes decoding a deneuralization parameter from the encoded bitstream; obtaining the nonlinear post-codec image processor in response to the deneuralization parameter, such that the nonlinear post-codec image processor implements a trained neural network model trained in conjunction with a trained neural network model, implemented by a nonlinear pre-codec image processor, trained to generate the neuralized image in response to the source image in a target defined image format that is compatible with the operative image format of the decoder; obtaining a source image, wherein the source image includes pixel values expressed in a first defined image sample space; generating, by a neuralizer, a neuralized image representing the source image, wherein the neuralized image includes pixel values that are expressed as neural latent space values; identifying the neuralized image as an input image for image coding such that the neural latent space values are used as pixel values in a second defined image sample space; generating, by an encoder, encoded image data by encoding the input image, wherein the input image is in an operative image format of the encoder; generating an output bitstream including the encoded image data; outputting the output bitstream; In the aspects described herein, the source image is an image captured by an electromagnetic sensor, a computer graphics image, or a normal map image; outputting the output bitstream such that, subsequent to outputting the output bitstream, a decoder decodes the encoded image data to obtain a reconstructed image, wherein the reconstructed image includes reconstructed pixel values corresponding to the pixel values in the second defined image sample space; outputting the output bitstream such that the reconstructed image is identified as a reconstructed neuralized image wherein the reconstructed pixel values are reconstructed neural latent space values corresponding to the neural latent space values; outputting the output bitstream such that a deneuralized reconstructed image is obtained, by a nonlinear post-codec image processor in response to the reconstructed neuralized image, the deneuralized reconstructed image including reconstructed pixel values in the first defined image sample space; or generating the neuralized image includes including, in the neuralized image, a deneuralization parameter such that encoding the input image includes including, in the encoded image data, the deneuralization parameter such that the decoder decodes the encoded image data to obtain a decoded deneuralization parameter corresponding to the deneuralization parameter such that the nonlinear post-codec image processor is obtained in response to the decoded deneuralization parameter.

Variations in these and other aspects will be described in additional detail hereafter.

BRIEF DESCRIPTION OF THE DRAWINGS

The description herein makes reference to the accompanying drawings wherein like reference numerals refer to like parts throughout the several views unless otherwise noted or otherwise clear from context.

DETAILED DESCRIPTION

Figure 1:
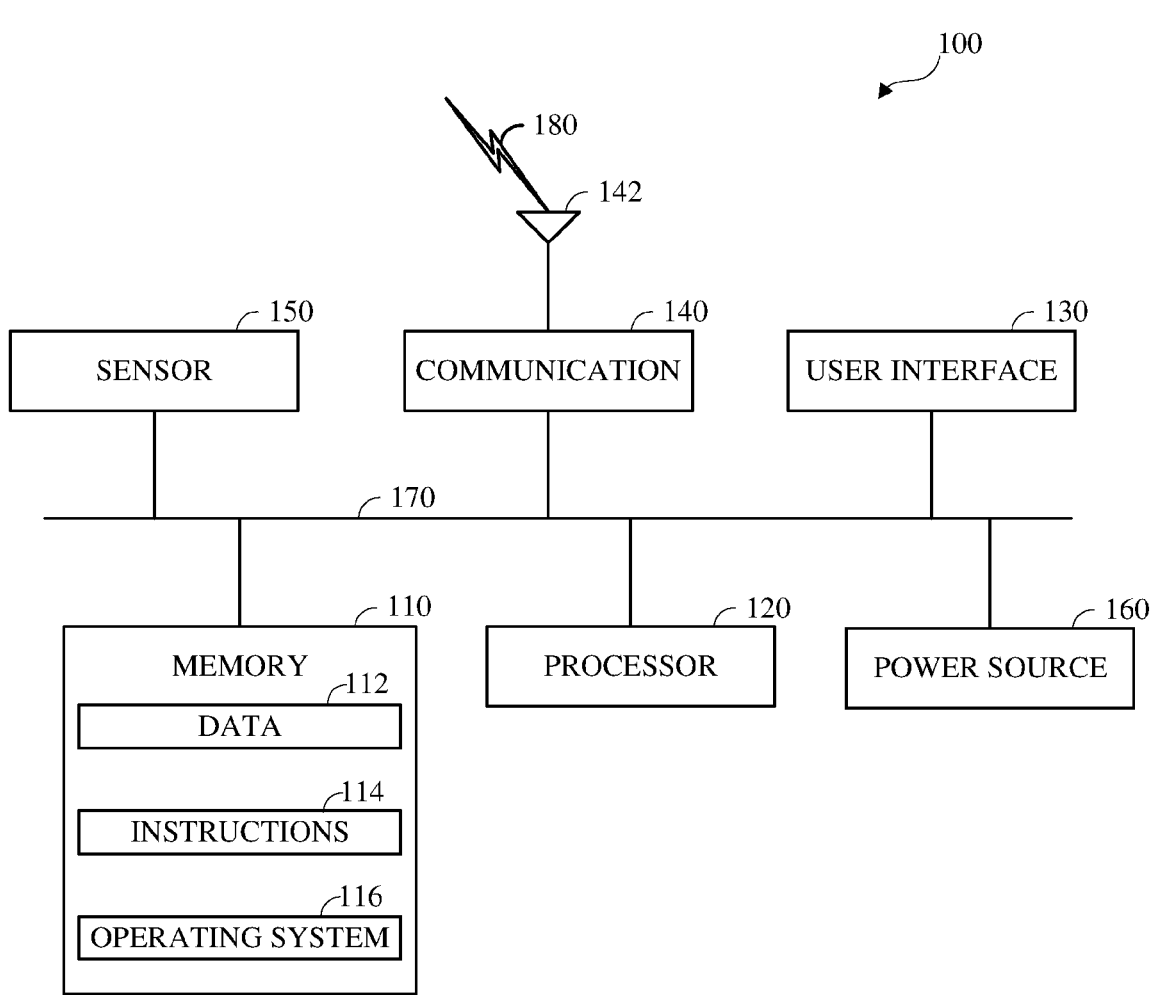
FIG. 1 is a diagram of a computing device in accordance with implementations of this disclosure.

Image and video compression schemes (image coding) may include breaking an input image, or frame, into smaller portions, such as blocks, and generating an output bitstream using techniques to minimize the bandwidth utilization of the information included for each block in the output. In some implementations, the information included for each block in the output may be limited by reducing spatial redundancy, reducing temporal redundancy, or a combination thereof. Image and video compression are implemented by an encoder and corresponding decompression is implemented by a decoder. The encoder and decoder are collectively referred to as a codec and are optimized for compression of image data expressed using a defined input image format for which the codec is optimized. The encoder includes, in encoded image data, image format data that the decoder uses to output decoded, or reconstructed, image data that is substantially similar to the input image.

The image format data that may be included in the encoded image data may be limited such that image format data representing some image formats, or some aspects of some image formats, may be unavailable to the codec. Furthermore, some image formats may be incompatible, or partially incompatible, with some codecs. For example, some codecs may be designed for compression of visible light images and images other than visible light images may be incompatible with the codecs, or may be partially compatible, such that the codec inefficiently or inaccurately encodes the image data.

Nonlinear peri-codec optimization for image and video coding includes processing, using a neural pre-codec processor, a source image, which may be compatible, partially compatible, or incompatible, with a codec that has a defined input image format that represents image data using image sample space values, to generate a neural latent space image that expresses the image. The neural latent space image is used by the encoder, which includes using the neural latent space values as image sample space values, to generate encoded image data that the decoder decodes to obtain reconstructed image data. The reconstructed image data is used as reconstructed neural latent space image data by a neural post-codec processor that outputs reconstructed image data that is substantially similar to the source image. The neural pre-codec processor and the neural post-codec processor are trained in conjunction. The neural pre-codec processor may include parameters in the input image to the codec that the codec includes in the encoded image data and are decoded by the decoder and used to identify, configure, or generate the neural post-codec processor.

Images that are incompatible with the codec, that are processed using nonlinear peri-codec optimization, may be encoded, and subsequently decoded, using the codec. Images that are compatible with the codec, that are processed using nonlinear peri-codec optimization, may be encoded, and subsequently decoded, using the codec more efficiently than encoding, and decoding, the images without using nonlinear peri-codec optimization.

FIG. 1 is a diagram of a computing device 100 in accordance with implementations of this disclosure. The computing device 100 shown includes a memory 110, a processor 120, a user interface (UI) 130, an electronic communication unit 140, a sensor 150, a power source 160, and a bus 170. As used herein, the term "computing device" includes any unit, or a combination of units, capable of performing any method, or any portion or portions thereof, disclosed herein.

The computing device 100 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC. Although shown as a single unit, any one element or elements of the computing device 100 can be integrated into any number of separate physical units. For example, the user interface 130 and processor 120 can be integrated in a first physical unit and the memory 110 can be integrated in a second physical unit.

The memory 110 can include any non-transitory computer-usable or computer-readable medium, such as any tangible device that can, for example, contain, store, communicate, or transport data 112, instructions 114, an operating system 116, or any information associated therewith, for use by or in connection with other components of the computing device 100. The non-transitory computer-usable or computer-readable medium can be, for example, a solid state drive, a memory card, removable media, a read-only memory (ROM), a random-access memory (RAM), any type of disk including a hard disk, a floppy disk, an optical disk, a magnetic or optical card, an application-specific integrated circuits (ASICs), or any type of non-transitory media suitable for storing electronic information, or any combination thereof.

Although shown a single unit, the memory 110 may include multiple physical units, such as one or more primary memory units, such as random-access memory units, one or more secondary data storage units, such as disks, or a combination thereof. For example, the data 112, or a portion thereof, the instructions 114, or a portion thereof, or both, may be stored in a secondary storage unit and may be loaded or otherwise transferred to a primary storage unit in conjunction with processing the respective data 112, executing the respective instructions 114, or both. In some implementations, the memory 110, or a portion thereof, may be removable memory.

The data 112 can include information, such as input audio data, encoded audio data, decoded audio data, or the like. The instructions 114 can include directions, such as code, for performing any method, or any portion or portions thereof, disclosed herein. The instructions 114 can be realized in hardware, software, or any combination thereof. For example, the instructions 114 may be implemented as information stored in the memory 110, such as a computer program, that may be executed by the processor 120 to perform any of the respective methods, algorithms, aspects, or combinations thereof, as described herein.

Although shown as included in the memory 110, in some implementations, the instructions 114, or a portion thereof, may be implemented as a special purpose processor, or circuitry, that can include specialized hardware for carrying out any of the methods, algorithms, aspects, or combinations thereof, as described herein. Portions of the instructions 114 can be distributed across multiple processors on the same machine or different machines or across a network such as a local area network, a wide area network, the Internet, or a combination thereof.

The processor 120 can include any device or system capable of manipulating or processing a digital signal or other electronic information now-existing or hereafter developed, including optical processors, quantum processors, molecular processors, or a combination thereof. For example, the processor 120 can include a special purpose processor, a central processing unit (CPU), a digital signal processor (DSP), a plurality of microprocessors, one or more microprocessor in association with a DSP core, a controller, a microcontroller, an Application Specific Integrated Circuit (ASIC), a Field Programmable Gate Array (FPGA), a programmable logic array, programmable logic controller, microcode, firmware, any type of integrated circuit (IC), a state machine, or any combination thereof. As used herein, the term "processor" includes a single processor or multiple processors.

The user interface 130 can include any unit capable of interfacing with a user, such as a virtual or physical keypad, a touchpad, a display, a touch display, a speaker, a microphone, a video camera, a sensor, or any combination thereof. For example, the user interface 130 may be an audio-visual display device, and the computing device 100 may present audio, such as decoded audio, using the user interface 130 audio-visual display device, such as in conjunction with displaying video, such as decoded video. Although shown as a single unit, the user interface 130 may include one or more physical units. For example, the user interface 130 may include an audio interface for performing audio communication with a user, and a touch display for performing visual and touch-based communication with the user.

The electronic communication unit 140 can transmit, receive, or transmit and receive signals via a wired or wireless electronic communication medium 180, such as a radio frequency (RF) communication medium, an ultraviolet (UV) communication medium, a visible light communication medium, a fiber optic communication medium, a wireline communication medium, or a combination thereof. For example, as shown, the electronic communication unit 140 is operatively connected to an electronic communication interface 142, such as an antenna, configured to communicate via wireless signals.

Although the electronic communication interface 142 is shown as a wireless antenna in FIG. 1, the electronic communication interface 142 can be a wireless antenna, as shown, a wired communication port, such as an Ethernet port, an infrared port, a serial port, or any other wired or wireless unit capable of interfacing with a wired or wireless electronic communication medium 180. Although FIG. 1 shows a single electronic communication unit 140 and a single electronic communication interface 142, any number of electronic communication units and any number of electronic communication interfaces can be used.

The sensor 150 may include, for example, an audio-sensing device, a visible light-sensing device, a motion sensing device, or a combination thereof. For example,

100 the sensor 150 may include a sound-sensing device, such as a microphone, or any other sound-sensing device now existing or hereafter developed that can sense sounds in the proximity of the computing device 100, such as speech or other utterances, made by a user operating the computing device 100. In another example, the sensor 150 may include a camera, or any other image-sensing device now existing or hereafter developed that can sense an image such as the image of a user operating the computing device. Although a single sensor 150 is shown, the computing device 100 may include a number of sensors 150. For example, the computing device 100 may include a first camera oriented with a field of view directed toward a user of the computing device 100 and a second camera oriented with a field of view directed away from the user of the computing device 100.

The power source 160 can be any suitable device for powering the computing device 100. For example, the power source 160 can include a wired external power source interface; one or more dry cell batteries, such as nickel-cadmium (NiCd), nickel-zinc (NiZn), nickel metal hydride (NiMH), lithium-ion (Li-ion); solar cells; fuel cells; or any other device capable of powering the computing device 100. Although a single power source 160 is shown in FIG. 1, the computing device 100 may include multiple power sources 160, such as a battery and a wired external power source interface.

Although shown as separate units, the electronic communication unit 140, the electronic communication interface 142, the user interface 130, the power source 160, or portions thereof, may be configured as a combined unit. For example, the electronic communication unit 140, the electronic communication interface 142, the user interface 130, and the power source 160 may be implemented as a communications port capable of interfacing with an external display device, providing communications, power, or both.

One or more of the memory 110, the processor 120, the user interface 130, the electronic communication unit 140, the sensor 150, or the power source 160, may be operatively coupled via a bus 170. Although a single bus 170 is shown in FIG. 1, a computing device 100 may include multiple buses. For example, the memory 110, the processor 120, the user interface 130, the electronic communication unit 140, the sensor 150, and the bus 170 may receive power from the power source 160 via the bus 170. In another example, the memory 110, the processor 120, the user interface 130, the electronic communication unit 140, the sensor 150, the power source 160, or a combination thereof, may communicate data, such as by sending and receiving electronic signals, via the bus 170.

Although not shown separately in FIG. 1, one or more of the processor 120, the user interface 130, the electronic communication unit 140, the sensor 150, or the power source 160 may include internal memory, such as an internal buffer or register. For example, the processor 120 may include internal memory (not shown) and may read data 112 from the memory 110 into the internal memory (not shown) for processing.

Although shown as separate elements, the memory 110, the processor 120, the user interface 130, the electronic communication unit 140, the sensor 150, the power source 160, and the bus 170, or any combination thereof can be integrated in one or more electronic units, circuits, or chips.

Figure 2:
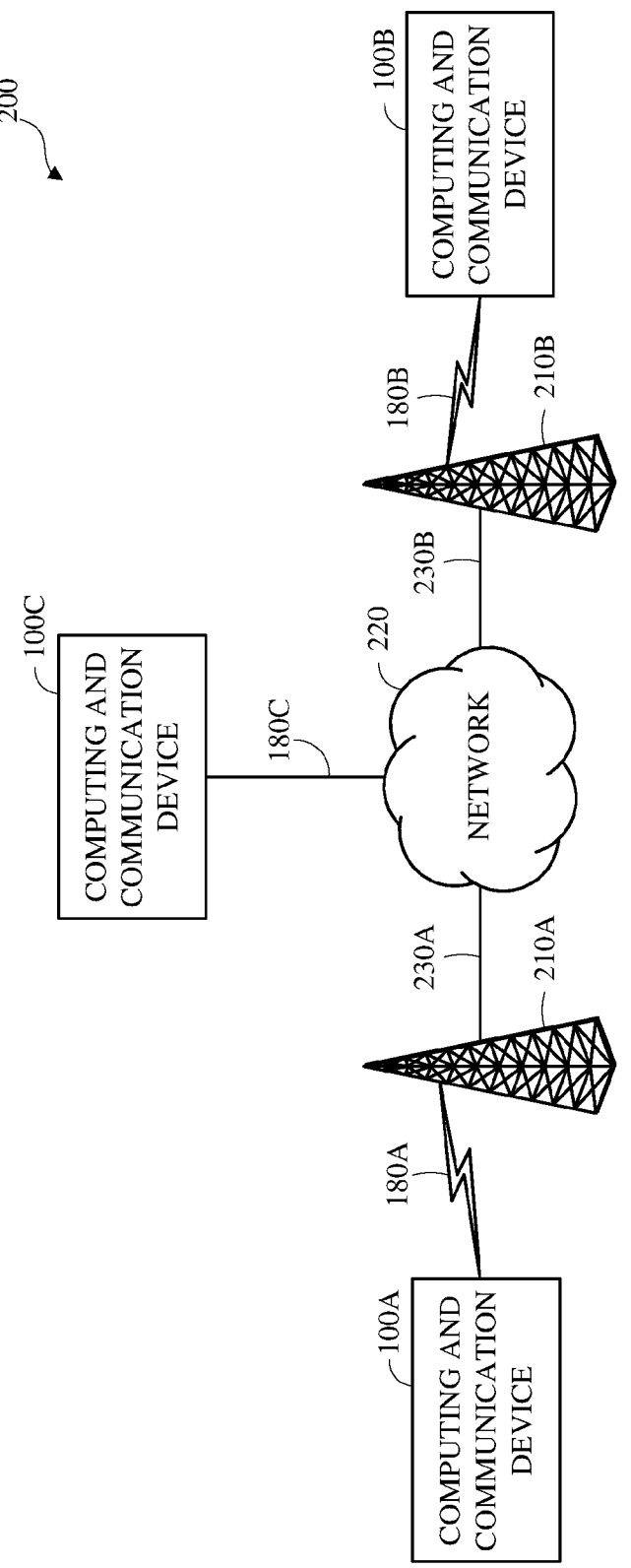
FIG. 2 is a diagram of a computing and communications system in accordance with implementations of this disclosure.

FIG. 2 is a diagram of a computing and communications system 200 in accordance with implementations of this disclosure. The computing and communications system 200 shown includes computing and communication devices 100A, 100B, 100C, access points 210A, 210B, and a network 220. For example, the computing and communication system 200 can be a multiple access system that provides communication, such as voice, audio, data, video, messaging, broadcast, or a combination thereof, to one or more wired or wireless communicating devices, such as the computing and communication devices 100A, 100B, 100C. Although, for simplicity, FIG. 2 shows three computing and communication devices 100A, 100B, 100C, two access points 210A, 210B, and one network 220, any number of computing and communication devices, access points, and networks can be used.

A computing and communication device 100A, 100B, 100C can be, for example, a computing device, such as the computing device 100 shown in FIG. 1. For example, the computing and communication devices 100A, 100B may be user devices, such as a mobile computing device, a laptop, a thin client, or a smartphone, and the computing and communication device 100C may be a server, such as a mainframe or a cluster. Although the computing and communication device 100A and the computing and communication device 100B are described as user devices, and the computing and communication device 100C is described as a server, any computing and communication device may perform some or all of the functions of a server, some or all of the functions of a user device, or some or all of the functions of a server and a user device. For example, the server computing and communication device 100C may receive, encode, process, store, transmit, or a combination thereof audio data and one or both of the computing and communication device 100A and the computing and communication device 100B may receive, decode, process, store, present, or a combination thereof the audio data.

Each computing and communication device 100A, 100B, 100C, which may include a user equipment (UE), a mobile station, a fixed or mobile subscriber unit, a cellular telephone, a personal computer, a tablet computer, a server, consumer electronics, or any similar device, can be configured to perform wired or wireless communication, such as via the network 220. For example, the computing and communication devices 100A, 100B, 100C can be configured to transmit or receive wired or wireless communication signals. Although each computing and communication device 100A, 100B, 100C is shown as a single unit, a computing and communication device can include any number of interconnected elements.

Each access point 210A, 210B can be any type of device configured to communicate with a computing and communication device 100A, 100B, 100C, a network 220, or both via wired or wireless communication links 180A, 180B, 180C. For example, an access point 210A, 210B can include a base station, a base transceiver station (BTS), a Node-B, an enhanced Node-B (eNode-B), a Home Node-B (HNode-B), a wireless router, a wired router, a hub, a relay, a switch, or any similar wired or wireless device. Although each access point 210A, 210B is shown as a single unit, an access point can include any number of interconnected elements.

The network 220 can be any type of network configured to provide services, such as voice, data, applications, voice over internet protocol (VOIP), or any other communications protocol or combination of communications protocols, over a wired or wireless communication link. For example, the network 220 can be a local area network (LAN), wide area network (WAN), virtual private network (VPN), a mobile or cellular telephone network, the Internet, or any other means of electronic communication. The network can use a communication protocol, such as the transmission control protocol (TCP), the user datagram protocol (UDP), the internet protocol (IP), the real-time transport protocol (RTP), the HyperText Transport Protocol (HTTP), or a combination thereof.

The computing and communication devices 100A, 100B, 100C can communicate with each other via the network 220 using one or more a wired or wireless communication links, or via a combination of wired and wireless communication links. For example, as shown the computing and communication devices 100A, 100B can communicate via wireless communication links 180A, 180B, and computing and communication device 100C can communicate via a wired communication link 180C. Any of the computing and communication devices 100A, 100B, 100C may communicate using any wired or wireless communication link, or links. For example, a first computing and communication device 100A can communicate via a first access point 210A using a first type of communication link, a second computing and communication device 100B can communicate via a second access point 210B using a second type of communication link, and a third computing and communication device 100C can communicate via a third access point (not shown) using a third type of communication link. Similarly, the access points 210A, 210B can communicate with the network 220 via one or more types of wired or wireless communication links 230A, 230B. Although FIG. 2 shows the computing and communication devices 100A, 100B, 100C in communication via the network 220, the computing and communication devices 100A, 100B, 100C can communicate with each other via any number of communication links, such as a direct wired or wireless communication link.

In some implementations, communications between one or more of the computing and communication device 100A, 100B, 100C may omit communicating via the network 220 and may include transferring data via another medium (not shown), such as a data storage device. For example, the server computing and communication device 100C may store audio data, such as encoded audio data, in a data storage device, such as a portable data storage unit, and one or both of the computing and communication device 100A or the computing and communication device 100B may access, read, or retrieve the stored audio data from the data storage unit, such as by physically disconnecting the data storage device from the server computing and communication device 100C and physically connecting the data storage device to the computing and communication device 100A or the computing and communication device 100B.

Other implementations of the computing and communications system 200 are possible. For example, in an implementation, the network 220 can be an ad-hoc network and can omit one or more of the access points 210A, 210B. The computing and communications system 200 may include devices, units, or elements not shown in FIG. 2. For example, the computing and communications system 200 may include many more communicating devices, networks, and access points.

Figure 3:
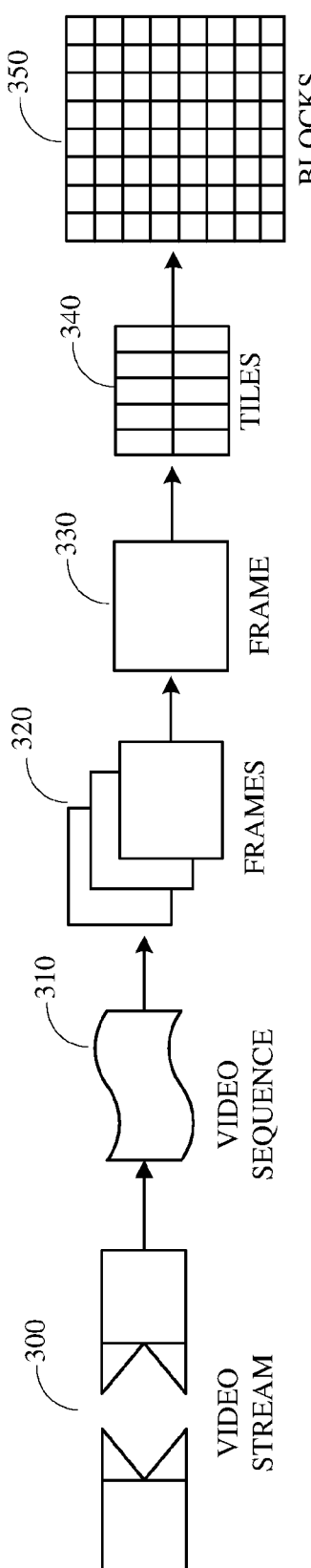
FIG. 3 is a diagram of a video stream for use in encoding and decoding in accordance with implementations of this disclosure.

FIG. 3 is a diagram of a video stream 300 for use in encoding and decoding in accordance with implementations of this disclosure. A video stream 300, such as a video stream captured by a video camera or a video stream generated by a computing device, may include a video sequence 310. The video sequence 310 may include a sequence of adjacent frames 320. Although three adjacent frames 320 are shown, the video sequence 310 can include any number of adjacent frames 320.

Each frame 330 from the adjacent frames 320 may represent a single image from the video stream. Although not shown in FIG. 3, a frame 330 may include one or more segments, tiles, or planes, which may be coded, or otherwise processed, independently, such as in parallel. A frame 330 may include one or more tiles 340. Each of the tiles 340 may be a rectangular region of the frame that can be coded independently. Each of the tiles 340 may include respective blocks 350. Although not shown in FIG. 3, a block can include pixels. For example, a block can include a 16×16 group of pixels, an 8×8 group of pixels, an 8×16 group of pixels, or any other group of pixels. Unless otherwise indicated herein, the term 'block' can include a superblock, a macroblock, a segment, a slice, or any other portion of a frame. A frame, a block, a pixel, or a combination thereof can include display information, such as luminance information, chrominance information, or any other information that can be used to store, modify, communicate, or display the video stream or a portion thereof.

Figure 4:
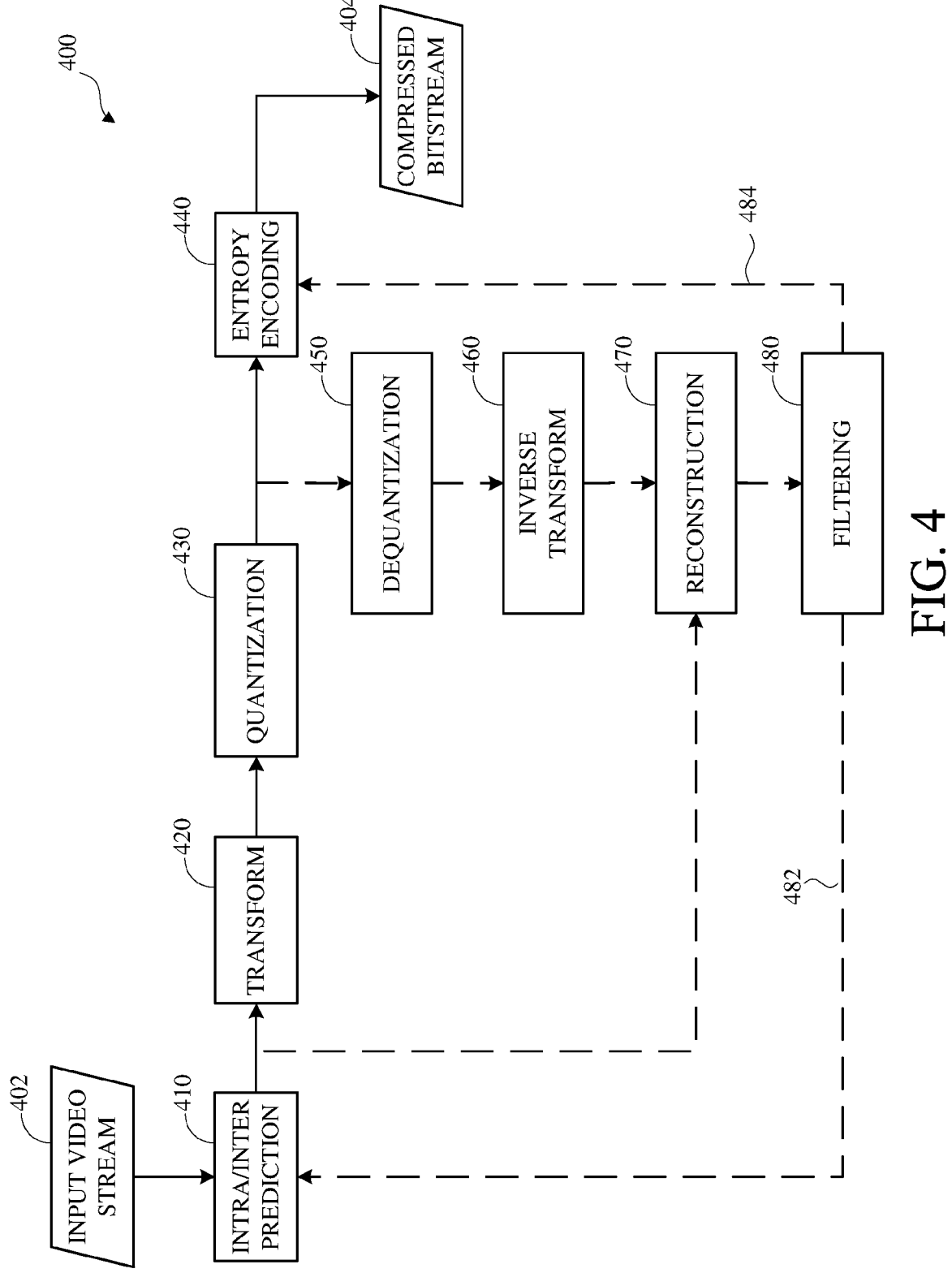
FIG. 4 is a block diagram of an encoder in accordance with implementations of this disclosure.

FIG. 4 is a block diagram of an encoder 400 in accordance with implementations of this disclosure. Encoder 400 can be implemented in a device, such as the computing device 100 shown in FIG. 1 or the computing and communication devices 100A, 100B, 100C shown in FIG. 2, as, for example, a computer software program stored in a data storage unit, such as the memory 110 shown in FIG. 1. The computer software program can include machine instructions that may be executed by a processor, such as the processor 120 shown in FIG. 1, and may cause the device to encode video data as described herein. The encoder 400 can be implemented as specialized hardware included, for example, in computing device 100.

The encoder 400 can encode an input video stream 402, such as the video stream 300 shown in FIG. 3, to generate an encoded (compressed) bitstream 404. In some implementations, the encoder 400 may include a forward path for generating the compressed bitstream 404. The forward path may include an intra/inter prediction unit 410, a transform unit 420, a quantization unit 430, an entropy encoding unit 440, or any combination thereof. In some implementations, the encoder 400 may include a reconstruction path (indicated by the broken connection lines) to reconstruct a frame for encoding of further blocks. The reconstruction path may include a dequantization unit 450, an inverse transform unit 460, a reconstruction unit 470, a filtering unit 480, or any combination thereof. Other structural variations of the encoder 400 can be used to encode the video stream 402.

For encoding the video stream 402, each frame within the video stream 402 can be processed in units of blocks. Thus, a current block may be identified from the blocks in a frame, and the current block may be encoded.

At the intra/inter prediction unit 410, the current block can be encoded using either intra-frame prediction, which may be within a single frame, or inter-frame prediction, which may be from frame to frame. Intra-prediction may include generating a prediction block from samples in the current frame that have been previously encoded and reconstructed. Inter-prediction may include generating a prediction block from samples in one or more previously constructed reference frames. Generating a prediction block for a current block in a current frame may include performing motion estimation to generate a motion vector indicating an appropriate reference portion of the reference frame.

The intra/inter prediction unit 410 may subtract the prediction block from the current block (input block) to produce a residual block. The transform unit 420 may perform a block-based transform, which may include transforming the residual block into transform coefficients in, for example, the frequency domain. Examples of block-based transforms include the Karhunen-Loève Transform (KLT), the Discrete Cosine Transform (DCT), the Singular Value Decomposition Transform (SVD), and the Asymmetric Discrete Sine Transform (ADST). In an example, the DCT may include transforming a block into the frequency domain. The DCT may include using transform coefficient values based on spatial frequency, with the lowest frequency (i.e. DC) coefficient at the top-left of the matrix and the highest frequency coefficient at the bottom-right of the matrix.

The quantization unit 430 may convert the transform coefficients into discrete quantum values, which may be referred to as quantized transform coefficients or quantization levels. The quantized transform coefficients can be entropy encoded by the entropy encoding unit 440 to produce entropy-encoded coefficients. Entropy encoding can include using a probability distribution metric. The entropy-encoded coefficients and information used to decode the block, which may include the type of prediction used, motion vectors, and quantizer values, can be output to the compressed bitstream 404. The compressed bitstream 404 can be formatted using various techniques, such as run-length encoding (RLE) and zero-run coding.

Figure 5:
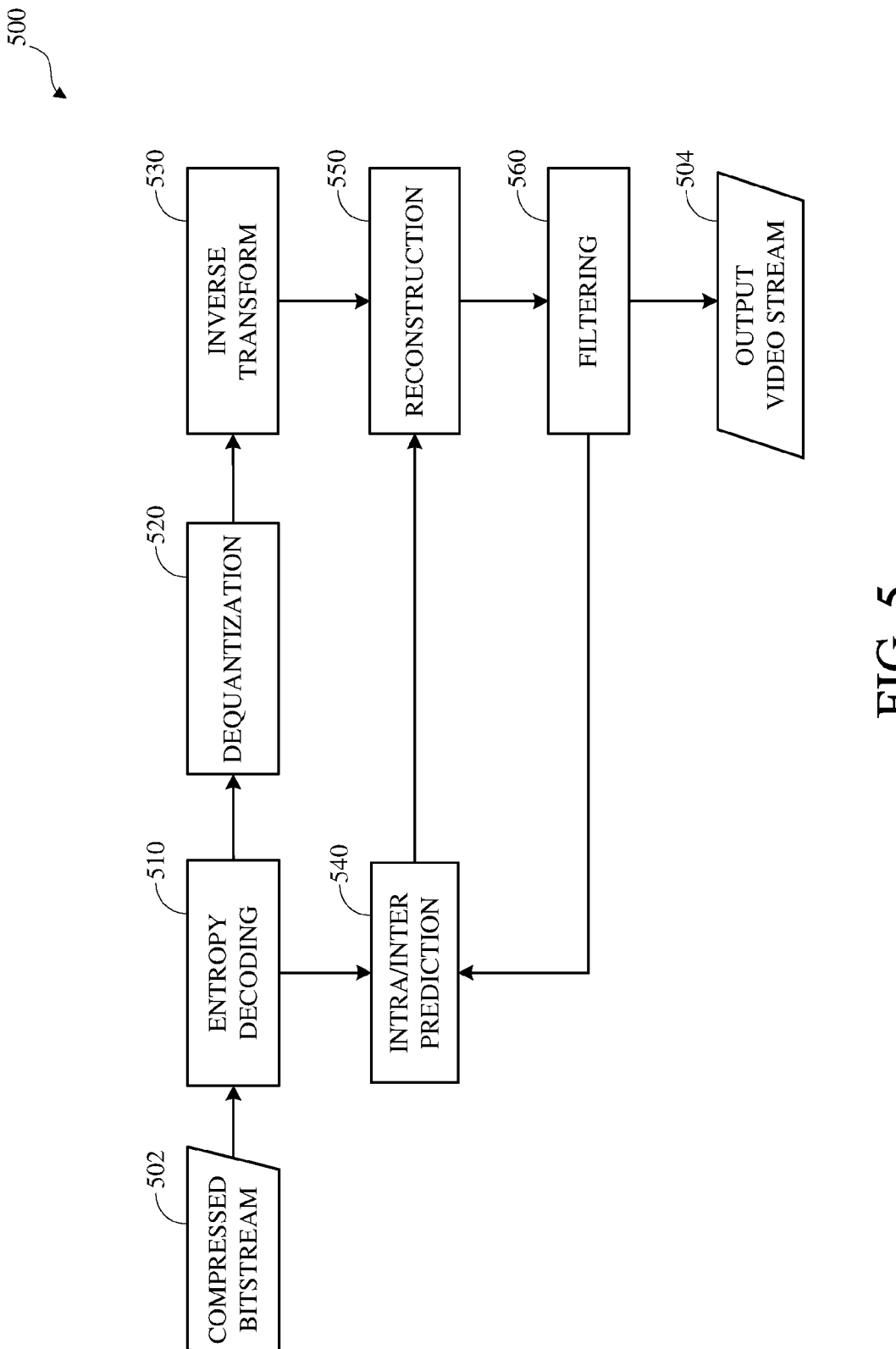
FIG. 5 is a block diagram of a decoder in accordance with implementations of this disclosure.

The reconstruction path can be used to maintain reference frame synchronization between the encoder 400 and a corresponding decoder, such as the decoder 500 shown in FIG. 5. The reconstruction path may be similar to the decoding process discussed below and may include decoding the encoded frame, or a portion thereof, which may include decoding an encoded block, which may include dequantizing the quantized transform coefficients at the dequantization unit 450 and inverse transforming the dequantized transform coefficients at the inverse transform unit 460 to produce a derivative residual block. The reconstruction unit 470 may add the prediction block generated by the intra/inter prediction unit 410 to the derivative residual block to create a decoded block. The filtering unit 480 can be applied to the decoded block to generate a reconstructed block, which may reduce distortion, such as blocking artifacts. Although one filtering unit 480 is shown in FIG. 4, filtering the decoded block may include loop filtering, deblocking filtering, or other types of filtering or combinations of types of filtering. The reconstructed block may be stored or otherwise made accessible as a reconstructed block, which may be a portion of a reference frame, for encoding another portion of the current frame, another frame, or both, as indicated by the broken line at 482. Coding information, such as deblocking threshold index values, for the frame may be encoded, included in the compressed bitstream 404, or both, as indicated by the broken line at 484.

Other variations of the encoder 400 can be used to encode the compressed bitstream 404. For example, a non-transform-based encoder 400 can quantize the residual block directly without the transform unit 420. In some implementations, the quantization unit 430 and the dequantization unit 450 may be combined into a single unit.

FIG. 5 is a block diagram of a decoder 500 in accordance with implementations of this disclosure. The decoder 500 can be implemented in a device, such as the computing device 100 shown in FIG. 1 or the computing and communication devices 100A, 100B, 100C shown in FIG. 2, as, for example, a computer software program stored in a data storage unit, such as the memory 110 shown in FIG. 1. The computer software program can include machine instructions that may be executed by a processor, such as the processor 120 shown in FIG. 1, and may cause the device to decode video data as described herein. The decoder 500 can be implemented as specialized hardware included, for example, in computing device 100.

The decoder 500 may receive a compressed bitstream 502, such as the compressed bitstream 404 shown in FIG. 4, and the decoder 500 may decode the compressed bitstream 502 to generate an output video stream 504. The decoder 500 may include an entropy decoding unit 510, a dequantization unit 520, an inverse transform unit 530, an intra/inter prediction unit 540, a reconstruction unit 550, a filtering unit 560, or any combination thereof. Other structural variations of the decoder 500 can be used to decode the compressed bitstream 502.

The entropy decoding unit 510 may decode data elements within the compressed bitstream 502 using, for example, Context Adaptive Binary Arithmetic Decoding, to produce a set of quantized transform coefficients. The dequantization unit 520 can dequantize the quantized transform coefficients, and the inverse transform unit 530 can inverse transform the dequantized transform coefficients to produce a derivative residual block, which may correspond to the derivative residual block generated by the inverse transform unit 460 shown in FIG. 4. Using header information decoded from the compressed bitstream 502, the intra/inter prediction unit 540 may generate a prediction block corresponding to the prediction block created in the encoder 400. At the reconstruction unit 550, the prediction block can be added to the derivative residual block to create a decoded block. The filtering unit 560 can be applied to the decoded block to reduce artifacts, such as blocking artifacts, which may include loop filtering, deblocking filtering, or other types of filtering or combinations of types of filtering, and which may include generating a reconstructed block, which may be output as the output video stream 504.

Other variations of the decoder 500 can be used to decode the compressed bitstream 502. For example, the decoder 500 can produce the output video stream 504 without the deblocking filtering unit 570.

Figure 6:
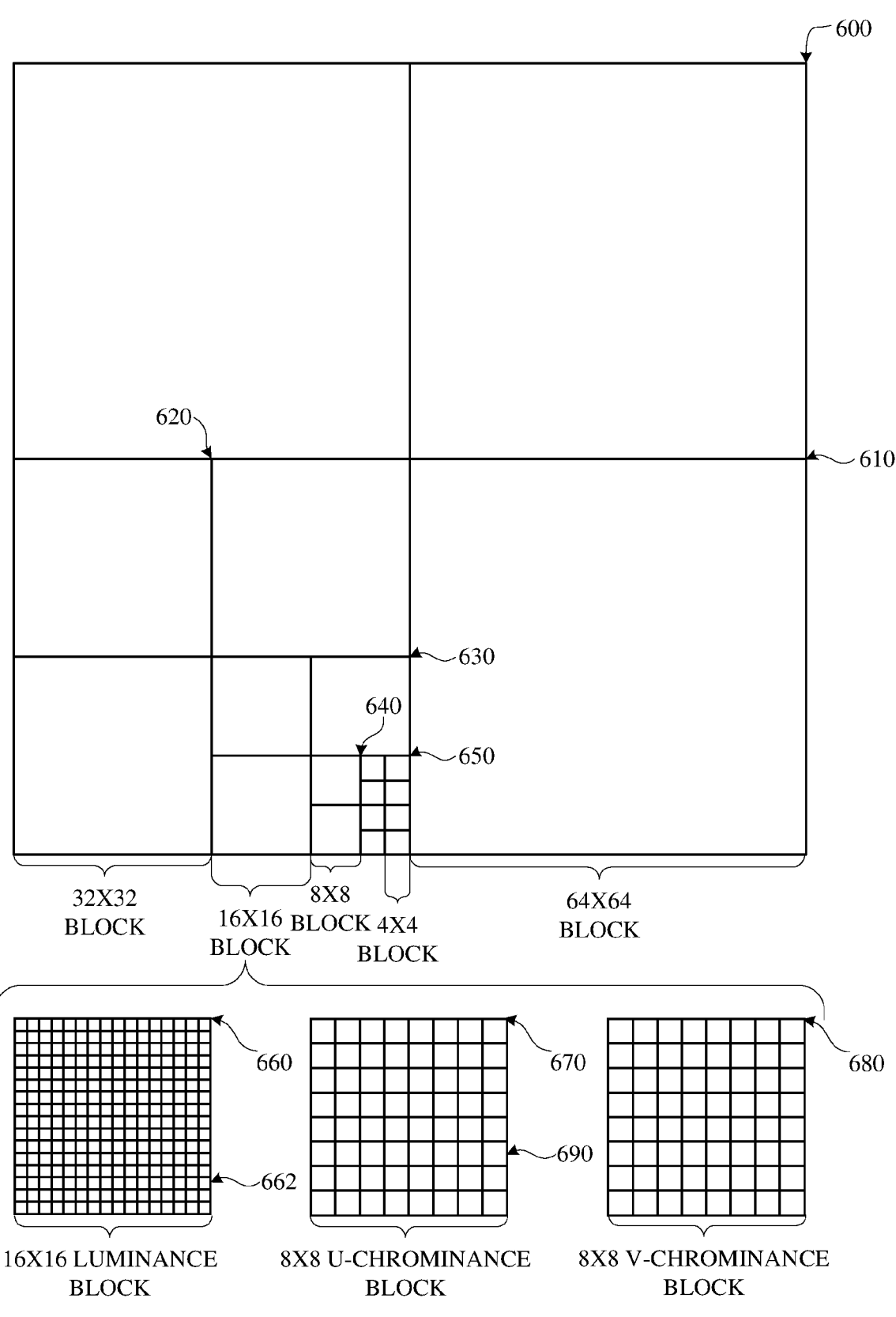
FIG. 6 is a block diagram of a representation of a portion of a frame in accordance with implementations of this disclosure.

FIG. 6 is a block diagram of a representation of a portion 600 of a frame, such as the frame 330 shown in FIG. 3, in accordance with implementations of this disclosure. As shown, the portion 600 of the frame includes four 64×64 blocks 610, in two rows and two columns in a matrix or Cartesian plane. In some implementations, a 64×64 block may be a maximum coding unit, N=64. Each 64×64 block may include four 32×32 blocks 620. Each 32×32 block may include four 16×16 blocks 630. Each 16×16 block may include four 8×8 blocks 640. Each 8×8 block 640 may include four 4×4 blocks 650. Each 4×4 block 650 may include 16 pixels, which may be represented in four rows and four columns in each respective block in the Cartesian plane or matrix. The pixels may include information representing an image captured in the frame, such as luminance information, color information, and location information. In some implementations, a block, such as a 16×16 pixel block as shown, may include a luminance block 660, which may include luminance pixels 662; and two chrominance blocks 670, 680, such as a U or Cb chrominance block 670, and a V or Cr chrominance block 680. The chrominance blocks 670, 680 may include chrominance pixels 690. For example, the luminance block 660 may include 16×16 luminance pixels 662 and each chrominance block 670, 680 may include 8×8 chrominance pixels 690 as shown. Although one arrangement of blocks is shown, any arrangement may be used. Although FIG. 6 shows N×N blocks, in some implementations, N×M blocks may be used. For example, 32×64 blocks, 64×32 blocks, 16×32 blocks, 32×16 blocks, or any other size blocks may be used. In some implementations, N×2N blocks, 2N×N blocks, or a combination thereof may be used.

In some implementations, video coding may include ordered block-level coding. Ordered block-level coding may include coding blocks of a frame in an order, such as raster-scan order, wherein blocks may be identified and processed starting with a block in the upper left corner of the frame, or portion of the frame, and proceeding along rows from left to right and from the top row to the bottom row, identifying each block in turn for processing. For example, the 64×64 block in the top row and left column of a frame may be the first block coded and the 64×64 block immediately to the right of the first block may be the second block coded. The second row from the top may be the second row coded, such that the 64×64 block in the left column of the second row may be coded after the 64×64 block in the rightmost column of the first row.

In some implementations, coding a block may include using quad-tree coding, which may include coding smaller block units within a block in raster-scan order. For example, the 64×64 block shown in the bottom left corner of the portion of the frame shown in FIG. 6, may be coded using quad-tree coding wherein the top left 32×32 block may be coded, then the top right 32×32 block may be coded, then the bottom left 32×32 block may be coded, and then the bottom right 32×32 block may be coded. Each 32×32 block may be coded using quad-tree coding wherein the top left 16×16 block may be coded, then the top right 16×16 block may be coded, then the bottom left 16×16 block may be coded, and then the bottom right 16×16 block may be coded. Each 16×16 block may be coded using quad-tree coding wherein the top left 8×8 block may be coded, then the top right 8×8 block may be coded, then the bottom left 8×8 block may be coded, and then the bottom right 8×8 block may be coded. Each 8×8 block may be coded using quad-tree coding wherein the top left 4×4 block may be coded, then the top right 4×4 block may be coded, then the bottom left 4×4 block may be coded, and then the bottom right 4×4 block may be coded. In some implementations, 8×8 blocks may be omitted for a 16×16 block, and the 16×16 block may be coded using quad-tree coding wherein the top left 4×4 block may be coded, then the other 4×4 blocks in the 16×16 block may be coded in raster-scan order.

In some implementations, video coding may include compressing the information included in an original, or input, frame by, for example, omitting some of the information in the original frame from a corresponding encoded frame. For example, coding may include reducing spectral redundancy, reducing spatial redundancy, reducing temporal redundancy, or a combination thereof.

In some implementations, reducing spectral redundancy may include using a color model based on a luminance component (Y) and two chrominance components (U and V or Cb and Cr), which may be referred to as the YUV or YCbCr color model, or color space. Using the YUV color model may include using a relatively large amount of information to represent the luminance component of a portion of a frame and using a relatively small amount of information to represent each corresponding chrominance component for the portion of the frame. For example, a portion of a frame may be represented by a high-resolution luminance component, which may include a 16×16 block of pixels, and by two lower resolution chrominance components, each of which represents the portion of the frame as an 8×8 block of pixels. A pixel may indicate a value, for example, a value in the range from 0 to 255, and may be stored or transmitted using, for example, eight bits. Although this disclosure is described in reference to the YUV color model, any color model may be used.

In some implementations, reducing spatial redundancy may include transforming a block into the frequency domain using, for example, a discrete cosine transform (DCT). For example, a unit of an encoder, such as the transform unit 420 shown in FIG. 4, may perform a DCT using transform coefficient values based on spatial frequency.

In some implementations, reducing temporal redundancy may include using similarities between frames to encode a frame using a relatively small amount of data based on one or more reference frames, which may be previously encoded, decoded, and reconstructed frames of the video stream. For example, a block or pixel of a current frame may be similar to a spatially corresponding block or pixel of a reference frame. In some implementations, a block or pixel of a current frame may be similar to block or pixel of a reference frame at a different spatial location and reducing temporal redundancy may include generating motion information indicating the spatial difference, or translation, between the location of the block or pixel in the current frame and corresponding location of the block or pixel in the reference frame.

In some implementations, reducing temporal redundancy may include identifying a portion of a reference frame that corresponds to a current block or pixel of a current frame. For example, a reference frame, or a portion of a reference frame, which may be stored in memory, may be searched to identify a portion for generating a prediction to use for encoding a current block or pixel of the current frame with maximal efficiency. For example, the search may identify a portion of the reference frame for which the difference in pixel values between the current block and a prediction block generated based on the portion of the reference frame is minimized and may be referred to as motion searching. In some implementations, the portion of the reference frame searched may be limited. For example, the portion of the reference frame searched, which may be referred to as the search area, may include a limited number of rows of the reference frame. In an example, identifying the portion of the reference frame for generating a prediction may include calculating a cost function, such as a sum of absolute differences (SAD), between the pixels of portions of the search area and the pixels of the current block.

In some implementations, the spatial difference between the location of the portion of the reference frame for generating a prediction in the reference frame and the current block in the current frame may be represented as a motion vector. The difference in pixel values between the prediction block and the current block may be referred to as differential data, residual data, a prediction error, or as a residual block. In some implementations, generating motion vectors may be referred to as motion estimation, and a pixel of a current block may be indicated based on location using Cartesian coordinates as $f_{x,y}$. Similarly, a pixel of the search area of the reference frame may be indicated based on location using Cartesian coordinates as $r_{x,y}$. A motion vector (MV) for the current block may be determined based on, for example, a SAD between the pixels of the current frame and the corresponding pixels of the reference frame.

Although described herein with reference to matrix or Cartesian representation of a frame for clarity, a frame may be stored, transmitted, processed, or any combination thereof, in any data structure such that pixel values may be efficiently represented for a frame or image. For example, a frame may be stored, transmitted, processed, or any combination thereof, in a two-dimensional data structure such as a matrix as shown, or in a one-dimensional data structure, such as a vector array. In an implementation, a representation of the frame, such as a two-dimensional representation as shown, may correspond to a physical location in a rendering of the frame as an image. For example, a location in the top left corner of a block in the top left corner of the frame may correspond with a physical location in the top left corner of a rendering of the frame as an image.

In some implementations, block-based coding efficiency may be improved by partitioning input blocks into one or more prediction partitions, which may be rectangular, including square, partitions for prediction coding. In some implementations, video coding using prediction partitioning may include selecting a prediction partitioning scheme from among multiple candidate prediction partitioning schemes. For example, in some implementations, candidate prediction partitioning schemes for a 64×64 coding unit may include rectangular size prediction partitions ranging in sizes from 4×4 to 64×64, such as 4×4, 4×8, 8×4, 8×8, 8×16, 16×8, 16×16, 16×32, 32×16, 32×32, 32×64, 64×32, or 64×64. In some implementations, video coding using prediction partitioning may include a full prediction partition search, which may include selecting a prediction partitioning scheme by encoding the coding unit using each available candidate prediction partitioning scheme and selecting the best scheme, such as the scheme that produces the least rate-distortion error.

In some implementations, encoding a video frame may include identifying a prediction partitioning scheme for encoding a current block, such as block 610. In some implementations, identifying a prediction partitioning scheme may include determining whether to encode the block as a single prediction partition of maximum coding unit size, which may be 64×64 as shown, or to partition the block into multiple prediction partitions, which may correspond with the sub-blocks, such as the 32×32 blocks 620 the 16×16 blocks 630, or the 8×8 blocks 640, as shown, and may include determining whether to partition into one or more smaller prediction partitions. For example, a 64×64 block may be partitioned into four 32×32 prediction partitions. Three of the four 32×32 prediction partitions may be encoded as 32×32 prediction partitions and the fourth 32×32 prediction partition may be further partitioned into four 16×16 prediction partitions. Three of the four 16×16 prediction partitions may be encoded as 16×16 prediction partitions and the fourth 16×16 prediction partition may be further partitioned into four 8×8 prediction partitions, each of which may be encoded as an 8×8 prediction partition. In some implementations, identifying the prediction partitioning scheme may include using a prediction partitioning decision tree.

In some implementations, video coding for a current block may include identifying an optimal prediction coding mode from multiple candidate prediction coding modes, which may provide flexibility in handling video signals with various statistical properties and may improve the compression efficiency. For example, a video coder may evaluate each candidate prediction coding mode to identify the optimal prediction coding mode, which may be, for example, the prediction coding mode that minimizes an error metric, such as a rate-distortion cost, for the current block. In some implementations, the complexity of searching the candidate prediction coding modes may be reduced by limiting the set of available candidate prediction coding modes based on similarities between the current block and a corresponding prediction block. In some implementations, the complexity of searching each candidate prediction coding mode may be reduced by performing a directed refinement mode search. For example, metrics may be generated for a limited set of candidate block sizes, such as 16×16, 8×8, and 4×4, the error metric associated with each block size may be in descending order, and additional candidate block sizes, such as 4×8 and 8×4 block sizes, may be evaluated.

In some implementations, block-based coding efficiency may be improved by partitioning a current residual block into one or more transform partitions, which may be rectangular, including square, partitions for transform coding. In some implementations, video coding using transform partitioning may include selecting a uniform transform partitioning scheme. For example, a current residual block, such as block 610, may be a 64×64 block and may be transformed without partitioning using a 64×64 transform.

Although not expressly shown in FIG. 6, a residual block may be transform-partitioned using a uniform transform partitioning scheme. For example, a 64×64 residual block may be transform partitioned using a uniform transform partitioning scheme including four 32×32 transform blocks, using a uniform transform partitioning scheme including sixteen 16×16 transform blocks, using a uniform transform partitioning scheme including sixty-four 8×8 transform blocks, or using a uniform transform partitioning scheme including 256 4×4 transform blocks.

In some implementations, video coding using transform partitioning may include identifying multiple transform block sizes for a residual block using multiform transform partition coding. In some implementations, multiform transform partition coding may include recursively determining whether to transform a current block using a current block size transform or by partitioning the current block and multiform transform partition coding each partition. For example, the bottom left block 610 shown in FIG. 6 may be a 64×64 residual block, and multiform transform partition coding may include determining whether to code the current 64×64 residual block using a 64×64 transform or to code the 64×64 residual block by partitioning the 64×64 residual block into partitions, such as four 32×32 blocks 620, and multiform transform partition coding each partition. In some implementations, determining whether to transform the current block may be based on comparing a cost for encoding the current block using a current block size transform to a sum of costs for encoding each partition using partition size transforms.

Figure 7:
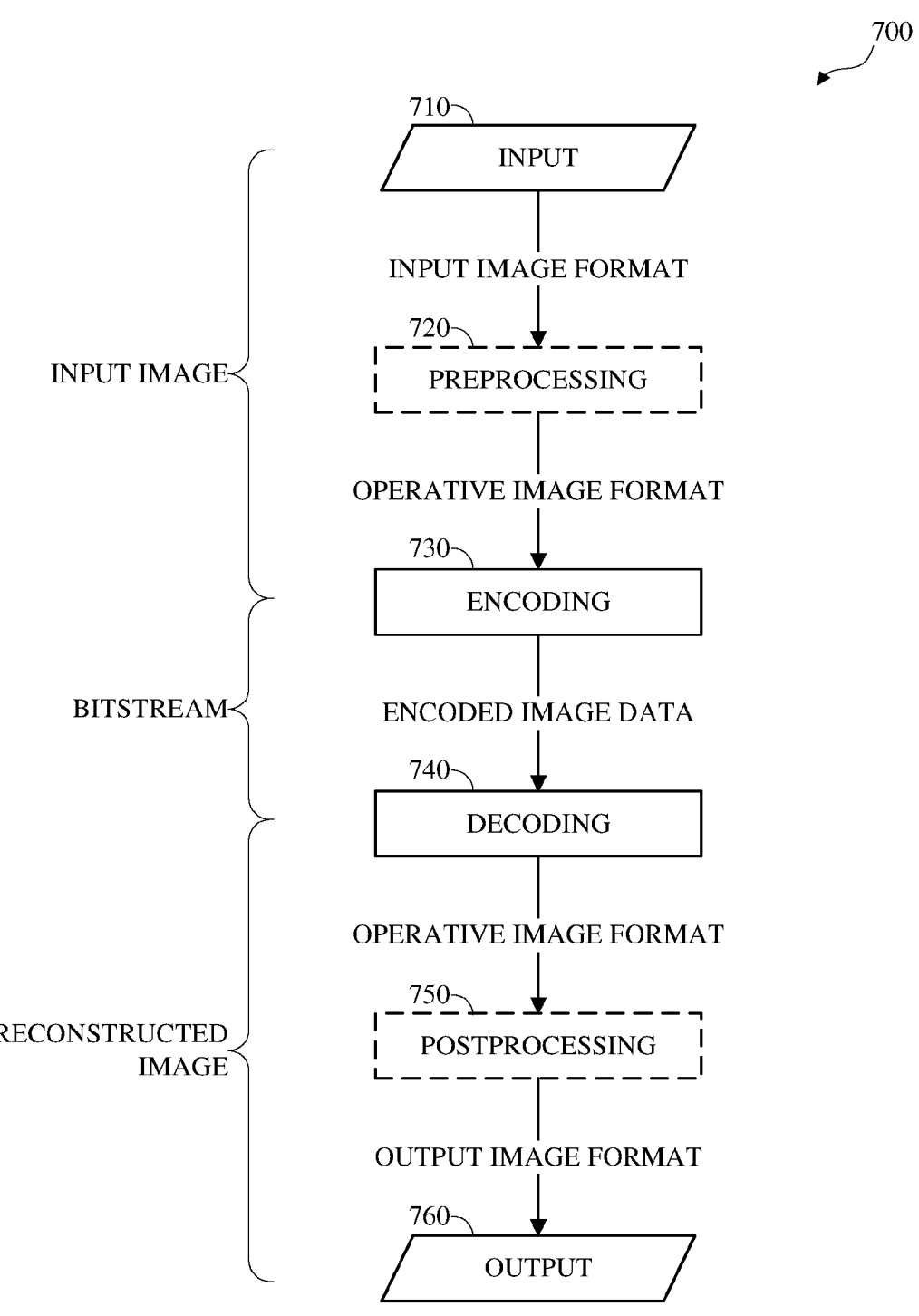
FIG. 7 is a flowchart diagram of an example of a method of image coding in accordance with implementations of this disclosure.

FIG. 7 is a flowchart diagram of an example of a method of image coding 700 in accordance with implementations of this disclosure. Image coding 700 includes input at 710, preprocessing at 720, encoding at 730, decoding at 740, postprocessing at 750, and output at 760. Although described with respect to an image, image coding 700 may be used for coding groups or sequences of images, or frames, such as for video coding.

Image coding 700, or a portion or portions thereof, may be implemented by an encoder, such as the encoder 400 shown in FIG. 4, and a decoder, such as the decoder 500 shown in FIG. 5, which may be physically independent, and which may be collectively referred to as a codec, wherein the encoder encodes, or compresses, an input image and outputs encoded image data that is subsequently decoded, or decompressed, by the decoder to obtain a corresponding reconstructed image, which is substantially similar, such as perceptually indistinguishable, to the input image, except that encoding, decoding, or the combination thereof, may introduce loss of data or distortion, such as coding artifacts.

The codec may be compliant with a defined image or video coding standard or specification.

Input, such as an input image, is obtained at 710. Obtaining the input image may include reading, receiving, or otherwise accessing, the input image. For example, the input image may be obtained from an image sensor, such as a camera. In another example, the input image may be obtained from an image, or graphics, generation device, wherein the image is a computer-generated image or computer graphics image. In another example, the input image may be obtained by reading, or otherwise accessing, the input image from a data storage device, such as the memory 110 shown in FIG. 1.

The input image may be obtained in a defined image format (input image format). A defined image format, such as the input image format, describes or defines image or video signal or data properties, such as structural aspects of the data, image characteristics, semantic aspects of the image data (image data semantics), or a combination thereof. The structural aspects of the image format describe or define the organization of the data of the image. The image characteristics of the image format describe or define aspects of the image, such as resolution and aspect ratio. The semantic aspects of the image format describe or define image data expression, such as color expression, characteristics of the image data, such as color gamut, bit-depth, dynamic range, color planes, channel format, color primaries, a white point, color representation, and transfer functions. A defined image format may be defined or described in an image or video format standard or specification, a portion thereof, or a combination of image or video format standards or specifications, or portions thereof.

The input image may include image format data, such as in a header of the input image, which may indicate one or more aspects of the input image format, such as information indicating the image data semantics, which may be used to perform image format conversion from the input image format to another defined image format.

The input image includes image data, such as pixel data, which may include color values, luminance values, or a combination thereof. The image data values, such as pixel values, may be expressed in accordance with the image data semantics. In some implementations, one or more aspects of the input image format may be expressly indicated in the input image data. In some implementations, one or more aspects of the input image format may be implicitly identified based on the input image data, such as by accessing a data structure, such as a table, including data defining or describing the aspects of the input image format in response to an identifier of the input image format indicated in the input image data.

For a pixel the image data may include values for one or more channels, components, or color planes. For example, the input image format may indicate that the image data includes one color plane and is monochromatic, wherein the pixel values indicate luminance or intensity. In another example, the input image format may indicate that the image data includes color channels, planes, or components, such as three color channels (multichromatic) which may correspond with additive primary colors, such as a red color plane (R), a green color plane (G), and a blue color plane (B), collectively (R, G, B or RGB). The color planes may be described or defined in a linear light domain, such as RGB, or a non-linear light domain, such as R'G'B'. A non-linear light domain may be relatively photometrically, such as perceptually, with respect to the human visual system, uniform relative to the linear light domain. A defined transfer function, such as a gamma function, may describe or define a relationship between values in the linear light domain (e.g., RGB) and corresponding values in the non-linear domain (e.g., R'G'B'). For simplicity and clarity, image data, such as pixel values, expressed as RGB or R'G'B' values may be referred to as "image sample space" or "image observation space" data or values indicating that the values are, or directly represent, radiometrically oriented samples or observations captured by the image.

The input image format may describe or define available values or ranges of available values for respective properties or aspects of the input image. Values, other than the available values, may be invalid. Input image data including invalid values may be unusable as image data in accordance with the input image format. Image data, such as the input image data, in an image format may be inaccessible, incompatible, or unusable with respect to a different image format.

Image coding 700 may encode, decode, or both, image data expressed in a defined image format associated with, or implemented by, image coding 700, which is the image format of the codec. In some implementations, image coding 700 may be associated with, or may implement, multiple image formats. Image coding 700 may implement variations of the image format of the codec, such as a monochromatic variant, a color variant, a high-resolution variant, or a low-resolution variant. For simplicity and clarity, the variant of the image format of the codec identified for compressing an image or video is referred herein to as the operative image format of the codec. An image in a variant of the image format of the codec other than the operative image format of the codec may be preprocessed into the operative image format of the codec or may be incompatible with the codec.

The input image format of the image obtained at 710 may be the operative image format of the codec or may differ from the operative image format of the codec.

The input image is preprocessed at 720. Preprocessing at 720 refers to preprocessing associated with image coding 700. Other image processing (not shown) may be performed prior to image coding 700. Preprocessing at 720, or a portion, or portions, thereof, may be implemented by the encoder, or the device that implements encoding at 730. In some implementations, preprocessing at 720, or a portion, or portions, thereof, may be implemented by a device (preprocessor) other than the device that implements encoding at 730, such as the computing device 100 shown in FIG. 1 or the computing and communication devices 100A, 100B, 100C shown in FIG. 2. Preprocessing at 720, or a portion, or portions, thereof, may be implemented as, for example, a computer software program stored in a data storage unit, such as the memory 110 shown in FIG. 1, which may include machine instructions that may be executed by a processor, such as the processor 120 shown in FIG. 1, and may cause the preprocessor to preprocess image data as described herein. In some implementations, the preprocessor may be implemented as specialized hardware included, for example, in computing device 100.

Preprocessing at 720 may include, for example, image format conversion by an image format conversion preprocessor, input-noise reduction by an input-noise reduction preprocessor, or other preprocessing by another preprocessor, or preprocessors.

Preprocessing at 720 may include image format conversion. As an example, the input image may be obtained in the input image format and preprocessing at 720 may include image format conversion of the image data, or a portion thereof, from the input image format to the operative image format of the codec, which may include color conversion (color conversion preprocessing).

As obtained, such as prior to preprocessing, the input image data may express color values using a non-linear primary color space, such as R'G'B', and preprocessing the input image may include image format conversion of the input image data to the operative image format of the codec that expresses the values for a pixel as a combination of luminance and chrominance channels or components, such as Y'CbCr, using a defined color conversion, such as using a defined color conversion matrix. The color conversion matrix represents a linear transform from (or to) the input color space, R'G'B', and to (or from) the operative color space, Y'CbCr.

For simplicity and clarity, image data, such as pixel values, expressed as photometrically oriented color space values, such as Y'CbCr values, may be referred to as "image sample space" or "image observation space" data or values indicating that the values directly represent radiometrically oriented samples or observations captured by the image.

Image format conversion, including conversion from the input color space to the operative color space of the codec, may improve coding efficiency by decorrelating the color components, allocating resources photometrically, or both. Decorrelating the color components may improve the efficiency of entropy coding. Resource allocation may include resampling, such as subsampling, the chrominance components, to which the human visual system is less responsive, such that the chrominance information utilizes relatively few resources relative to luminance information, to which the human visual system is more responsive.

Resource allocation may include a resampling, or subsampling, scheme that may be expressed as a combination, or ratio (color component ratio), of a reference value and one or more sampling or subsampling values, such as a horizontal subsampling value and a vertical subsampling value. The reference value may indicate a relative sampling rate, relative to a sampling frequency. The luminance sampling resolution, or rate, which may indicate the cardinality, or number, of luminance, or luma, samples may correspond, horizontally and vertically, with the reference value. The horizontal, vertical, or both, chrominance, or chroma, sampling resolution, or rate, which may indicate the cardinality, or number, of chroma samples, may be indicated by the color component ratio. For example, the color component ratio may be expressed as 4:4:4, which may indicate that the sampling rate for the luma component matches the horizontal sampling rate for the chroma components and the vertical sampling rate for the chroma components, indicating that chroma subsampling is omitted. A color component ratio of 4:0:0 indicates that chroma sampling is omitted such that the image is grayscale. A color component ratio of 4:2:2 indicates that horizontal chroma subsampling is half the sampling resolution, or rate, of luma sampling horizontally and vertical chroma subsampling is omitted, indicating the horizontal chroma rate matches the luma sampling rate. A color component ratio of 4:2:0 indicates that the horizontal chroma subsampling is half the sampling resolution, or rate, of luma sampling, and indicates that the vertical chroma subsampling is half the sampling resolution, or rate, of the luma sampling rate. Other formats, or notation thereof, may be used. For example, a ratio of 4:4:4:4 is similar to the 4:4:4 ratio, except that the rightmost value represents an alpha channel.

In some implementations, the input image may be obtained in an input image format that is radiometrically optimized, which may be relatively photometrically unoptimized. For example, an image captured by a sensor other than a visible light sensor, such as a medical imaging sensor based on radiation or magnetic resonance, may be radiometrically optimized and photometrically unoptimized. An image format of an image output by a sensor may be in a radiometrically optimized format, such as an image format using the RGB color space, which may be less photometrically optimized, or oriented, than a corresponding image in an image format using the R'G'B' color space, which may be less photometrically optimized than a corresponding image in an image format using the Y'CbCr color space. In some implementations, the input image may be obtained in an input image format that is multi-spectral, such as from remote sensing or radio telescope operations, or may be optimized for automatic analysis, which may be photometrically unoptimized.

In some implementations, the codec may be optimized to efficiently encode, or compress, and decode, or decompress, image data using identified patterns of correlation, which may be statistically probable patterns of correlation for the respective codec, wherein the codec may be optimized to efficiently encode, or compress, and decode, or decompress, the image data based on the identified patterns of correlation. For example, the codec may be designed or optimized to efficiently encode, or compress, and decode, or decompress, image data using patterns of correlation associated with visible light images.

In some implementations, the input image may have patterns of correlation that differ from the patterns of correlation defined for the codec or for which the codec is optimized. For example, a visible light image may have patterns of correlation similar to the patterns of correlation defined for the codec or for which the codec is optimized, and a non-visible light image may have patterns of correlation that differ from the patterns of correlation defined for the codec or for which the codec is optimized.

In some implementations, the input image may be non-compliant with respect to the operative image format of the codec and preprocessing the input image may include subsampling, cropping, rounding, or another technique, or combination of techniques, which may be lossy techniques, to convert the input image to the operative image format. As used herein, the term "noncompliant," used with reference to a defined format, standard, or specification, indicates data or values that differ from available values or ranges of values as defined or describe by the relevant format, standard, or specification. For example, the spatial resolution of the input image may be greater than a maximum image resolution of the operative image format of the codec (maximum available resolution), and the input image may be noncompliant relative to the operative image format of the codec. In another example, the bit-depth of the of the input image data may be greater than a maximum bit-depth of the operative image format of the codec (maximum available bit-depth), and the input image may be noncompliant relative to the operative image format of the codec.

In some implementations, preprocessing the input image may include subsampling (subsampling preprocessing or chroma subsampling), such as subsampling one or more channels of the input image. For example, the input image format may be R'G'B' 4:4:4, the operative image format may be Y'CbCr 4:2:2, the input image may be noncompliant relative to the operative image format, and preprocessing the input image may include color conversion and subsampling the input image to the operative image format of Y'CbCr 4:2:2, such as using one or more linear transforms. In some implementations, the linear transform, or linear transforms, may inefficiently or incompletely decorrelate the channels of the input image, may inefficiently subsample the input image, or a combination of both, which may correspond with sub-optimal loss of image data.

In some implementations, the input image may be a semantically polymorphic image. As used herein, the term "semantically polymorphic", with respect to an image or image format, indicates that the image data, such as the pixel values, is concurrently compatible with, compliant with, or has utility with respect to, multiple, otherwise incompatible, image formats. Information in the image data expressly, or otherwise deterministically, identifying the image data as semantically polymorphic, or indicating concurrent compatibility with multiple image formats, may be unavailable.

For example, the input image may be a normal map image, which may be a semantically polymorphic image format. A normal map image may represent image data using tangent space in an image format that is compatible with an image format using the RGB color space, wherein a unit-norm vector, $n=(n_x, n_y, n_z)$, representing a tangent-space normal ($n_z \geq 0$) with respect to a triangle mesh, wherein values in the spatial dimension (X, Y, Z) are in the range from negative one to one, $[-1,1]$, and are mapped to RGB values, such as in the range from zero to 255, $[0,255]$, are represented in the image data as the RGB channel data for a pixel. The expression of normal map tangent space image data as RGB color space image data is an example of semantic polymorphism. The normal map input image may be input as the input image, preprocessed, encoded, decoded, postprocessed, and output as described with reference to FIG. 7 to obtain an output image format image including semantically polymorphic image data such that the output, or reconstructed, image may be presented as a visible light image and may be otherwise processed as a normal map image. The third channel ($n_z$) of a normal map image may be redundant, which may be expressed as the following:

$$n_z = 1 - \sqrt{(n_x^2 + n_y^2)}.$$

The obtaining the value of the third channel ($n_z$) of a reconstructed normal map image may be expressed as the following:

$$\hat{n}_z = 1 - (\hat{n}_x^2 + \hat{n}_y^2)^{\frac{1}{2}}.$$

In some implementations, the preprocessing at 720 may include input-noise reduction, such as using an input-noise reduction preprocessor for reducing input noise in the input image, such as prior to encoding the input image at 730.

In some implementations, a preprocessor, such as the input-noise reduction preprocessor, may be implemented using machine learning. For example, the input-noise reduction preprocessor may be implemented as an artificial neural network.

Preprocessing at 720 is shown using a broken line border to indicate that the preprocessing at 720, or a portion thereof, may be omitted from image coding 700. For example, prior to image coding 700, the input image may be in the operative image format, such as in accordance with prior format conversion preprocessing, such that image coding 700 includes obtaining the input image in the operative image format and omits format conversion preprocessing to convert the image data to the operative image format. For an input image obtained at 710 in the operative image format, preprocessing, other than format conversion preprocessing, may be performed, such as for input noise reduction.

The input image is encoded at 730 to obtain encoded image data. For example, encoding the input image, in the operative image format, may be similar to the encoding described with respect to FIG. 4, except as is described herein or as is otherwise clear from context. For example, the reduction of temporal redundancy described with respect to FIG. 4 may be omitted from encoding an individual image.

Encoding the input image at 730 may include encoding the input image using an ad-hoc, or manually defined, encoder, or a portion thereof. As used herein, "ad-hoc" encoder indicates an encoder that omits implementing a machine learning model or policy.

In some implementations, encoding the input image at 730 may include encoding the input image using machine learning wherein the encoder, or a portion thereof, is implemented using a machine learning model or policy. For example, prediction coding, such as the prediction coding implemented by the intra/inter prediction unit 410 shown in FIG. 4, may be implemented using a learning model or policy.

Encoding the input image at 730 includes obtaining data indicating or identifying, for the image, an output image format (output image format data), or a portion, or portions, thereof, corresponding to, or identified by, the input image format or input image data. In some implementations, the output image format data, or a portion, or portions, thereof may correspond to the image format data from the input image, or a portion thereof.

Encoding the input image at 730 includes outputting the encoded image data in an output bitstream (bitstream), such as a compressed or encoded bitstream, such as the compressed bitstream 404 shown in FIG. 4 or the compressed bitstream 502 shown in FIG. 5. The encoded image data may be a compressed representation of the image, which may be a compacted representation of the image for distribution or transport. The output bitstream is in a defined bitstream format associated with the codec. The defined bitstream format may describe or define available values or ranges of available values for respective properties of the encoded image data. For example, defined bitstream format may describe or define available values, or ranges of available values, for including in the bitstream data indicating the input image format, or portions thereof, such as data indicating the image data semantics, or a portion thereof. The defined bitstream format may be defined or described in one or more image or video coding or compression standards or specifications.

Outputting the encoded image data in the output bitstream includes including, in the output bitstream, such as in the encoded image data, such as in a header of the encoded image data, such as an image header, the output image format data, or a portion, or portions, thereof. For example, the encoding at 730 may include including data indicating the image data semantics of the output image format, corresponding to the input image format, in the encoded image data, such as in a header for the image. For example, the bitstream format may define or describe a portion of the bitstream for including a color conversion matrix for color conversion of the reconstructed image from the operative image format to the codec to a defined output image format, such that the output image is substantially similar to the input image, except for artifacts, loss of data, or distortion introduced by image coding 700.

The encoded image data is decoded at 740 to obtain a reconstructed image (reconstructed image data). Decoding the encoded image data at 740 may be implemented by the decoder of the codec, which may be similar to the decoder 500 shown in FIG. 5, except as is described herein or as is otherwise clear from context. The reconstructed image output by decoding at 740 may be, prior to postprocessing, a partially reconstructed image.

Decoding the encoded image data at 740 may include decoding the encoded image data using an ad-hoc, or manually defined, decoder, or a portion thereof. As used herein, "ad-hoc" decoder indicates a decoder that omits implementing a machine learning model or policy. In some implementations, decoding the encoded image data at 740 may include decoding the encoded image data using machine learning wherein the decoder, or a portion thereof, is implemented using a machine learning model or policy, such as using a neural network. For example, coding-artifact reduction, or other reconstruction filtering, at the decoder, such as the filtering applied by the filtering unit 560 shown in FIG. 5, may be implemented using a neural network.

Some implementations of coding using machine learning are, or include aspects that are, bilateral such that encoding using machine learning corresponds with decoding using machine learning. For example, a machine learning encoder may be trained in conjunction with a corresponding machine learning decoder. In another example, encoding using machine learning may include, in the encoded bitstream, encoded image data and a machine learning parameter, or parameters, and decoding the encoded bitstream may include decoding the machine learning parameter, or parameters and using the machine learning parameter, or parameters, to decode the encoded image data using machine learning. Encoding using a machine learning encoder may include transmitting one or more machine learning parameters from the encoder to the decoder in the compressed bitstream and using the machine learning parameters by the machine learning decoder.

Some implementations of coding using machine learning are, or include aspects that are, unilateral such that encoding omits using machine learning that corresponds with decoding using machine learning, decoding omits using machine learning that corresponds with encoding using machine learning, or encoding omits using machine learning that corresponds with decoding using machine learning and decoding omits using machine learning that corresponds with encoding using machine learning.

Encoding using machine learning, decoding using machine learning, or encoding and decoding using machine learning, may include high utilization of processing resources, memory resources, or both and may utilize relatively few transmission resources, or relatively few resources associated with storing or transmitting the encoded image data, relative to a codec that omits machine learning. For example, a codec that implements machine learning may perform ten thousand, a hundred thousand, a million, or more, floating point operations per pixel.

The reconstructed image may operatively correspond with, and may be substantially similar to, the input image prior to encoding, which may be subsequent to preprocessing, except that encoding, decoding, or both, may introduce loss of data or distortion, such as coding artifacts. A metric, such as a distortion, similarity, or reconstruction quality, metric, such as a sum of absolute differences, or another metric, may objectively quantify differences between images. For example, the value of an objective distortion metric between the input image, prior to encoding and subsequent to preprocessing, and the reconstructed image, prior to postprocessing, may be small, indicating substantial similarity, and quantifying the loss of data or distortion, such as coding artifacts introduced by or attributable to the codec. In some implementations, an image may have a bit depth of eight bits and the corresponding peak signal-to-noise ratio may be in the range from thirty to fifty decibels, wherein relatively high values indicate relatively high quality or low distortion.

Peak signal-to-noise ratio (PSNR) is an example of an objective photometric measure of reconstructed image quality, corresponding to image data loss or distortion introduced by image coding. Peak signal-to-noise ratio may be determined, for example, as a sum of squared differences between the original image and the corresponding reconstructed image.

The image format of the reconstructed image is the operative image format of the codec, such as Y'CbCr 4:2:2. Decoding the encoded image data at 740 may include decoding, from the compressed bitstream, the output image format data, or portions thereof.

The reconstructed image, or reconstructed image data, is postprocessed at 750, such as using one or more postprocessors. Postprocessing at 750, or a portion, or portions, thereof, may be implemented by the decoder, or the device that implements decoding at 730. In some implementations, postprocessing at 750, or a portion, or portions, thereof, may be implemented by a device (postprocessor) other than the device that implements encoding at 740, such as the computing device 100 shown in FIG. 1 or the computing and communication devices 100A, 100B, 100C shown in FIG. 2. Postprocessing at 750, or a portion, or portions, thereof, may be implemented as, for example, a computer software program stored in a data storage unit, such as the memory 110 shown in FIG. 1, which may include machine instructions that may be executed by a processor, such as the processor 120 shown in FIG. 1, and may cause the postprocessor to postprocess image data as described herein. In some implementations, the postprocessor may be implemented as specialized hardware included, for example, in computing device 100.

Some postprocessing for the image is unilateral such that the preprocessing for the image omits preprocessing corresponding to the postprocessing. For example, preprocessing, prior to encoding, may include input-noise reduction preprocessing and postprocessing, or decoding and postprocessing, may omit postprocessing corresponding to the input-noise reduction preprocessing. In another example, for image coding, postprocessing, subsequent to decoding, may include coding-noise reduction postprocessing and preprocessing, or encoding and preprocessing, may omit a preprocessing corresponding to the coding-noise reduction postprocessing.

Some postprocessing for the image is bilateral such that the preprocessing for the image includes preprocessing corresponding to the postprocessing. For example, preprocessing, prior to encoding, may include format conversion of the input image from an input image format, such as R'G'B' 4:4:4, to an operative image format, such as Y'CbCr 4:2:2, such that postprocessing, subsequent to decoding, includes format conversion from the operative image format, such as Y'CbCr 4:2:2, to an output, or display, image format equivalent to the input image format, such as R'G'B' 4:4:4.

Postprocessing image format conversion from the operative image format of the codec to the output, or display, image format, which may include color conversion (color conversion postprocessing), may include using the decoded output image format data, or portions thereof. For example, the color conversion postprocessor may identify the output, or display, image format, or aspects thereof, using the decoded output image format data.

Postprocessing at 750 is shown using a broken line border to indicate that the postprocessing at 750, or a portion thereof, may be omitted from image coding 700. For example, the codec may omit format conversion postprocessing and the reconstructed image in the operative image format may be output at 760.

The reconstructed image, in the output, or display, image format, is output at 760. For example, outputting the reconstructed image in the output image format may include storing the reconstructed image in the output image format. In another example, outputting the reconstructed image in the output image format may include sending, or otherwise making available, the reconstructed image in the output image format for subsequent processing. In another example, outputting the reconstructed image in the output image format may include outputting the reconstructed image for presentation or display in accordance with the output image format.

In some implementations, format conversion postprocessing may be omitted at 750 and, subsequent to output at 760, the reconstructed image in the operative image format may be further processed, such as format conversion postprocessed for display. For a reconstructed image output at 760 in the operative image format, postprocessing at 750, other than format conversion postprocessing, may be performed, such as for coding noise reduction.

The reconstructed image in the output, or display, image format, such as subsequent to postprocessing at 750, is substantially similar to the input image in the input image format, such as prior to preprocessing at 720, except that image coding 700 may introduce loss of data or distortion, such as coding artifacts. An objective metric of distortion between the reconstructed image in the output, or display, image format, such as subsequent to postprocessing at 750, and the input image in the input image format, such as prior to preprocessing at 720, is small.

Preprocessing at 720, encoding at 730, decoding at 740, postprocessing at 750, or a combination thereof, may be inaccurate, inefficient, unused, or unavailable for some images, such as for some image formats.

In an example, the input image may be noncompliant with respect to the operative image format of the codec and preprocessing at 720 may include preprocessing to obtain the input image in the operative image format of the codec such that differences between the input image and the corresponding reconstructed image are relatively high indicating loss of data or distortion. For example, the reconstructed image corresponding to an input image for which preprocessing included subsampling to reduce spatial resolution, in one or more channels, may have less detail than the input image. In another example, the reconstructed image corresponding to an input image for which preprocessing included cropping to reduce spatial resolution may omit a spatial portion of the input image.

In some implementations, the input image may be incompatible or noncompliant with the operative format of the codec, and a preprocessor for image format conversion, or a portion thereof, from the input image format to the operative image format may be unavailable such that image coding 700 is unavailable for the image.

The defined bitstream format may omit available values for indicating some image formats, or some aspects of an image format, such as semantic aspects of the image data, such that postprocessing image format conversion at 750 may be inaccurate or unavailable, such that differences between the reconstructed image in the operative image format and the input image in the operative image format may be relatively small or perceptually negligible and the reconstructed image in the output, or display, image format may be unavailable or differences between the reconstructed image in the output, or display, image format and the input image in the input image format may be relatively high. In some implementations, the bitstream may include values indicating the input image format and a postprocessor for accurate conversion from the operative image format to the output, or display, image format may be otherwise unavailable. For example, the input image format may be a normal map image format, which may have similar structure and different semantics than the operative image format of the codec, the defined bitstream format may omit a value indicating that the input image format is the normal map image format, the reconstructed image in the operative image format may be obtained by the decoder, and postprocessing to obtain the reconstructed image in the normal map image format may be unavailable or unidentified.

The input image data may have patterns of correlation that differ from the patterns of correlation defined for the codec or for which the codec is optimized, such that encoding accuracy, efficiency, or both, are reduced relative to coding images having patterns of correlation that are similar to the patterns of correlation defined for the codec or for which the codec is optimized.

Figure 8:
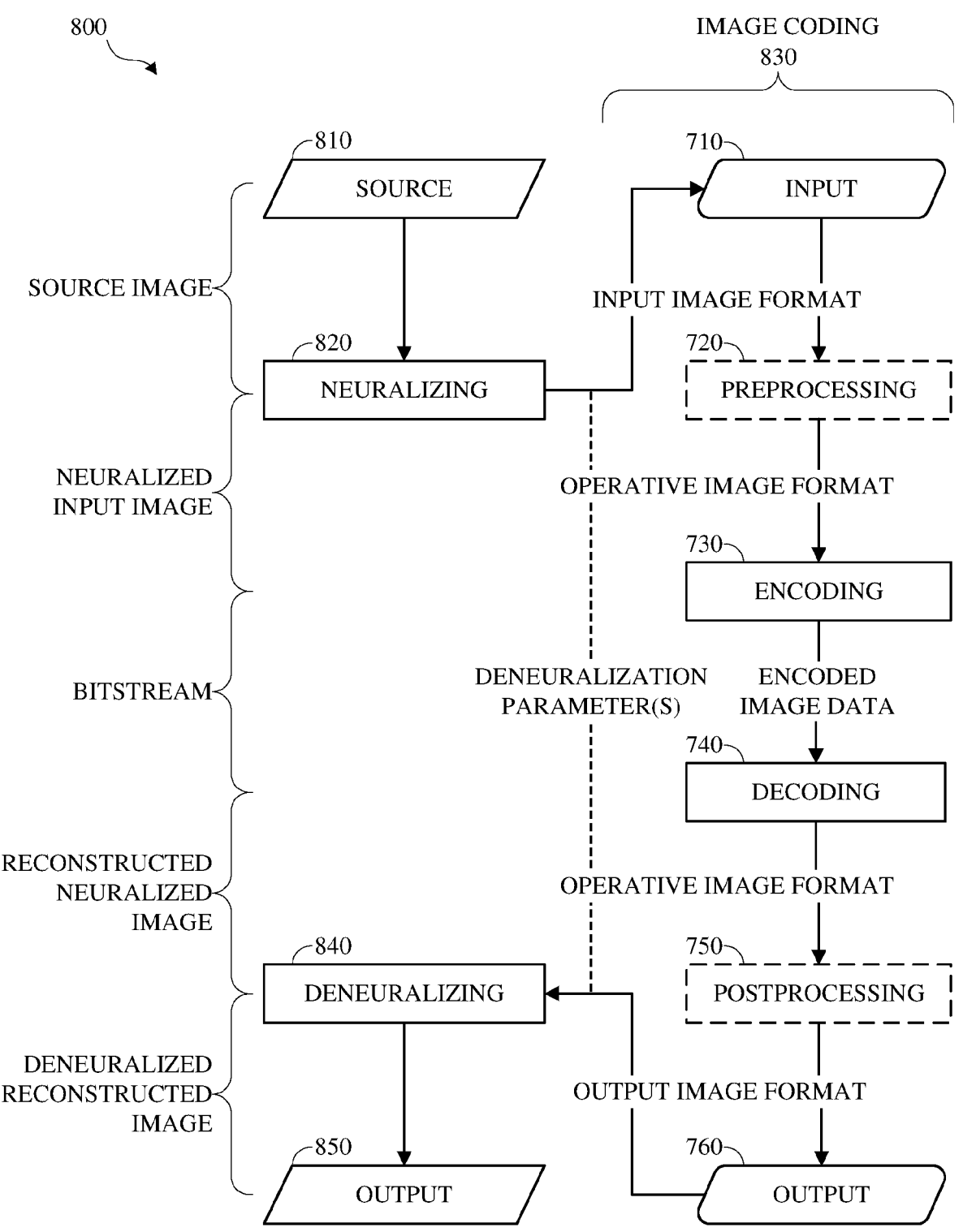
FIG. 8 is a flowchart diagram of an example of a method of neural peri-codec optimization with image coding in accordance with implementations of this disclosure.

FIG. 8 is a flowchart diagram of an example of a method of neural peri-codec optimization 800 with image coding in accordance with implementations of this disclosure. Neural peri-codec optimization 800 includes obtaining a source image at 810, neuralizing the source image at 820, image coding at 830, deneuralizing at 840, and output at 850. Although described with respect to an image, neural peri-codec optimization 800 may be used for sequences of images, such as a video. Neural peri-codec optimization 800, or a portion thereof, may be implemented by a computing device, such as the computing device 100 shown in FIG. 1 or one of the computing and communication devices 100A, 100B, 100C shown in FIG. 2. Image coding at 830, or a portion thereof, may be implemented by a codec, including an encoder, such as the encoder 400 shown in FIG. 4, and a decoder, such as the decoder 500 shown in FIG. 5, operating in coordination.

Image, or video, processing may include nonlinear, machine learning, processing, implemented using a nonlinear, machine learning, model, to obtain output values responsive to input data. A machine learning model may be, for example, an artificial neural network (ANN) model. As used herein, the term "neural network" indicates an artificial neural network.

As used herein, in the phrase "neural peri-codec optimization", the term "neural" refers to the use of a nonlinear model, such as a machine learning models, which may be an artificial neural network, the term "peri-codec" indicates orientation around a codec, such as prior to encoding and subsequent to decoding, and the term "optimization" indicates a modification, other than a modification of the codec, such as a modification of image data, such as from a source image data space to a neural latent space, such that the efficiency of the codec, such as the codec described with respect to FIG. 7, is improved relative to the efficiency of the codec in the absence of such modification.

As used herein, the terms "neuralizing," and variations thereof, such as "neuralize," "neuralization," or "neuralized," refer to a pre-codec, such as pre-encoding, portion of neural peri-codec optimization 800 as shown at 820 in FIG. 8. As used herein, the term "neuralizer" refers to a nonlinear processor, such as a neural network, or other machine learning model, implementing the pre-codec portion of neural peri-codec optimization 800 or to the computing device, or the portion thereof, at which the neural network implementing the pre-codec portion of neural peri-codec optimization 800 is implemented (nonlinear pre-codec image processor).

As used herein, the terms "deneuralizing," and variations thereof, such as "deneuralize," "deneuralization," or "deneuralized," refer to a post-codec, such as post-decoding, portion of neural peri-codec optimization 800 as shown at 840 in FIG. 8. As used herein, the term "deneuralizer" refers the neural network, or other machine learning model, implementing the post-codec portion of neural peri-codec optimization 800 or to the computing device, or the portion thereof, at which the neural network implementing the post-codec portion of neural peri-codec optimization 800 is implemented (nonlinear post-codec image processor). Neuralization, or the neuralizer, and deneuralization, or the deneuralizer, are separate and distinct and are described herein as portions of neural peri-codec optimization 800 to indicate coordination.

Neural peri-codec optimization 800 includes using an artificial neural network, or another machine learning model, to process image data from a source image data space to a neural latent space (neuralizing at 820), such that the structure, characteristics, and semantic aspects of the neural latent space image data are similar to, such as indistinguishable from, the structure, characteristics, and semantic aspects of the image data in an input image format accessible by the image or video codec, or in an operative image format associated with the image or video codec, prior to encoding at 730 using the codec, and using a corresponding artificial neural network, or another machine learning model, to process reconstructed image data output at 760 by the codec subsequent to decoding at 740, to obtain reconstructed image data (deneuralizing at 840) in an output image format corresponding to the source image format. Neuralizing at 820 includes using a trained neural network model, or other trained machine learning model.

A source image is obtained at 810. Obtaining the source image at 810 may be similar to obtaining an input image as shown at 710 in FIG. 7, except as is described herein or as is otherwise clear from context.

Obtaining the source image includes reading, receiving, or otherwise accessing, the source image from an image or video source, such as the sensor 150 shown in FIG. 1, an image or video generator or renderer (not expressly distinctly shown), a data storage unit, such as the memory 110 shown in FIG. 1, or an electronic communication unit, such as the electronic communication unit 140 shown in FIG. 1, via a wired or wireless electronic communication medium, such as the wired or wireless electronic communication medium 180 shown in FIG. 1. For example, the source image may be an image captured by a visible light sensor, such as a camera. In another example, the source image may be an image captured or generated using an electromagnetic sensor other than a visible light sensor, such as a radio-wave sensor (radio telescope), a microwave sensor, an infrared sensor, an ultraviolet sensor, an x-ray sensor, a gamma-ray sensor, or a multi-spectral sensor. In another example, the source image may be an image generated by an image, or graphics, generation device or renderer, wherein the source image is a computer-generated, or rendered, image. In another example, the source image may be a semantically polymorphic image, such as a normal map image.

Obtaining the source image includes obtaining the source image in a source image format, which is a defined image format. As shown in FIG. 8, for simplicity and clarity, prior to neural peri-codec optimization 800 the image is referred to herein as a source image indicating that the image data is in the source image format. The term "source image", as used with respect to neural peri-codec optimization 800, indicates a descriptive distinction from the term "input image", as used with respect to image or video coding, such as the image coding 700 shown in FIG. 7 or the image coding at 830 shown in FIG. 8. For simplicity and clarity, the term "source image", as used with respect to neural peri-codec optimization 800, indicates that the image data, such as the pixel values, of the source image are expressed as image sample space values in a defined image sample space.

The source image format may differ from the input image format structurally or may be indistinguishable from the input image format structurally. The source image format may differ from the input image format with respect to image characteristics, such as resolution or aspect ratio, or may be indistinguishable from the input image format with respect to image characteristics. The source image format may differ from the input image format with respect to image data semantics, such as color primaries or a white point, or may be indistinguishable from the input image format with respect to image data semantics.

The source image format may differ from an operative image format of the codec structurally or may be indistinguishable from the operative image format of the codec structurally. The source image format may differ from the operative image format of the codec with respect to image characteristics, such as resolution or aspect ratio, or may be indistinguishable from the operative image format of the codec with respect to image characteristics. The source image format may differ from the operative image format of the codec with respect to image data semantics, such as color primaries or a white point, or may be indistinguishable from the operative image format of the codec with respect to image data semantics.

In some implementations, the source image format may be the operative image format of the codec. In some implementations, the source image format, or the source image data, may be noncompliant with respect to the operative image format of the codec. For example, the spatial resolution of the source image may be greater than the maximum spatial resolution available for the operative image format of the codec. In another example, the number, or cardinality, of channels of the source image may be greater than the number, or cardinality, of channels of the operative image format of the codec. In another example, the dynamic range of the source image may be greater than the dynamic range of the operative image format of the codec, which may be implemented as a difference in bit-depth wherein the bit-depth of high dynamic range image data, such as 12-bit, may be greater than the bit-depth of lower dynamic range image data, such as 8-bit. In some implementations, the color space of the source image format may differ from the color space of the operative image format of the codec.

The image data of the source image may have patterns of correlation that differ from the patterns of correlation defined for the codec or for which the codec is optimized. In some implementations, the image data of the source image may have patterns of correlation that are substantially similar to the patterns of correlation defined for the codec or for which the codec is optimized.

The source image is neuralized at 820 to obtain a neuralized image. The neuralized image, or neuralized input image, is a neural latent space representation of the source image, subsequent to neuralization at 820, output by the neuralizer and used as the input image obtained by the codec at 710. Neuralization at 820 obtains and outputs the neuralized input image in a target image format compatible with image coding at 830. The neuralized image, or neuralized input image, includes pixel values expressed as neural latent space values. The neuralized image, or neuralized input image, omits pixel values expressed in the defined image sample space of the source image, such as the pixel values from the source image.

The neuralization model implemented by neuralization at 820 and the corresponding deneuralization model implemented by deneuralization at 840 are a trained models, wherein the neuralization model implemented by neuralization at 820 is trained to output neuralized input images in the target defined image format and the corresponding deneuralization model implemented by deneuralization at 840 is trained to input reconstructed neuralized images in the target image format. The neuralization model implemented by neuralization at 820 and the corresponding deneuralization model implemented by deneuralization at 840 are models trained using a defined codec, or a proxy codec representing the defined codec, wherein the defined codec is compliant with a defined image or video coding standard or specification that is compatible with the target image format.

Neural peri-codec optimization 800 with image coding may include neuralization at 820 using a neuralization model trained with respect to a defined codec that is compliant with a defined image or video coding standard or specification that is compatible with the target image format, and deneuralization at 840 using a corresponding deneuralization model trained, in conjunction with the neuralization model, with respect to the defined codec.

In some implementations, image coding at 830 includes using the defined codec, or another codec that is compliant with the defined image or video coding standard.

In some implementations, image coding at 830 includes using a different codec that is compliant with a different defined image or video coding standard and is noncompliant with the defined image or video coding standard, wherein the target image format is compatible with the different codec.

In an example, the neuralization model, and the corresponding deneuralization model, are models trained with respect to a proxy codec representing a defined image coding codec that is compliant with a defined image coding standard or specification that is compatible with the target image format, and the image coding is implemented using a defined video coding codec, that differs from the defined image coding codec, that is compliant with a defined video coding standard or specification, compatible with the target image format, that differs from the defined image coding standard or specification.

In some implementations, the neuralization model may be a neuralization model trained using a codec, or a codec proxy representing the codec, that is noncompliant with a defined image or video coding standard or specification, wherein the neuralization model is trained to output neuralized input images in a target image format that is compatible with an input image format of the noncompliant codec.

Neuralization at 820, and neural peri-codec optimization 800 subsequent to obtaining the source image at 810 and prior to image coding at 830, may omit processing of the image data other than the neural latent space conversion described herein, for conversion or transformation of the image data. Other image processing (not shown) may be performed prior to neural peri-codec optimization 800.

The neural latent space image data is semantically polymorphic. For example, image coding at 830 may include format conversion preprocessing from an input image format to the operative image format of the codec, and the neural latent space image data is semantically polymorphic with respect to the input image format such that the neural latent space image data is compatible with the image conversion preprocessing. In another example, image coding at 830 may omit format conversion preprocessing, and the neural latent space image data is semantically polymorphic with respect to the operative image format of the codec such that the neural latent space image data is compatible with the codec.

The image format of the neuralized input image is structurally compatible with the input image format. In some implementations, the image format of the neuralized input image is compatible with the input image format with respect to image characteristics, such as resolution or aspect ratio. The image format of the neuralized input image is compatible with the input image format with respect to image data semantics, such as color primaries or a white point. In some implementations, image coding at 830 omits format conversion preprocessing and the image format of the neuralized input image is compatible with the operative image format of the codec with respect to structure, image characteristics, and image data semantics.

The neuralized input image differs from the source image. The image data, such as pixel values, of the neuralized input image differs substantially from the image data, such as pixel values, of the source image. In an example, the source image format may be the input image format, which may be the operative image format of the codec, and the neuralized input image, in the input image format and including neural latent space image data, may differ substantially from the source image, objectively, subjectively, or both, which may be expressed objectively with reference to an objective metric of distortion (or similarity) between the source image and the neuralized input image, which may be large, such as relative to the distortion between the input image prior to image coding and the reconstructed image subsequent to image coding as described with respect to FIG. 7. For example, the distortion between the neuralized input image and the source image may be more than ten times the distortion between the input image, prior to image coding at 830, and the reconstructed image, subsequent to image coding at 830.

Neuralizing the source image to obtain the neuralized input image includes obtaining, such as identifying, determining, or generating, by the neuralizer, a deneuralization parameter, or parameters.

In some implementations, the deneuralization parameters include data defining the structure of, and parameters for, the deneuralizer neural network as identified by the neuralizer. For example, the deneuralization parameters may include a number, or cardinality, of neural network layers, a number, or cardinality, of features per layer, convolution kernel sizes, weight parameters of the deneuralizer neural network, or other parameters of the deneuralizer neural network such that the deneuralizer neural network may be generated in accordance with the deneuralization parameters.

In some implementations, the deneuralization parameters include parameters for the deneuralizer neural network as identified by the neuralizer, such as weight parameters of the deneuralizer neural network. The data defining the structure of the deneuralizer neural network may be omitted from the deneuralization parameters. Omitting the data defining the structure of the deneuralizer neural network from the deneuralization parameters utilizes fewer resources that including the data defining the structure of the deneuralizer neural network in the deneuralization parameters.

In some implementations, the deneuralization parameter, or parameters, may be identified by the neuralizer in accordance with a defined configuration or profile, on the basis of the source image format, or/on the basis of an identified image capture or generation device type, such as a sensor type. In some implementations, the deneuralization parameter, or parameters, may be identified by the neuralizer based on a time of day or lighting condition associated with capturing or generating the source image, such as daytime or nighttime. In some implementations, the deneuralization parameter, or parameters, may be identified by the neuralizer based on image content.

In some implementations, the deneuralization parameters include a deneuralizer identifier and may omit other deneuralization parameters. The deneuralizer identifier may uniquely identify a defined neural network model of the deneuralizer (deneuralization model), defined prior to, and independently of, obtaining the source image at 810, which may correspond with a defined neural network model of the neuralizer (neuralization model). For example, multiple neuralization models and corresponding deneuralization models may be defined, prior to, and independently of, obtaining the source image at 810, at the neuralizer and the deneuralizer respectively. For example, a table, or other data structure, at the neuralizer and the deneuralizer respectively, may include data associating a respective deneuralizer identifier (or neuralizer identifier) with a corresponding defined neural network model. In some implementations, the neuralizer may identify a class or type of the image data for the source image, such as visible light image (natural images), normal-map image or texture, computer-generated image, noncompliant image, or other types or classes of images, and the neuralizer may identify a deneuralizer identifier associated with the class or type of image data, such as by reading, or otherwise accessing, the deneuralizer identifier from a table, or other data structure, associating the deneuralizer identifier, and the corresponding deneuralizer model, with the image data type or class. A deneuralization parameter uniquely identifying the identified deneuralization model may be included in the neuralized input image using, for example, ceil(log$_2$(K)) bits.

Although not shown expressly in FIG. 8, neuralizing at 820 may include identifying the neuralization model from among multiple available candidate neuralization models. For example, a set of trained neuralization models, including a number, or cardinality, of neuralization models (K), respectively associated with a corresponding deneuralization models, may be available for neuralizing the source image at 820, and the neuralizer may identify a neuralization model, and corresponding deneuralization model, for neuralizing the source image at 820. Identifying the neuralization model, and corresponding deneuralization model, may include a rate-distortion determination with respect to the available models, or a subset thereof, and using the neuralization model, and corresponding deneuralization model, having the optimal rate-distortion metrics as the neuralization model, and corresponding deneuralization model. The rate-distortion determination may include implementing image coding, which may be proxy image coding, and deneuralization at the device implementing the neuralization, and evaluating the bit rate, or an accurate approximation thereof, for the encoded image data and differences, or distortion, between the source image and the deneuralized reconstructed image.

Neuralizing the source image to obtain the neuralized input image includes including the deneuralization parameter, or parameters, in the neuralized input image data, as indicated by the broken directional line between neuralizing at 820 and deneuralizing at 840, such as in a defined portion, such as a header portion, of the neuralized input image. In some implementations, the source image may be a frame of a sequence of frames, such as a video, and the deneuralization parameter, or parameters, may be included in a portion of the input data associated with multiple images, such as a video header associated with multiple frames of a video, and the deneuralization parameters, or a portion thereof, may be omitted from the data, such as header data, associated with an individual image.

In some implementations, one neuralization model and one corresponding deneuralization model may be available, identifying the deneuralization parameters may be omitted, and deneuralization parameters may be omitted from the neuralized input image data. For example, the deneuralization model may be a deneuralization model that obtains a reconstructed (neuralized) image in the operative image format of the codec, such as Y'CbCr 4:2:0, and outputs a deneuralized reconstructed image in a defined output image format, such as RGB 4:4:4.

In some implementations, the deneuralization parameter, or parameters may be included in the input image data as image format data, such as data indicating or identifying an output image format for the image. For example, the input image format may define or describe image format data, such as a color conversion matrix, and the deneuralization parameters may be included in the neuralized input image data as the color conversion matrix data. In another example, the deneuralization parameters may be included in the neuralized input image data in addition to the image format data.

Outputting, or otherwise making available, the neuralized image, or neuralized input image, for image coding at 830 may include identifying the neuralized image obtained at 820 as the input image for image coding wherein, with respect to image coding at 830, the neural latent space values are pixel values expressed in the input image format for image coding, which is a defined image sample space. The defined image sample space of the input image format may be the defined image sample space of the source image or may differ from the defined image sample space of the source image. For example, the defined image sample space of the input image format for image coding at 830 may be the defined image sample space of the source image and the neural latent space image values generated based on the source image at 820, which, for image coding at 830, are expressed in the defined image sample space of the input image format, differ from the image data, such as pixel, values expressed in the defined image sample space of the source image.

The neuralized input image is image coded at 830. The image coding at 830 is the image coding 700 shown in FIG. 7 using the neuralized input image as the input image. The image coding at 830 includes image input at 710, prepro- cessing at 720, encoding at 730, decoding at 740, postpro- cessing at 750, and image output at 760.

The image input at 710 includes obtaining the input image at 710. The image input shown at 710 in FIG. 8 is the image input shown at 710 in FIG. 7, wherein the input image is the neuralized input image output by Neuralization at 820.

The input image is preprocessed at 720. Preprocessing shown at 720 in FIG. 8 is the preprocessing shown at 720 in FIG. 7, wherein the input image is the neuralized input image output by Neuralization at 820. As described with respect to the preprocessing shown at 720 in FIG. 7, in some implementations, preprocessing, or a portion thereof, such as image format conversion preprocessing, may be omitted. For example, the input image, which is the neuralized input image, may be obtained in the operative image format of the codec and image format conversion preprocessing may be omitted.

The input image, which is the neuralized input image, is encoded at 730 to obtain encoded image data. The encoding shown at 730 in FIG. 8 is the encoding shown at 730 in FIG. 7, wherein the input image is the neuralized input image output by Neuralization at 820, whereby the output image format data, or a portion thereof, obtained for the image, which, for the neuralized input image, includes the deneu- ralization parameter, or parameters, is included in the output bitstream.

For example, the codec, or an image or video coding standard with which the codec is compliant, may define or describe a portion, such as a header, of the encoded image data, or a portion of encoded video data, as including output format data, such as a color conversion matrix, and the deneuralization parameters may be included in the encoded image data as the color conversion matrix data. In another example, the deneuralization parameters may be included in the encoded image data in addition to the color conversion matrix data associated with the input image format.

The encoded image data is decoded at 740 to obtain a reconstructed image (reconstructed image data). The decod- ing shown at 740 in FIG. 8 is the decoding shown at 740 in FIG. 7, wherein the reconstructed image obtained by decod- ing at 740, such as output by decoding, is a reconstructed neuralized image. The reconstructed image, or reconstructed neuralized image, includes image data, such as pixel values, expressed in the defined image sample space of the output image format, corresponding to the defined image sample space of the input image format for image coding at 830.

The reconstructed image, or reconstructed image data, is postprocessed at 750. Postprocessing shown at 750 in FIG. 8 is the postprocessing shown at 750 in FIG. 7, wherein the reconstructed image output by postprocessing is a recon- structed neuralized image in the output image format. As described with respect to the postprocessing shown at 750 in FIG. 7, in some implementations, postprocessing, or a portion thereof, may be omitted.

The reconstructed image, in the output image format, is output at 760. The reconstructed image output shown at 760 in FIG. 8 is the reconstructed image output shown at 760 in FIG. 7, wherein the reconstructed image output is the reconstructed neuralized image in the output image format. Outputting the reconstructed image at 760 includes sending, or otherwise making available, the reconstructed image to the deneuralizer.

The reconstructed neuralized image is deneuralized at 840 to obtain reconstructed image data (a deneuralized recon- structed image). The deneuralizer obtains, such as by receiv- ing, reading, or otherwise accessing, the reconstructed image output by the codec at 760, which is the reconstructed neuralized image, as the reconstructed neuralized image wherein the reconstructed pixel values are reconstructed neural latent space values.

Deneuralization at 840 includes using an artificial neural network, or another machine learning model, to process image data from the neural latent space to the source image data space to obtain reconstructed image data that is substantially similar to the source image data. Deneuralization at 840 includes using an artificial neural network, or another machine learning model, corresponding to the artificial neural network, or another machine learning model used to neuralize the image data at 820. The reconstructed image, or deneuralized reconstructed image, includes image data, such as pixel values, expressed in a defined output image space, which is a defined image sample space corresponding to the defined image sample space of the source image. The deneuralized reconstructed image omits the neural latent space image data values.

In some implementations, deneuralizing the reconstructed neuralized image includes obtaining, such as by reading, extracting, or otherwise accessing, the decoded deneuralization parameter, or parameters, from the reconstructed neuralized image, such as from a header of the reconstructed neuralized image. In some implementations, the reconstructed neuralized image is a frame from a sequence of frames, such as from a video, and obtaining the deneuralization parameter, or parameters, includes obtaining the deneuralization parameter, or parameters, from a header, or other data portion, associated with the sequence of frames, wherein obtaining the deneuralization parameter, or parameters, from the reconstructed neuralized image may be omitted.

In some implementations, neuralization at 820 may omit identifying the deneuralization parameter, or parameters, and denaturalization at 840 may use a previously defined deneuralization parameter, or parameters, obtained independently of the current image.

In some implementations, the reconstructed neuralized image output at 760 may include coding artifacts, such as blocking artifacts, introduced by image coding at 830, and the deneuralized reconstructed image may omit the coding artifacts, or a portion thereof, wherein neural peri-codec optimization 800 omits express deblocking, or other express coding artifact reduction, subsequent to image coding at 830.

The deneuralized reconstructed image is output at 850. For example, the deneuralized reconstructed image may be stored. In another example, the deneuralized reconstructed image may be sent, or otherwise made available, for subsequent processing. In some implementations, the deneuralized reconstructed image may be output for presentation.

Other implementations of neural peri-codec optimization 800 with image coding are available. For example, other classes of artificial neural networks may be used. In some implementations, additional elements of neural peri-codec optimization can be added, certain elements can be combined, and/or certain elements can be removed.

Figure 9:
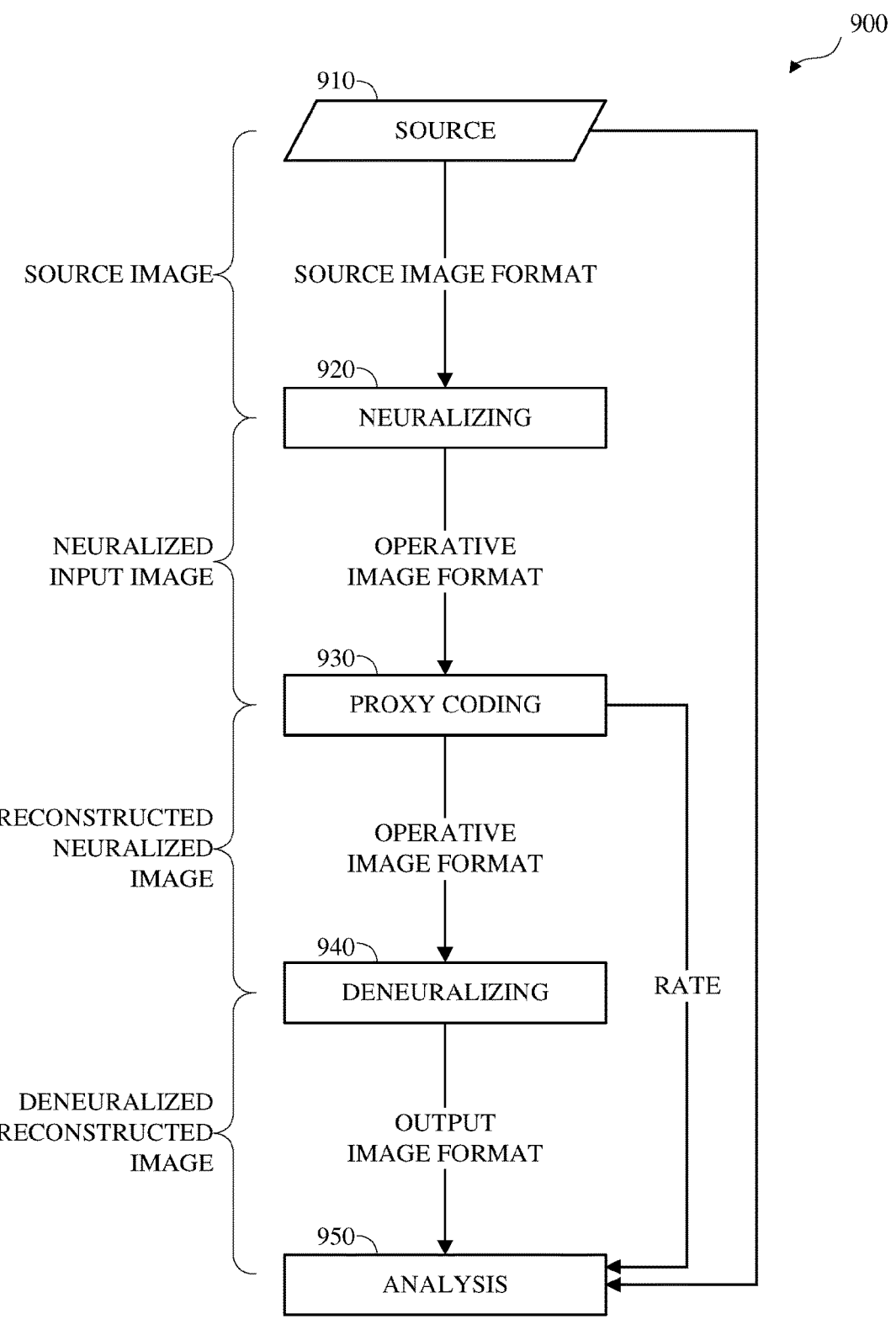
FIG. 9 is a flowchart diagram of an example of a method of neural peri-codec optimization model training for image coding in accordance with implementations of this disclosure.

FIG. 9 is a flowchart diagram of an example of a method of neural peri-codec optimization model training 900 for image coding in accordance with implementations of this disclosure. Neural peri-codec optimization model training 900 includes training, such as automatically optimizing, the nonlinear processing model implementing the pre-codec portion (neuralizer) of neural peri-codec optimization, such as the neural peri-codec optimization 800 shown in FIG. 8, training the nonlinear processing model implementing the post-codec portion (deneuralizer) of neural peri-codec optimization, such as the neural peri-codec optimization 800 shown in FIG. 8, or training the neuralizer and the deneuralizer, in accordance with a defined target image format associated with a target codec. For example, the target codec may implement image format preprocessing from an input image format to the operative image format of the codec and the target image format for neural peri-codec optimization model training 900 is the input image format. In another example, the target codec may omit image format preprocessing and the target image format for neural peri-codec optimization model training 900 is the operative image format of the target codec.

Figure 11:
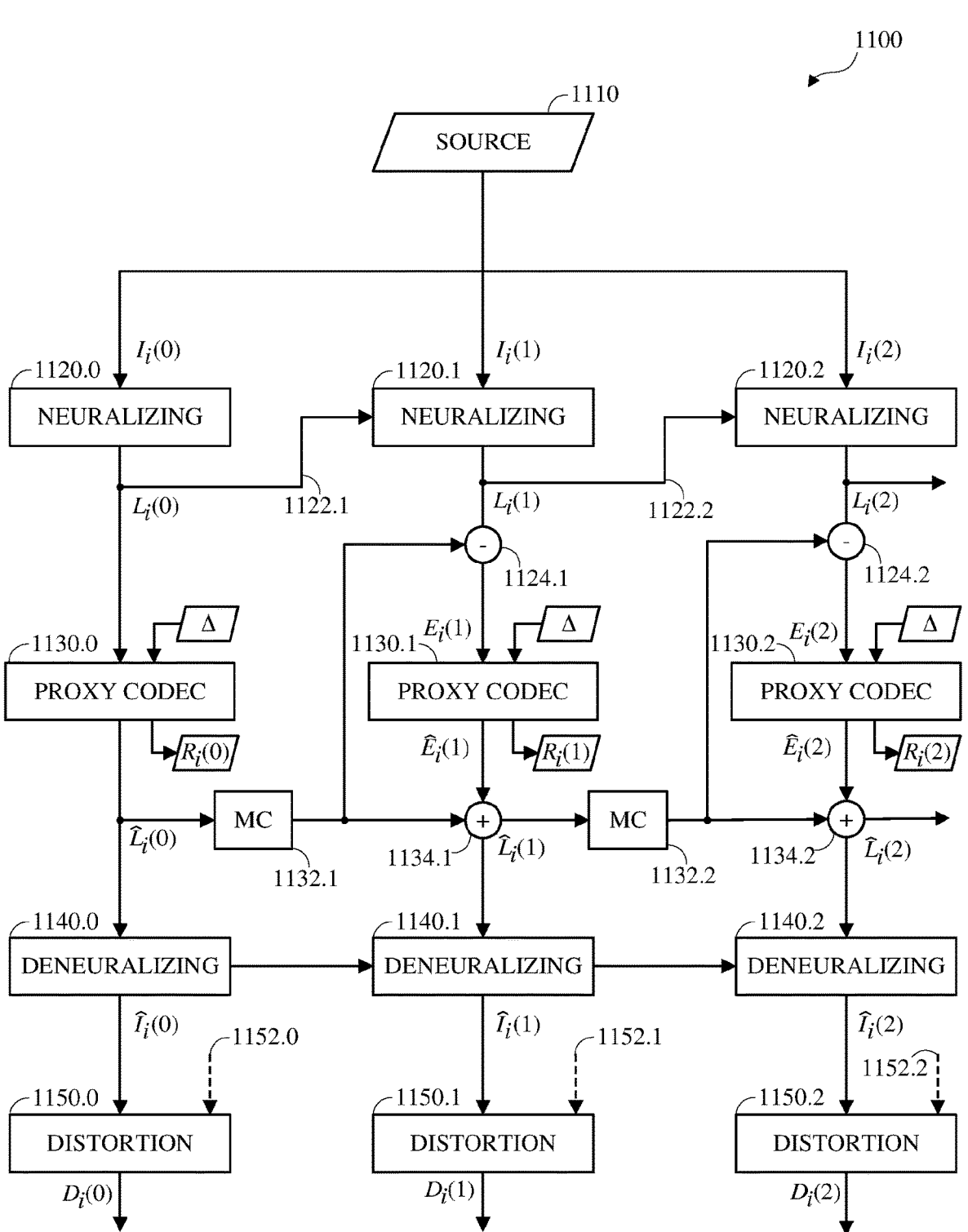
FIG. 11 is a flowchart diagram of an example of a method of neural peri-codec optimization model training for video coding in accordance with implementations of this disclosure.

Neural peri-codec optimization model training 900 includes obtaining a source image at 910, neuralizing the source image at 920, proxy coding at 930, deneuralizing at 940, and analysis at 950. Although described with respect to an image, neural peri-codec optimization model training 900 may be used for sequences of images, such as for a video, such as shown in FIG. 11. Neural peri-codec optimization model training 900, or a portion thereof, may be implemented by a computing device, such as the computing device 100 shown in FIG. 1 or one of the computing and communication devices 100A, 100B, 100C shown in FIG. 2.

Although FIG. 9 shows an iteration of neural peri-codec optimization model training 900 with respect to an image $(S_n)$, neural peri-codec optimization model training 900 may include using a set of training data including multiple images, or videos, (n=1, . . . , N), wherein a sequence of respective iterations of neural peri-codec optimization model training 900 are performed using respective images from the training data. A first iteration of neural peri-codec optimization model training 900 is performed using defined parameters of the neural network models and subsequent interactions of neural peri-codec optimization model training 900 are performed using parameters of the neural network models obtained from the immediately preceding iteration.

A source image $(S_n)$ is obtained at 910. Obtaining the source image $(S_n)$ at 810 may be similar to obtaining a source image $(S_n)$ as shown at 810 in FIG. 8, except as is described herein or as is otherwise clear from context. The source image $(S_n)$ may be a training image from a set of training images, or a frame from a training video from a set of training videos. The training data, such as training images or training videos, may include data, such as images or frames, in a defined source image format. In some implementations, the training data may represent multiple source image formats, such as a first image in a first source image format and a second image in a second source image format. For example, a set of training data may include visible light images, normal map images, non-visible light images, or a combination thereof.

The source image $(S_n)$ is neuralized at 920 to obtain a neuralized input image $(B_n)$. The neuralized input image $(B_n)$ is a neural latent space representation of the source image $(S_n)$, subsequent to neuralization at 920, output by the neuralizer. Although not shown separately in FIG. 9, neural peri-codec optimization model training 900 includes obtaining, such as generating, an untrained, or partially trained, machine learning model, such as an untrained neural network, for neuralizing the source image $(S_n)$. The untrained neuralizer may be configured to output the neuralized input image $(B_n)$ in accordance with a defined operative image format for a codec, such as a codec designed, configured, and optimized for compressing visible light images. In some implementations, the codec is an encoder and a corresponding decoder implemented in accordance, or compliance, with a defined image or video coding standard, and configured as described herein.

Aspects of the untrained neuralizer may be configured based on defined neural network, or neuralization, parameters, such as previously manually defined parameters. Aspects of the partially trained neuralizer may be configured using neuralization parameters output by a preceding iteration of neural peri-codec optimization model training 900. Neuralization may include obtaining, such as determining or generating, deneuralization parameters and including the deneuralization parameters in the neuralized input image $(B_n)$.

Neural peri-codec optimization model training 900 may include determining, such as probabilistically determining, or estimating, a derivative of a loss function, such as a sum of an encoding rate and corresponding distortion for encoding and decoding an image, with respect to respective weight parameters of the neuralizer and the deneuralizer.

In some implementations, the neuralizer and the deneuralizer may be trained using a codec, such as the image codec 700 shown in FIG. 1. For example, the derivative of the loss function may be determined using finite difference on a per-parameter basis, which may be performed sequentially for the respective parameters, wherein a delta change is applied to the current parameter, an iteration of neural peri-codec optimization model training 900 is performed, a delta change in the rate and distortion is identified, and the delta change is used to update the current parameter value. Determining the derivative of the loss function using finite difference on a per-parameter basis may have relatively high resource utilization. The quantization implemented by the encoder is discontinuous and may include converting floating-point numbers to integer codes, such that relatively small parameter updates, such as updates that correspond with differences in values that are within the quantization step size (interval), may be ineffective due to the quantization, which may limit the efficiency of training using a codec.

In some implementations, the neuralizer and the deneuralizer may be trained using proxy coding implemented by a differentiable codec proxy, which may be highly efficient relative to training using a corresponding codec. Proxy coding is a smoothing approximation of encoding and decoding using a codec, such as the image codec 700 shown in FIG. 7, that efficiently backpropagates derivatives, such that the parameters may be concurrently updated using gradient descent.

Figure 10:
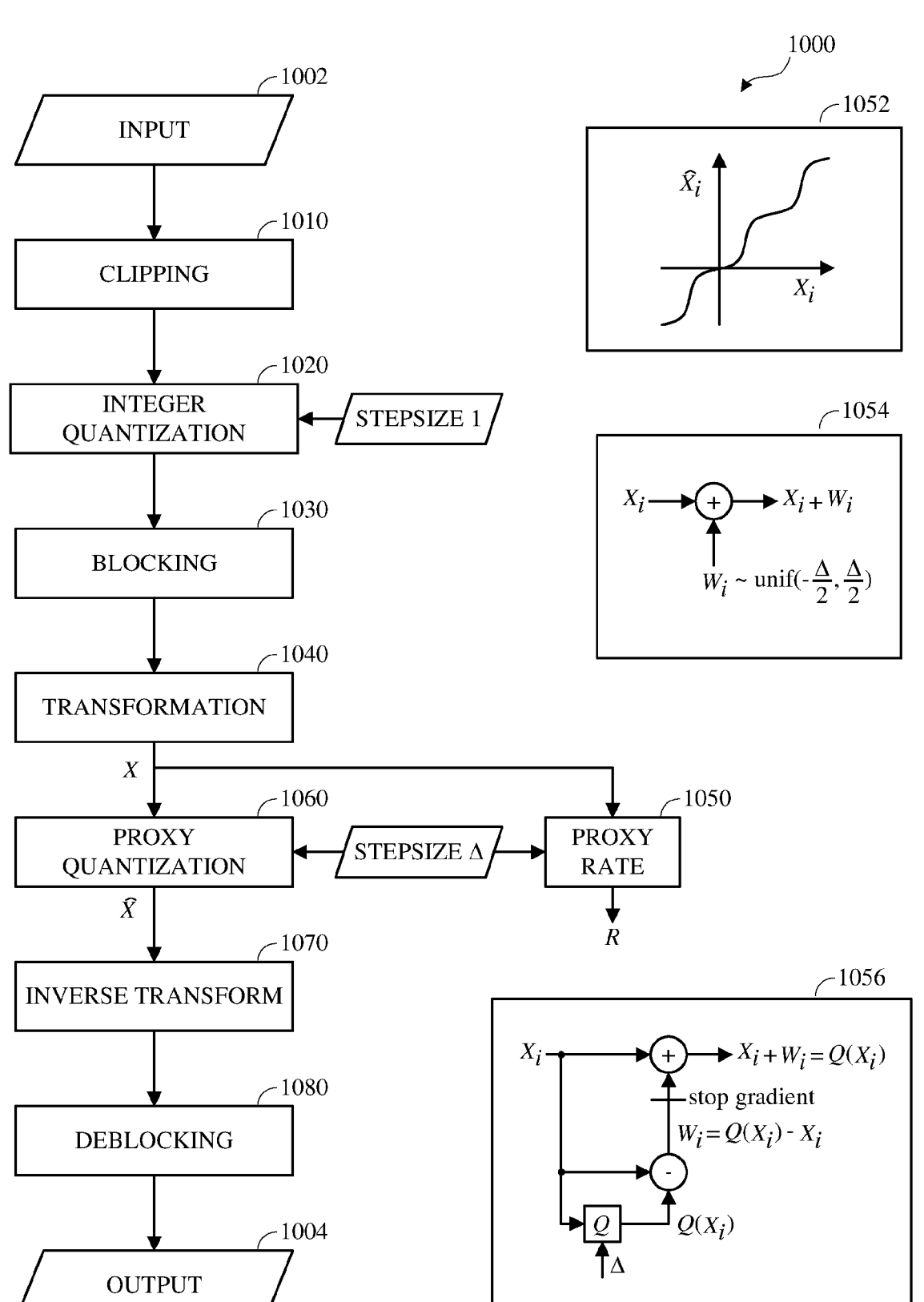
FIG. 10 is a flowchart diagram of an example of a method of proxy coding in accordance with implementations of this disclosure.

The neuralized input image $(B_n)$ is proxy coded at 930. Proxy coding at 930 is similar to image coding, such as the image coding 700 shown in FIG. 7 or the image coding 830 shown in FIG. 8, except as is described herein or as is otherwise clear from context. Proxy coding is implemented by a codec proxy. The codec proxy implements encoding and decoding, or portions thereof. An example of proxy coding is shown in FIG. 10. Proxy coding generates and outputs a reconstructed neuralized image $(\hat{B}_n)$ corresponding to the neuralized input image $(B_n)$. The codec proxy includes the deneuralization parameters obtained from, or for, the neuralized input image $(B_n)$ in the reconstructed neuralized image $(\hat{B}_n)$.

The codec proxy obtains a respective neuralized input image $(B_n)$, including the deneuralization parameters, corresponding to a respective source image $(S_n)$ from the training data (n=1, . . . , N), and outputs a corresponding reconstructed neuralized image $(\hat{B}_n)$, including the deneuralization parameters, and a corresponding value of a rate metric $(R_n)$, which may be a real-valued determination of the cardinality, or number, of bits for encoding the neuralized input image $(B_n)$ using the codec based on encoding the neuralized input image $(B_n)$ using the codec proxy.

The reconstructed neuralized image $(\hat{B}_n)$ is deneuralized at 940 to obtain reconstructed image data, wherein reconstructed image data includes a deneuralized reconstructed image $(\hat{S}_n)$. The deneuralizer obtains, such as by receiving, reading, or otherwise accessing, the reconstructed neuralized image $(\hat{B}_n)$ output by proxy coding at 930. The reconstructed neuralized image data is reconstructed neural latent space image data. Deneuralization at 940 includes using an artificial neural network, or another machine learning model, to process image data from the neural latent space to the source image data space to obtain reconstructed image data that is substantially similar to the source image data. Deneuralization may include obtaining, such as reading or otherwise accessing, the deneuralization parameters from the reconstructed neuralized image $(\hat{B}_n)$ and generating, or configuring, the neural network of the deneuralizer, or aspects thereof, as described herein, using the deneuralization parameters.

In some implementations, the deneuralizer, or aspects thereof, may be generated, or configured, using defined deneuralization parameters defined prior to neural peri-codec optimization model training 900, wherein the deneuralizer is an untrained deneuralizer, or based on a preceding iteration of neural peri-codec optimization model training 900.

Analysis is performed at 950 to obtain updated neural network parameters. The analysis at 950 includes obtaining, such as reading or otherwise accessing, the value of the rate metric $(R_n)$ output by proxy coding at 930. The analysis at 950 includes obtaining, such as determining, a value of a distortion metric $(D_n)$ representing, or measuring, differences between the source image $(S_n)$ and the deneuralized reconstructed image $(\hat{S}_n)$. For example, the distortion may be determined as the squared $(\vartheta_2)$ error $(D_n=\|S_n-\hat{S}_n\|^2)$ between the source image $(S_n)$ and the deneuralized reconstructed image $(\hat{S}_n)$. Other distortion metrics may be used. In some implementations, the neuralizer and the deneuralizer are trained to minimize the Lagrangian using a distortion measure, such as a perceptual distortion measure, or other distortion measure, relevant to minimizing distortion relative to a bitrate.

The value of the distortion metric $(D_n)$ and the value of the rate metric $(R_n)$ may be used to obtain a result of a differentiable loss function such that the neuralizer and the deneuralizer are optimized to minimize the Lagrangian $(D+\lambda R)$ of the average distortion $(D=(1/N)\Sigma_n D_n)$ and the average rate $(R=(1/N)\Sigma_n R_n)$. In some implementations, the Lagrangian, which may be expressed as $(J=D+\lambda R)$ may be evaluated as a function $J(\theta)$ of the parameters $(\theta)$ of the neuralizer and the deneuralizer, wherein the function $J(\cdot)$ is used to obtain a value of the vector of parameters $(\theta)$ that minimizes, or approximately minimizes, $J(\theta)$. In some implementations, an iterative process, such as stochastic gradient descent, may be used to determine a vector of parameters $(\theta)$ that minimize, or approximately minimize $J(\theta)$. In some implementations, the vector of parameters $(\theta)$ may include the trained, or partially trained, quantization step size $(\Delta)$.

FIG. 10 is a flowchart diagram of an example of a method of proxy coding 1000 in accordance with implementations of this disclosure. Proxy coding 930 shown in FIG. 9 may be implemented as the proxy coding 1000 shown in FIG. 10.

Proxy coding 1000 includes encoding an input image, obtained at 1002, to obtain encoded image data and decoding the encoded image data to obtain reconstructed image data output at 1004. Proxy coding 1000 includes clipping at 1010, integer quantization at 1020, blocking at 1030, transformation at 1040, proxy rate determination at 1050, proxy quantization at 1060, inverse transformation at 1070, and deblocking at 1080. Although described with respect to an image, proxy coding 1000 may be used for sequences of images, such as for a video. Proxy coding 1000, or a portion thereof, may be implemented by a computing device, such as the computing device 100 shown in FIG. 1 or one of the computing and communication devices 100A, 100B, 100C shown in FIG. 2. For example, the computing device may implement a codec proxy that implements proxy coding 1000. The proxy codec implementing proxy coding 1000 models a defined codec, such as an encoder and a corresponding decoder implemented in accordance, or compliance, with a defined image or video coding standard, and configured as described herein.

An input image is obtained at 1002. As shown in FIG. 10, the input image is obtained in the operative image format of the proxy codec and includes deneuralization parameters. For example, the proxy codec may model a codec that is configured to omit image format conversion, such as color conversion and subsampling of the input image.

Although not shown in FIG. 10, proxy coding 1000 may include preprocessing, such as the preprocessing shown at 720 in FIG. 8. For example, proxy coding 1000 may include obtaining the input image at 1002 in an input image format that differs from the operative image format of the codec proxy, such as wherein neuralizing, such as the neuralizing shown at 920 in FIG. 9, is configured to output a neuralized input image, used as the input image at 1002, in the input image format, and proxy coding 1000 may include format conversion preprocessing, such as prior to clipping at 1010, to convert the input image from the input image format to the operative image format of the codec proxy. For example, the proxy codec may model a codec that is configured to perform image format conversion, such as color conversion and subsampling, to convert from an input image in an input image format, such as RGB 4:4:4, to an input image in the operative image format of the codec proxy, which may be Y'CbCr 4:2:0.

As shown in FIG. 10, proxy coding 1000 includes clipping at 1010. Clipping includes clipping, or limiting, the image data values, such as pixel values, to a range defined by, or associated with, the operative image format of the codec proxy, such as the range from zero to two hundred fifty five ([0, 255]). For example, obtaining a clipped value (f(x)) for an input value (x) may be expressed as (f(x)=max (0, min(255, x))). Other ranges may be used. For example, obtaining a clipped value (f(x)) for an input value (x) may be expressed as (f(x)=max(0, min(1023, x))). In some implementations, the image data values, such as pixel values, in the input image may be in the defined range and clipping at 1010 may be omitted.

Integer quantization at 1020 includes quantizing, or rounding, the input image data values, such as the per-channel pixel values, which may be floating point values, to integer values, as indicated by the step size of one (STEP-SIZE 1). For example, obtaining an integer value (f(x)) for an input value (x) may be expressed as (f(x)=round(x)). In some implementations, the image data values, such as pixel values, in the input image may be integer values and integer quantization at 1020 may be omitted.

Blocking at 1030 includes spatially partitioning the input image data into blocks, such as 8×8 blocks. The blocking at 1030 may be per-channel blocking. Other block sizes may be used, for example, block sizes as shown in FIG. 6 may be used.

On a per-block, and per-channel, basis, the input image data is transformed to the frequency, or transform, domain at 1040. For example, the transformation may include using a Discrete Cosine Transform, or another transform. The transformation may obtain a transform block, or matrix, of transform coefficients corresponding to a current block, and channel, from the input image data. For example, for a current channel, a current 8×8 block from the input image may be transformed to obtain a corresponding 8×8 transform block (X=X$_i$) of transform coefficients. The transformation at 1040 may be similar to the transformation shown at 420 in FIG. 4, except as is described herein or as is otherwise clear from context.

The transform block is proxy quantized at 1050. Proxy quantization at 1050 is implemented by a differentiable quantizer (quantizer proxy) to obtain distorted transform coefficients, which may be expressed as (X$_i$=Q(X$_i$)). The quantizer proxy may obtain the current transform block output by the transformation at 1040. The quantizer proxy implementing proxy quantization 1050 may obtain a quantization step size value as input (STEPSIZE Δ).

FIG. 10 shows examples of the quantizer proxy 1052, 1054, 1056. Other quantizer proxies may be used. For example, the quantizer proxy may implement soft quantization as shown at 1052, which may include using a soft quantizer Q(X$_i$), having a transfer characteristic that is a third-order polynomial spline. In another example, the quantizer proxy uses additive noise as shown at 1054, which may be expressed as (Q(X$_i$)=X$_i$+W$_i$), wherein (W$_i$) is independently and identically distributed, which may be expressed as $$\left( W_i \sim unif \left( -\frac{\Delta}{2}, \frac{\Delta}{2} \right) \right).$$

In another example, the quantizer proxy uses "straight-through" quantization as shown at 1056, which may be expressed as (Q(X$_i$)=X$_i$+stop_gradient(X$_i$)), wherein the quantization noise may be expressed as $$\left( W_i = \Delta \ round \left( \frac{X_i}{\Delta} \right) - X_i \right),$$

and wherein stop_gradient(·) indicates that propagation of gradients is omitted.

In the proxy quantization 1050 the derivative of ($\hat{X}_i$=Q (X$_i$)) with respect to (X$_i$) is nonzero or the set of discrete values of (X$_i$) have zero probability, indicating that a corresponding derivative is nonzero with a probability of one.

Proxy quantization 1050 is used to obtain non-trivial gradients of the distortion, which may be expressed as ($\|S-\hat{S}\|^2$), with respect to the neuralization, or deneuralization, parameters of the neuralized input image.

Proxy rate determination is performed at 1060 for the current block of transform coefficients, per-channel, to obtain a value indicative of the bitrate of encoding a corresponding block by the encoder of the modeled codec. The rate proxy implementing proxy rate determination 1060 (R(X)) may obtain the current transform block output by the transformation at 1040. The rate proxy implementing proxy rate determination 1060 may obtain a quantization step size value as input (STEPSIZE Δ), which is a trained parameter.

For example, the rate proxy implementing proxy rate determination 1060 (R(X)) for the block of transform coefficients (X=[X$_i$]) may include using an affine function, which may be expressed as (a$\|$X$\|$ $$X\|_2^2$$

+b), $(a\|X\|_1+b)$, or $(a\|X\|_0+b)$. For example, an affine function of the number, or set cardinality, of nonzero quantized transform coefficients, which may be expressed as $$\left(R(X) = a\sum_i \mathbb{1}\left\{|x_i| \ge \frac{\Delta}{2}\right\} + b\right),$$

is an accurate proxy for transform codes. The indicator function $$\left(\mathbb{1}\left\{|x_i| >= \frac{\Delta}{2}\right\}\right)$$

may be approximated using a smooth differentiable function, which may be expressed as $$\left(\log\left(1 + \frac{|x_i|}{\Delta}\right)\right).$$

Another example may be expressed as $$\left(\tanh\left(\frac{|x_i|}{\Delta}\right)\right).$$

For an input image, such as a neuralized input image, $(B=[x_k])$ including transform blocks $(x_k=[x_{k,i}])$, wherein a block includes transform coefficients $(x_{k,i})$ may be proxy quantized with step size $(\Delta)$, and the rate proxy may be expressed as the following:

$$R(B) = \sum_k R(x_k) \approx -\sum_{k,i} \log\left(p_{k,i}(x_{k,i})\Delta\right).$$

The transform coefficients $(x_{k,i})$ and the rate may be expressed as the following:

$$(x_{k,i}) \sim N\left(0, \sigma_{k,i}^2\right)$$

$$R(B) = a\sum_{k,i} x_{k,i}^2 + b)$$

$$a = \sum_{k,i} \frac{1}{2\sigma_{k,i}^2 \ln 2}$$

$$b = \sum_{k,i} \log_2\left(\frac{\sqrt{2\pi\sigma_{k,i}}}{\Delta}\right).$$

The transform coefficients $(x_{k,i})$ and the rate may be expressed as the following:

$$x_{k,i} \sim \text{Laplacian}(\tau_{k,i})$$

$$R(B) = a\sum_{k,i} |x_{k,i}| + b$$

-continued $$a = \sum_{k,i} \frac{1}{\tau_{k,i} \ln 2}$$

$$b = \sum_{k,i} \log_2\left(\frac{2\tau_{k,i}}{\Delta}\right).$$

The transform coefficients $(x_{k,i})$ and the rate may be expressed as the following:

$$x_{k,i} \curvearrowright p(x) = \begin{cases} c_0 & |x| < \frac{\Delta}{2} \\ c_1 & \text{otherwise} \end{cases}$$

$$R(B) = a\sum_{k,i} 1\left\{|x_{k,i}| \ge \frac{\Delta}{2}\right\} + b$$

$$a = \sum_{k,i} \frac{1}{\tau_{k,i} \ln 2}$$

$$b = \sum_{k,i} \log_2\left(\frac{2\tau_{k,i}}{\Delta}\right).$$

The value of (b) may be zero (b=0) and (a) may be determined for the input image, or input images with respect to the set of training data, (B) such that the rate proxy model represents, such as is equal to, the bitrate of the corresponding codec with respect to the corresponding image, which may be expressed as the following:

$$R(B) = a\sum_{k,i} \log\left(1 + \frac{|x_{k,i}|}{\Delta}\right) + b$$

$$a = \frac{CODEC(B, \Delta)}{\sum_{k,i} \log\left(1 + \frac{|x_{k,i}|}{\Delta}\right)}$$

$$b = 0.$$

The gradient of (R(B)) with respect to the neuralization, or deneuralization, parameters of the neuralized input image, may be determined using back-propagation.

The quantized and dequantized transform coefficients $(\hat{X})$ obtained at 1060 are inverse transformed at 1070 to obtain partially reconstructed image data values, such as pixel values, for the current block.

The partially reconstructed image data is deblocked at 1080 to obtain reconstructed image data, which is the reconstructed neuralized image output at 1004.

Although FIG. 10 shows an image coding proxy, the codec proxy may be a video coding proxy. For example, the codec proxy may include prediction coding proxies, such as a prediction encoding coding proxy, which may be similar to the intra/inter prediction unit 410 shown in FIG. 4, between blocking at 1030 and transformation at 1040, and a prediction decoding coding proxy, which may be similar the intra/inter prediction unit 540 shown in FIG. 5, between inverse transformation at 1070 and deblocking at 1080, except as is described herein or as is otherwise clear from context. Other image or video coding proxies may be used. For example, the codec proxy may be a trainable, differentiable function from a source image to Lagrange multipliers that emulate a codec.

FIG. 11 is a flowchart diagram of an example of a method of neural peri-codec optimization model training 1100 for video coding in accordance with implementations of this disclosure. Neural peri-codec optimization model training

1100 for video coding includes training the nonlinear processing model implementing the pre-codec portion (neuralizer) of neural peri-codec optimization, such as the neural peri-codec optimization 800 shown in FIG. 8, training the nonlinear processing model implementing the post-codec portion (deneuralizer) of neural peri-codec optimization, such as the neural peri-codec optimization 800 shown in FIG. 8, or training the neuralizer and the deneuralizer. The neural peri-codec optimization model training 1100 for video coding shown in FIG. 11 is similar to the neural peri-codec optimization model training 900 for image coding shown in FIG. 9, except as is described herein or as is otherwise clear from context. Neural peri-codec optimization model training 1100 for video coding, or a portion thereof, may be implemented by a computing device, such as the computing device 100 shown in FIG. 1 or one of the computing and communication devices 100A, 100B, 100C shown in FIG. 2.

FIG. 11 shows neural peri-codec optimization model training 1100 for video coding with respect to a first source frame $(I_i(0))$, a second source frame $(I_i(1))$, subsequent to the first source frame in the video (temporal order), and a third source frame $(I_i(2))$, subsequent to the second frame in the video (temporal order). As shown, the first source frame $(I_i(0))$ is intra-coded.

The first frame $(I_i(0))$ is neuralized at 1120.0 to obtain a first neuralized input frame $(L_i(0))$. The first neuralized input frame $(L_i(0))$ is a neural latent space representation of the source frame $(I_i(0))$, subsequent to neuralization at 1120.0, output by the neuralizer. The first neuralized input frame $(L_i(0))$ is stored for use by the neuralizer for neural peri-codec optimization model training 1100 for video coding with respect to the second source frame $(I_i(1))$ as indicated at 1122.1.

The first neuralized input frame $(L_i(0))$ is proxy coded at 1130.0. The codec proxy that implements proxy coding at 1130.0 obtains the first neuralized input frame $(L_i(0))$ output by the neuralizer at 1120.0 and step size value (A). For proxy coding the first neuralized input frame $(L_i(0))$, the step size value (4) may be a defined value, such as a manually defined value. For proxy coding images other than the first neuralized input frame $(L_i(0))$, the step size value (4) may be a trained value obtained by a previous iteration. The codec proxy that implements proxy coding at 1130.0 outputs a first rate value $(R_i(0))$ indicating the rate metric determined by proxy coding the first neuralized input frame $(L_i(0))$. The codec proxy that implements proxy coding at 1130.0 outputs a first reconstructed neuralized frame $(L_i(0))$. The first reconstructed neuralized frame $(\hat{L}_i(0))$ is used for motion compensation, as indicated at 1132.0, for coding the second source frame $(I_i(1))$.

The first reconstructed neuralized frame $(\hat{L}_i(0))$ is deneuralized at 1140.0 to obtain first reconstructed frame data, wherein the reconstructed frame data includes a first deneuralized reconstructed frame $(\hat{I}_i(0)$.

Analysis is performed at 1150.0 to obtain a value of a first distortion metric $(D_i(0))$. The analysis at 1150.0 includes obtaining, such as reading or otherwise accessing, the value of the first rate value $(R_i(0))$ output by proxy coding at 1130.0 and the first source frame $(I_i(0))$ as indicated by the broken directional arrow at 1152.0.

The second frame $(I_i(1))$ is neuralized at 1120.1 to obtain a second neuralized input frame $(L_i(1))$. The second neuralized input frame $(L_i(1))$ is a neural latent space representation of the second source frame $(I_i(1))$, subsequent to neuralization at 1120.1, output by the neuralizer. The second neuralized input frame $(L_i(1))$ is stored for use by the neuralizer for neural peri-codec optimization model training 1100 for video coding with respect to the third source frame $(I_i(2))$ as indicated at 1122.2.

A first motion compensated prediction for coding the second neuralized input frame $(L_i(1))$ is obtained by motion compensation (MC) using the first reconstructed neuralized frame $(\hat{L}_i(0))$ as a reference frame at 1132.1.

A first difference $(E_i(1))$ between the first motion compensated prediction and the second neuralized input frame $(L_i(1))$ is obtained as indicated at 1124.1.

The first difference $(E_i(1))$ is proxy coded at 1130.1. The codec proxy that implements proxy coding at 1130.1 obtains the first difference $(E_i(1))$ and the step size value (Δ). For proxy coding the second neuralized input frame $(L_i(1))$, the step size value (Δ) may be a trained value obtained by a previous iteration. The codec proxy that implements proxy coding at 1130.1 outputs a second rate value $(R_i(1))$ indicating the rate metric determined by proxy coding the second neuralized input frame $(L_i(1))$. The codec proxy that implements proxy coding at 1130.1 outputs a first reconstructed neuralized difference $(\hat{E}_i(1))$.

The first reconstructed neuralized difference $(\hat{E}_i(1))$ is added to the first motion compensated prediction at 1134.1 to obtain a second reconstructed neuralized frame $(\hat{L}_i(1))$, which is a reconstruction of the second neuralized input frame $(L_i(1))$.

The second reconstructed neuralized frame $(\hat{L}_i(1))$ is used for motion compensation, as indicated at 1132.2, for coding the third source frame $(I_i(2))$.

The second reconstructed neuralized frame $(\hat{L}_i(1))$ is deneuralized at 1140.1 to obtain second reconstructed frame data, wherein the second reconstructed frame data includes a second deneuralized reconstructed frame $(\hat{I}_i(1)$.

Analysis is performed at 1150.1 to obtain a value of a second distortion metric $(D_i(1))$. The analysis at 1150.1 includes obtaining, such as reading or otherwise accessing, the value of the second rate value $(R_i(1))$ output by proxy coding at 1130.1 and the second source frame $(I_i(1))$ as indicated by the broken directional arrow at 1152.1.

The third frame $(I_i(2))$ is neuralized at 1120.2 to obtain a third neuralized input frame $(L_i(2))$. The third neuralized input frame $(L_i(2))$ is a neural latent space representation of the third source frame $(I_i(2))$, subsequent to neuralization at 1120.2, output by the neuralizer. The third neuralized input frame $(L_i(2))$ is stored for use by the neuralizer for neural peri-codec optimization model training 1100 for video coding with respect to a subsequent frame of the video.

A second motion compensated prediction for coding the third neuralized input frame $(L_i(2))$ is obtained by motion compensation (MC) using the second reconstructed neuralized frame $(\hat{I}_i(1))$ as a reference frame at 1132.2.

A second difference $(E_i(2))$ between the second motion compensated prediction and the third neuralized input frame $(L_i(2))$ is obtained as indicated at 1124.2.

The second difference $(E_i(2))$ is proxy coded at 1130.2. The codec proxy that implements proxy coding at 1130.2 obtains the second difference $(E_i(2))$ and the step size value (Δ). For proxy coding the third neuralized input frame $(L_i(2))$, the step size value (Δ) may be a may be a trained value obtained by a previous iteration. The codec proxy that implements proxy coding at 1130.2 outputs a third rate value $(R_i(2))$ indicating the rate metric determined by proxy coding the third neuralized input frame $(L_i(2))$. The codec proxy that implements proxy coding at 1130.2 outputs a second reconstructed neuralized difference $(\hat{E}_i(2))$.

The second reconstructed neuralized difference $(E_i(2))$ is added to the second motion compensated prediction at 1134.2 to obtain a third reconstructed neuralized frame ($\hat{L}_i(2)$), which is a reconstruction of the third neuralized input frame ($L_i(2)$).

The third reconstructed neuralized frame ($\hat{L}_i(2)$) may be used for motion compensation for coding the subsequent frame.

The third reconstructed neuralized frame ($\hat{L}_i(2)$) is deneuralized at 1140.2 to obtain third reconstructed frame data, wherein the third reconstructed frame data includes a third deneuralized reconstructed frame ($\hat{I}_i(2)$).

Analysis is performed at 1150.2 to obtain a value of a third distortion metric ($D_i(2)$). The analysis at 1150.2 includes obtaining, such as reading or otherwise accessing, the value of the third rate value ($R_i(2)$) output by proxy coding at 1130.2 and the third source frame ($I_i(2)$) as indicated by the broken directional arrow at 1152.2. The neuralizer and deneuralizer are trained (optimized) to minimize the Lagrangian (J=D+λR) of the average distortion (D=$(1/N)\Sigma_n\Sigma_i D_i(t)$) and the average rate (R=$(1/N)\Sigma_n\Sigma_i R_i(t)$).

Figure 12:
FIG. 12 is a flowchart diagram of an example of a method of image coding with neural peri-codec optimization using a neural peri-codec model in accordance with implementations of this disclosure.
Figure 12:
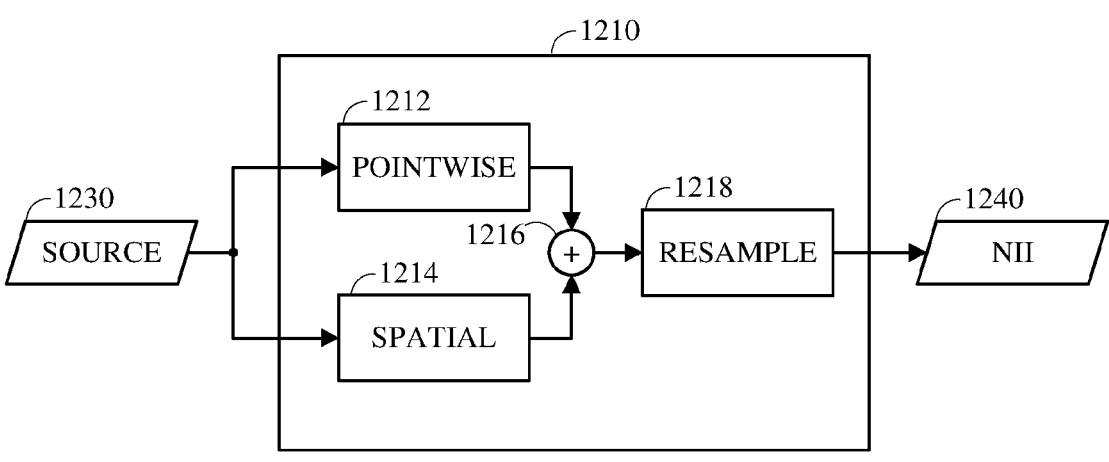
Figure 12:
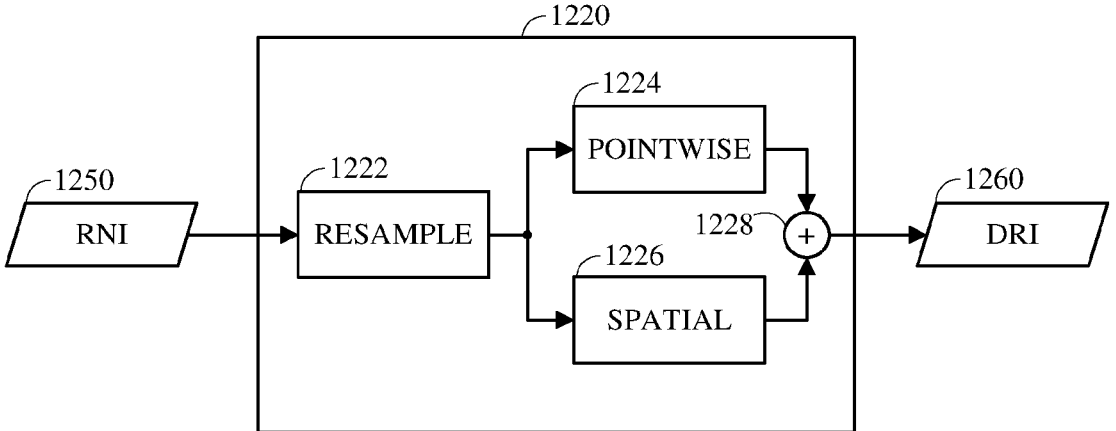

FIG. 12 is a flowchart diagram of an example of a method of image coding with neural peri-codec optimization using a neural peri-codec model 1200 in accordance with implementations of this disclosure. The neural peri-codec model 1200 includes a pre-codec neural peri-codec model 1210 and a corresponding post-codec neural peri-codec model 1220.

The neural peri-codec model 1200 is a trained model, such as trained as shown in FIG. 10 with respect to image coding or trained as shown in FIG. 11 with respect to video coding. The neural peri-codec model 1200 is configured and trained with respect to a target image format, which is the input image format of a target codec, such as the codec proxy 1000 shown in FIG. 10. The neural peri-codec model 1200 is used with a current codec (not expressly shown) that performs image, or video, coding, including encoding and decoding, such as a current codec implementing the video coding shown in FIGS. 4 and 5 or the image codec implementing image coding as shown in FIG. 7. The current codec may be an implementation of the target codec, the standards compliant codec represented by the target codec, or another, different, codec wherein the input image format of the different codec is compatible with the input image format of the target codec.

The neuralizer implementing the pre-codec neural peri-codec model 1210 may be implemented by a computing device, such as the computing device 100 shown in FIG. 1 or one of the computing and communication devices 100A, 100B, 100C shown in FIG. 2, for neuralizing a source image 1230 to obtain a neuralized input image 1240 (NII) to use as an input image for image, or video, coding.

The neuralizer implementing the pre-codec neural peri-codec model 1210 obtains the source image 1230 and sends, or otherwise makes available, the source image 1230 to the pre-codec neural peri-codec model 1210 for neuralization to obtain the neuralized input image 1240 to use as an input image for image, or video, coding. Obtaining the source image is similar to obtaining a source image as shown at 810 in FIG. 8, except as is described herein or as is otherwise clear from context. The source image is obtained in a source image format, which may differ from the target image format.

Figure 13:
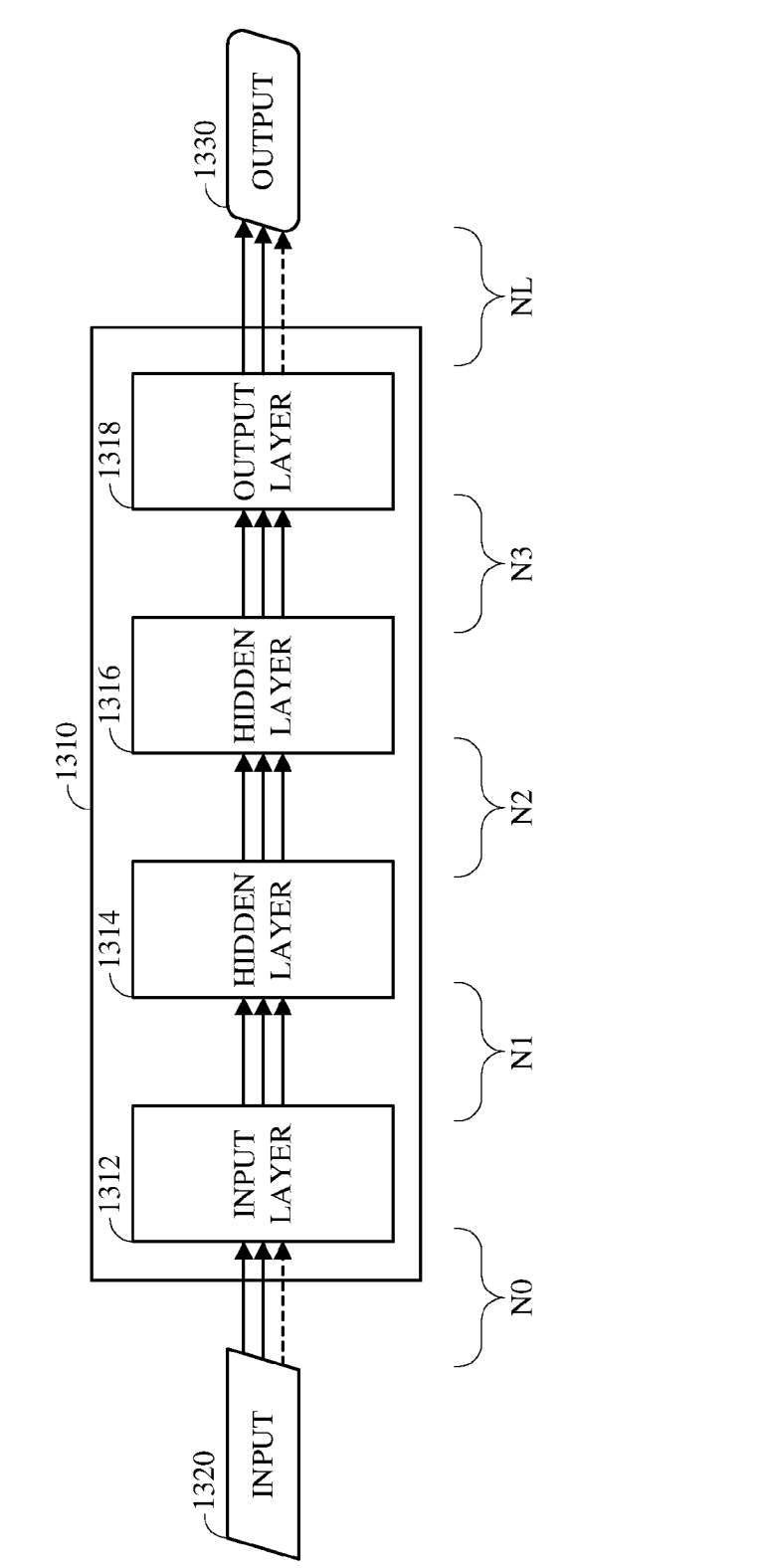
FIG. 13 is a flowchart diagram of an example of a pointwise portion of image coding with neural peri-codec optimization in accordance with implementations of this disclosure.

The pre-codec neural peri-codec model 1210 includes a pointwise machine learning model 1212. The pointwise machine learning model 1212 of the pre-codec neural peri-codec model 1210 receives, or otherwise accesses, the source image 1230 as input to the pointwise machine learning model 1212. The pointwise machine learning model 1212 processes the image data from the source image 1230 on a pointwise, or per-pixel, basis. An example of a pointwise machine learning model is shown in FIG. 13.

The pre-codec neural peri-codec model 1210 includes a spatial machine learning model 1214. The spatial machine learning model 1214 of the pre-codec neural peri-codec model 1210 receives, or otherwise accesses, the source image 1230 as input to the spatial machine learning model 1214. The spatial machine learning model 1214 processes the image data from the source image 1230 on a spatial, such as multi-pixel, basis. For example, the spatial machine learning model 1214 may be implemented as a U-Net, which may include a multi-resolution ladder of four steps, with five layers including the input layer, with channels doubling up the ladder from 32 to 512, which may include 3×3 convolutions, four multi-resolution layers, and approximately eight million weights. In some implementations, the spatial machine learning model 1214 may be omitted.

The output of the pointwise machine learning model 1212 (PMLM) and the output of the spatial machine learning model 1214 (SMLM) are combined, such as a linear combination, at 1216 to obtain an unconstrained neuralized input image. As used herein, the term "unconstrained neuralized input image" indicates the result of combining output of the pointwise machine learning model 1212 and the output of the spatial machine learning model 1214, which may be unconstrained with respect to an image characteristic, or image characteristics, or a combination of image characteristics, relative to the target image format. In some implementations, the spatial machine learning model 1214 and the term "unconstrained neuralized input image" indicates the output of the pointwise machine learning model 1212. The parameters of the linear combination at 1216 may be trained parameters, which may be expressed as x=PMLM(input)+α SMLM(input), wherein (α) is a trained scalar. In some implementations, the pointwise machine learning model 1212 and the spatial machine learning model 1214 may be represented as a combined model and the linear combination at 1216 may be omitted.

In some implementations, the unconstrained neuralized input image may be unconstrained with respect to resolution, indicating that the unconstrained neuralized input image has a resolution greater, in one or more spatial dimensions, than a maximum resolution of the target image format. For example, the unconstrained neuralized input image may have a resolution of 65,535×65,535 pixels and the target image format may have a maximum resolution of 8,192×4,320 pixels.

In some implementations, the unconstrained neuralized input image may be unconstrained with respect to bit depth, indicating that the unconstrained neuralized input image includes pixel values having a bit depth that is greater than a maximum bit depth of the target image format. For example, a pixel value in the unconstrained neuralized input image may have a bit depth of twelve bits and the target image format may have a maximum bit depth of eight bits.

In some implementations, the unconstrained neuralized input image may be unconstrained with respect to the cardinality of channels (non-zero channels) or the color component ratio, indicating that the cardinality of the set of channels of the unconstrained neuralized input image is greater than the cardinality of the set of channels of the target image format, or indicating that the resolution for one or more color channels of the unconstrained neuralized input image differs from the resolution for one or more color channels of the target image format. For example, the unconstrained neuralized input image may be expressed as a Y'CbCr 4:4:4 image and the target image format may be Y'CbCr 4:0:0 or Y'CbCr 4:2:0.

The unconstrained neuralized input image is resampled at 1218 to obtain the neuralized input image 1240. Although described as resampling, the resampling at 1218 may include resampling, such as chroma subsampling, cropping, rounding, or a combination thereof.

In some implementations, the resolution of the unconstrained neuralized input image may be greater than the maximum resolution available for the target image format, and resampling at 1218 may include resampling to obtain the neuralized input image 1240 at the maximum resolution available for the target image format, such as using interpolation. In some implementations, interpolation resampling may be omitted, and cropping may be used to obtain the neuralized input image 1240 at the maximum resolution available for the target image format.

In some implementations, the bit depth of the unconstrained neuralized input image may be greater than a maximum bit depth available for the target image format and resampling at 1218 may include resampling to obtain values having the bit depth of the target image format. For example, a pixel value in the unconstrained neuralized input image may have a bit depth of twelve bits, the target image format may have a maximum bit depth of eight bits, and the twelve bit values may be rounded, truncated, or otherwise converted, to eight bit values.

In some implementations, the unconstrained neuralized input image may be unconstrained with respect to the color component ratio, indicating that the resolution for one or more color channels of the unconstrained neuralized input image, such as a chroma channel, differs from the resolution for a corresponding color channel of the target image format, and resampling at 1218 may include resampling, such as chroma subsampling, the unconstrained neuralized input image data in accordance with the color component ratio of the target image format. For example, the unconstrained neuralized input image may be expressed as a Y'CbCr 4:4:4 image, the target image format may be Y'CbCr 4:2:0, and resampling at 1218 may include chroma subsampling of the Cb and Cr channels.

In some implementations, resampling at 1218 may be omitted and the combined output of the pointwise machine learning model 1212 and the spatial machine learning model 1214 may be the neuralized input image 1240.

The neuralizer implementing the pre-codec neural peri-codec model 1210 includes deneuralization parameters in the neuralized input image 1240. In some implementations, including the deneuralization parameters in the neuralized input image 1240 may be omitted.

Although not shown in FIG. 12, the neuralized input image 1240 is output by the neuralizer implementing the pre-codec neural peri-codec model 1210 and is obtained, such as received from the neuralizer implementing the pre-codec neural peri-codec model 1210, or otherwise accessed, by an encoder, such as the encoder 400 shown in FIG. 4 or the encoder portion of the image codec implementing image coding 830 as shown in FIG. 8, which includes the encoding shown at 730 in FIG. 8 and may include the preprocessing shown at 720 in FIG. 8, as an input image in the target image format, which is compatible with the input image format of the encoder; the input image, which is the neuralized input image 1240, is encoded by the encoder to obtain encoded image data, which includes the deneuralization parameters as image format data; the encoded image data, including the deneuralization parameters as image format data, is obtained by a decoder, such as the decoder 500 shown in FIG. 5 or the decoder portion of the image codec implementing image coding 830 as shown in FIG. 8, which includes the decoding shown at 740 in FIG. 8 and may include the postprocessing shown at 750 in FIG. 8; and the encoded image data is decoded by the decoder to obtain a reconstructed image, which is the reconstructed neuralized image 1250, including the deneuralization parameters as output image format data.

A deneuralizer implementing the post-codec neural peri-codec model 1220 may be implemented by a computing device, such as the computing device 100 shown in FIG. 1 or one of the computing and communication devices 100A, 100B, 100C shown in FIG. 2, for deneuralizing the reconstructed neuralized image 1250 (RNI) corresponding to the neuralized input image 1240 to obtain a deneuralized reconstructed image 1260 (DRI) that is a reconstruction of the source image 1230 in an output image format corresponding to the source image format.

The neuralizer implementing the post-codec neural peri-codec model 1220 obtains the reconstructed neuralized image 1250. Although not shown separately in FIG. 12, the neuralizer implementing the post-codec neural peri-codec model 1220 reads, or otherwise accesses, the deneuralization parameters from the reconstructed neuralized image 1250 and obtains the post-codec neural peri-codec model 1220, or a portion thereof, based on the deneuralization parameters. In some implementations, accessing the deneuralization parameters may be omitted and a defined post-codec neural peri-codec model 1220 may be used, such as in the absence of other post-codec neural peri-codec models, which may correspond with the absence of deneuralization parameters in the reconstructed neuralized image 1250.

The neuralizer implementing the post-codec neural peri-codec model 1220 sends, or otherwise makes available, the reconstructed neuralized image 1250 to the post-codec neural peri-codec model 1220 for deneuralization to obtain the deneuralized reconstructed image 1260 to output, such that the deneuralized reconstructed image 1260 is a reconstruction of the source image 1230.

In some implementations, the reconstructed neuralized image 1250 is subsampled relative to the output image format corresponding to the source image format, and the reconstructed neuralized image 1250 is resampled at 1222 to obtain a resampled reconstructed neuralized image. In some implementations, the resampling at 1222 may be omitted and the reconstructed neuralized image 1250 may be used as the resampled reconstructed neuralized image.

A pointwise machine learning model 1224 of the post-codec neural peri-codec model 1220 receives, or otherwise accesses, the resampled reconstructed neuralized image as input to the pointwise machine learning model 1224 of the post-codec neural peri-codec model 1220. The pointwise machine learning model 1224 of the post-codec neural peri-codec model 1220 processes the image data from the resampled reconstructed neuralized image on a pointwise, or per-pixel, basis.

A spatial machine learning model 1226 of the post-codec neural peri-codec model 1220 receives, or otherwise accesses, the resampled reconstructed neuralized image as input to the spatial machine learning model 1226 of the post-codec neural peri-codec model 1220. The spatial machine learning model 1226 of the post-codec neural peri-codec model 1220 processes the image data from the resampled reconstructed neuralized image on a spatial, such as multi-pixel, basis.

The output of the pointwise machine learning model 1224 of the post-codec neural peri-codec model 1220 and the output of the spatial machine learning model 1226 of the post-codec neural peri-codec model 1220 are combined, such as a linear combination, at 1228 to obtain the deneuralized reconstructed image 1260. The parameters of the linear combination at 1228 may be trained parameters, which may be expressed as x=PMLM(input)+$\alpha$ MLML (input), wherein ($\alpha$) is a trained scalar. In some implementations, trained scalar (a) at the linear combiner of the post-codec neural peri-codec model 1220 differs from the trained scalar (a) at the linear combiner of the pre-codec neural peri-codec model 1210. In some implementations, the pointwise machine learning model 1224 and the spatial machine learning model 1226 may be represented as a combined model and the linear combination at 1228 may be omitted.

The deneuralized reconstructed image 1260 is output for use, such as further processing or display, in accordance with the source image format.

FIG. 13 is a flowchart diagram of an example of a pointwise portion of image coding with neural peri-codec optimization 1300 in accordance with implementations of this disclosure. The pointwise portion of image coding with neural peri-codec optimization 1300 includes operating a pointwise machine learning model 1310. The pointwise machine learning model 1212 of the pre-codec neural peri-codec model 1210 and the pointwise machine learning model 1224 of the post-codec neural peri-codec model 1220 shown in FIG. 12 may respectively implement the pointwise machine learning model 1310.

A neural network model includes layers that respectively include connected units (nodes, perceptrons, or neurons) followed by nonlinearities. As used herein, the term neuron indicates an artificial neuron. A layer is a set of nodes, or neurons, in a neural network that process a set of input features, or the output of those neurons. The artificial neural network model describes the layers for organizing and arranging nodes, or neurons, in the artificial neural network, including an input layer, an output layer, and intermediate, internal, or hidden layers.

The artificial neural network model describes the nodes, or artificial neurons. A node, or neuron, in an artificial neural network may receive, or otherwise access, input values and may generate an output value. For example, a node, or neuron, may calculate the output value by applying an activation function (nonlinear transformation) to a weighted sum of input values. A node in an artificial neural network may be expressed as a mathematical function, which may include describing or defining one or more parameters or thresholds for the node. A node in an artificial neural network may receive one or more input signals, determine an internal state subsequent to, or in accordance with, receiving the input signals (activation), and output an output signal based on (such as using or responsive to) the input signals and the internal state. The input signals may be associated with respective weighting values. The artificial neural network model may describe or define the weighting values. For example, determining the internal state may include determining a weighted sum of the input signals, transforming the sum, such as using an activation or transform function, which may be a non-linear function, and outputting the transformation result, or a function (output function) thereof.

The input layer, or first layer, may receive, or otherwise access, input data for the neural network (features). The nodes of the artificial neural network input layer (input nodes) may receive the artificial neural network input data. Input data for a layer other than the input layer may be output data from another, adjacent, layer of the neural network. Nodes in adjacent layers may be interconnected along edges. The artificial neural network model may describe or define weighting values associated with respective edges. A hidden layer may be a synthetic layer in a neural network between an input layer and an output layer. The hidden layers may include an activation function, such as for training. The output layer, or final layer, may output data indicating an answer or prediction of the neural network, such as responsive to the input data accessed by the input layer. The activation function may be a function that may use a weighted sum of inputs from a previous layer to generate data, which may be nonlinear, which may be output (output value), such as to a subsequent layer. The output nodes in the output layer of the artificial neural network may output prediction values based on (such as using or responsive to) the received input values.

Neural peri-codec optimization may include using a convolutional neural network (CNN) model. A convolutional neural network may be a neural network in which a layer is a convolutional layer. A convolutional neural network may include multiple convolutional layers. In some embodiments, a convolutional neural network may include one or more convolutional layers, one or more pooling layers, one or more dense, or fully connected, layers, or a combination thereof. A convolutional neural network may be a deep neural network, which may be a neural network including multiple hidden layers.

A convolutional layer may be a layer of the neural network that applies a convolutional filter to an input matrix, which may include performing one or more convolutional operations. A convolutional filter is a matrix having the rank (ordinality) of the input matrix, but a smaller shape (element dimensions). The respective elements, or cells, of a convolutional filter matrix may be single digit binary values, such as zero or one, which may be initialized, such as randomly, and trained to optimize. A convolutional operation may include element-wise multiplication of the convolutional filter and a portion, or slice, of the input matrix having the same rank and size as the convolutional filter. The convolutional operation may include a summation of the matrix resulting from the element-wise multiplication. The convolutional layer may perform a respective convolutional operation for the respective portions, or slices, of the input matrix.

A pooling layer may be a layer of the neural network that reduces a matrix, or matrices, output by a previous convolutional layer, to a smaller matrix. For example, a pooling layer may determine a maximum, or average, value for a pooled area (pooling operation). A pooling operation may divide the matrix (convolutional output) into respective portions, which may overlap, such as partially, wherein the difference in matrix position for respective adjacent portions may be referred to as a stride.

A dense, or fully connected layer, may be a layer of the neural network, such as a hidden layer, in which a respective node is connected to the nodes in a subsequent hidden layer.

A convolutional neural network may be a multi-layer convolutional neural network having K×K weight matrices (kernels), which may include spatial processing, such as down-sampling, up-sampling, or modulation.

The pointwise machine learning model 1310 shown in FIG. 13 is an example of a multi-layer perceptron (MLP), or an equivalent series of 1×1 two-dimensional (2D) convolutional layers. Other pointwise machine learning models may be used.

The pointwise machine learning model 1310, which, as shown, is implemented as multi-layer perceptron that may be similar to a convolutional neural network having a 1×1 weight matrix (kernel), may operate pointwise, such as independently on a respective pixel. The pointwise machine learning model 1310 shown in FIG. 13 is a fully connected neural network.

The pointwise machine learning model 1310 includes a defined number, or cardinality, (L) of layers (1312, 1314, 1316, 1318). In the example shown in FIG. 13, the pointwise machine learning model 1310 includes four layers (L=4), including an input layer 1312, a first hidden layer 1314, a second hidden layer 1316, and an output layer 1318. In some notation, the input layer 1312 is uncounted such that the pointwise machine learning model 1310 shown in FIG. 13 may be referred to as having three layers (L=3), including the first hidden layer 1314, the second hidden layer 1316, and the output layer 1318.

The pointwise machine learning model 1310 obtains input 1320. The input may be image data corresponding to a respective pixel of an image, such as the source image 1230 shown in FIG. 12 or the resampled reconstructed neuralized image as input to the pointwise machine learning model 1224 of the post-codec neural peri-codec model 1220 shown in FIG. 12. The input data 1320 has a first defined number, or cardinality, of channels (NO).

The pointwise machine learning model 1310 generates output image data 1330 responsive to the input image data 1320. The output image data 1330 has a second defined number, or cardinality, of channels (NL). The second defined number, or cardinality, of channels (NL) may differ from the first defined number, or cardinality, of channels (NO).

The pointwise machine learning model 1310 includes a defined number, or cardinality, of intermediate channels (N1, . . . , NL−1).

The pointwise machine learning model 1310 includes a defined number, or cardinality, of weight matrices (W0, . . . , WL−1). The defined number, or cardinality, of weight matrices (W0, . . . , WL−1) may be equivalent to the defined number, or cardinality, of layers (L). A weight matrix (kernel), such as the weight matrix W1, has dimensions N1+1N1.

The pointwise machine learning model 1310 includes a defined number, or cardinality, of bias vectors (b0, . . . , bL−1). The defined number, or cardinality, of bias vectors (b0, . . . , bL−1) may be equivalent to the defined number, or cardinality, of layers (L). A bias vector, such as the bias vector b1, has dimensions N1+1.

The pointwise machine learning model 1310 uses an activation function, such as a sinusoidal activation function. In some implementations, data, such as an integer value, indicating the activation function, such as an index value indicating an activation function from an indexed or enumerated set or table of defined activation functions may be included in the neuralization parameters.

The pointwise machine learning model 1310 shown in FIG. 13 includes four layers, two input channels, three output channels, and three intermediate channels, which may be expressed as (N0,N1,N2,N3)=(2,3,3,3)).

The number, or cardinality, of the set of deneuralization parameters for the pointwise machine learning model 1310 may be small relative to the number, or cardinality, of a set of parameters for a codec that implements machine learning. For example, using pointwise portion of image coding with neural peri-codec optimization 1300 for coding normal map images may reduce bitrate by more than thirty percent, relative to image coding in the absence of neural peri-codec optimization, with equivalent distortion.

The pointwise machine learning model 1310 shown in FIG. 13 has 36 parameters, which may be conveyed as 36 floating point or fixed-point numbers.

The operational cost, or processing resource utilization, of the pointwise machine learning model 1310 is approximately equal to the number, or cardinality, of parameters of the pointwise machine learning model 1310, per pixel. For example, the operational cost, or resource utilization, of the pointwise machine learning model 1310 shown in FIG. 13 is approximately 30 multiply-add operations per pixel.

Figure 14:
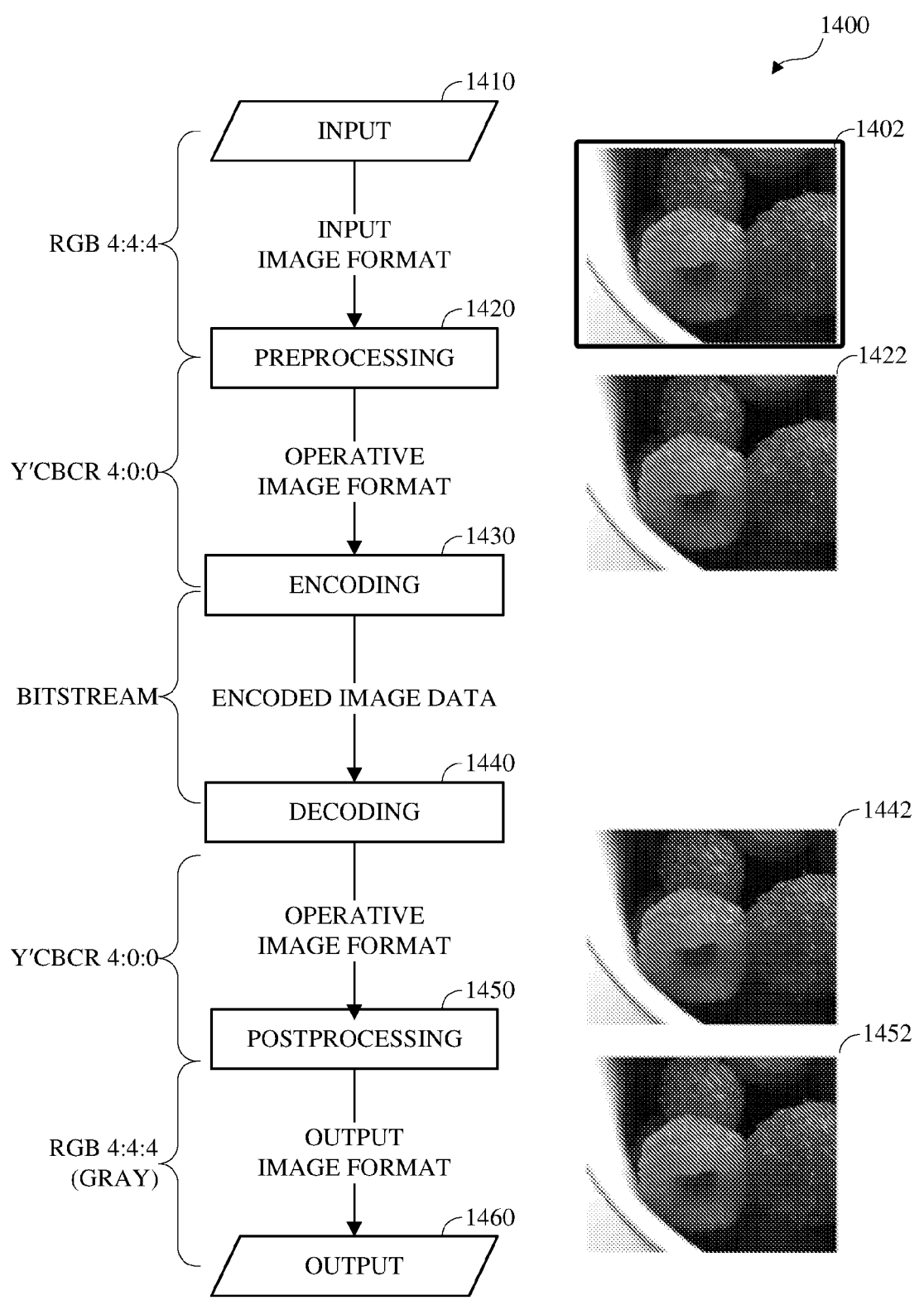
FIG. 14 is a flowchart diagram of an example of using image coding in accordance with implementations of this disclosure.

FIG. 14 is a flowchart diagram of an example of using image coding 1400 in accordance with implementations of this disclosure. The image coding 1400 is similar to the image coding 700 shown in FIG. 7, except as is described herein or as is otherwise clear from context. Image coding 1400 as shown in FIG. 14 omits neural peri-codec optimization.

Image coding 1400 includes obtaining an input image in an input image format 1402 at 1410, preprocessing the input image in the input image format at 1420 to obtain the input image in the operative image format of the codec 1422, encoding the input image in the operative image format of the codec 1422 at 1430 to obtain encoded image data, decoding the encoded image data at 1440 to obtain a reconstructed image in the operative image format of the codec 1442, postprocessing the reconstructed image in the operative image format of the codec 1442 at 1450 to obtain a reconstructed image in an output image format 1452, and output at 1460.

The input image in the input image format 1402 is obtained at 1410. The input image in the input image format 1402 has a defined color space, such as RGB 4:4:4. The input image in the input image format 1402 has a defined input image bit-depth, such as 8-bit. The input image in the input image format 1402 has a defined input image spatial size, such as resolution, aspect ratio, or both, which may be 65,535×65,535 pixels. Although input image in the input image format 1402 is an RGB 4:4:4 image that includes color, such as red for the raspberries depicted, a grayscale representation of the input image in the input image format 1402 is shown in FIG. 14 with a bold border to indicate that the input image 1402 is a color image. The input image in the input image format 1402 includes input image format data that defines or describes the input image format, or one or more aspects thereof, such as image data semantics thereof.

The input image in the input image format 1402 is color conversion preprocessed at 1420 to obtain the input image in the operative image format of the codec 1422. In the example shown in FIG. 14, the operative image format of the codec is Y'CbCr 4:0:0 with a bit-depth of 8-bits and an image size of 65,535×65,535 pixels. The color conversion preprocessing at 1420 is lossy such with respect to color information. The input image in the operative image format of the codec 1422 is shown in FIG. 14 without a border to indicate that the input image in the operative image format of the codec 1422 is a grayscale image. The input image in the operative image format of the codec 1422 is substantially similar, such as perceptually similar, to the input image in the input image format 1402, except that the input image in the input image format 1402 is a color image and the input image in the operative image format of the codec 1422 is a grayscale image.

Although not expressly shown in FIG. 14, the input image in the operative image format of the codec 1422 includes image format data for image format conversion from the operative image format of the codec to the output image format corresponding to the input image format.

The input image in the operative image format of the codec 1422 is encoded, by the encoder of the codec, at 1430 to obtain encoded image data. The encoding at 1430 includes including, in the encoded image data, such as in a header for the image, the image format data for image format conversion from the operative image format of the codec to the output image format corresponding to the input image format, which is obtained from, or identified for, the input image in the operative image format of the codec 1422.

The encoded image data is decoded at 1440 to obtain a reconstructed image in the operative image format of the codec 1442, which is Y'CbCr 4:0:0. Although the codec, such as the encoding at 1430 and the decoding at 1440, may be lossy and may introduce distortion, the reconstructed image in the operative image format of the codec 1442 is otherwise substantially similar to the input image in the operative image format of the codec 1422. The decoding at 1440 includes decoding, from the encoded bitstream, such as from a header for the encoded image, the image format data for image format conversion from the operative image format of the codec to the output image format corresponding to the input image format. The decoding at 1440 includes including, in the reconstructed image in the operative image format of the codec 1442, such as in a header thereof, the image format data for image format conversion from the operative image format of the codec to the output image format corresponding to the input image format. The reconstructed image in the operative image format of the codec 1442 is shown in FIG. 14 without a border to indicate that the reconstructed image in the operative image format of the codec 1442 is a grayscale (Y'CbCr 4:0:0) image.

The reconstructed image in the operative image format of the codec 1442 is postprocessed at 1450 to obtain the reconstructed image in the output image format 1452. The postprocessing at 1450 uses the image format data for image format conversion from the operative image format of the codec to the output image format corresponding to the input image format. For example, the postprocessor that implements postprocessing at 1450 may read, or otherwise access, from the reconstructed image in the operative image format of the codec 1442, such as from the header thereof, the image format data for image format conversion from the operative image format of the codec to the output image format corresponding to the input image format. In the absence of the image format data for image format conversion from the operative image format of the codec to the output image format corresponding to the input image format, accurate conversion from the operative image format of the codec to the output image format may be unavailable. Although the reconstructed image in the output image format 1452 is an RGB 4:4:4 image, the reconstructed image in the output image format 1452 is shown in FIG. 14 without a border to indicate that the reconstructed image in the output image format 1452 appears to be a grayscale image, wherein the RGB color values of the reconstructed image in the output image format 1452 combine to form white, black, and shades of gray.

The reconstructed image in the output image format 1452 is substantially similar to, such as perceptually indistinguishable from, the reconstructed image in the operative image format of the codec 1442. Although the codec, such as the encoding at 1430 and the decoding at 1440, may be lossy and may introduce distortion, the reconstructed image in the output image format 1452 is otherwise substantially similar to the input image in the operative image format of the codec 1422.

The reconstructed image in the output image format 1452 is substantially similar to the input image in the input image format 1402, except for image detail lost or distorted by the codec and that the input image in the input image format 1402 is, and appears to be, a color image having color values other that white, black, and shades of gray, and the reconstructed image in the output image format 1452 appears to be a grayscale image, wherein the RGB color values of the reconstructed image in the output image format 1452 combine to form white, black, and shades of gray.

Figure 15:
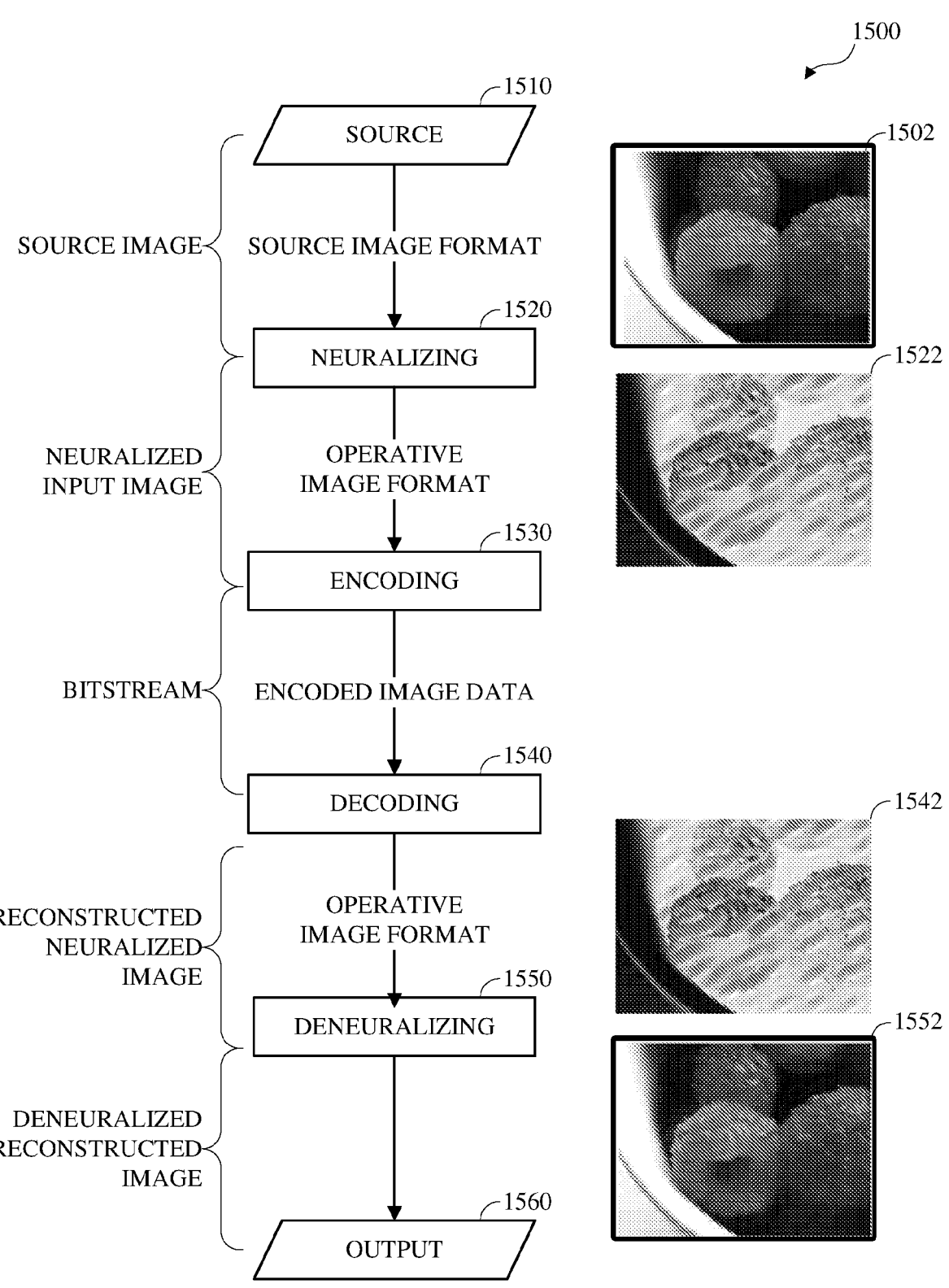
FIG. 15 is a flowchart diagram of an example of using neural peri-codec optimization with image coding in accordance with implementations of this disclosure.

FIG. 15 is a flowchart diagram of an example of using neural peri-codec optimization with image coding 1500 in accordance with implementations of this disclosure. The neural peri-codec optimization with image coding 1500 is similar to the neural peri-codec optimization 800 with image coding shown in FIG. 8, except as is described herein or as is otherwise clear from context.

Neural peri-codec optimization with image coding 1500 includes obtaining a source image in a source image format 1502 at 1510, neuralizing the source image at 1520 to obtain a neuralized input image in the operative image format of the codec 1522, encoding the neuralized input image in the operative image format of the codec 1522 at 1530 to obtain encoded image data, decoding the encoded image data at 1540 to obtain a reconstructed neuralized image in the operative image format of the codec 1542, deneuralizing the reconstructed neuralized image in the operative image format of the codec 1542 at 1550 to obtain a deneuralized reconstructed image in an output image format 1552, and output at 1560. Although described with respect to an image, neural peri-codec optimization with image coding 1500 may be used for groups or sequences of images, such as for a video. Neural peri-codec optimization with image coding 1500 includes neural peri-codec optimization used with image coding. The image coding is represented in FIG. 15 by encoding at 1530 and decoding at 1540 in FIG. 15, and is implemented by a codec as described herein, including an encoder, such as the encoder 400 shown in FIG. 4, and a decoder, such as the decoder 500 shown in FIG. 5, operating in coordination.

The source image in the source image format 1502 is obtained at 1510. The source image in the source image format 1502 has a defined color space, such as RGB 4:4:4. The source image in the source image format 1502 has a defined source image bit-depth, such as 8-bit. The source image in the source image format 1502 has a defined source image spatial size, such as resolution, aspect ratio, or both, which may be 65,535×65,535 pixels. Although the source image in the source image format 1502 is an RGB 4:4:4 image that includes color, such as red for the raspberries depicted, a grayscale representation of the source image in the source image format 1502 is shown in FIG. 15 with a bold border to indicate that the source image in the source image format 1502 is, and appears to be, a color image. In some implementations, the source image in the source image format 1502 may include source image format data that defines or describes the source image format, or one or more aspects thereof, such as image data semantics thereof.

The source image in the source image format 1502 is neuralized at 1520 to obtain a neuralized input image in the operative image format of the codec 1522. In the example shown in FIG. 15, the neuralized input image in the operative image format of the codec 1522 is output by neuralization at 1520 in the operative image format of the codec. In the example shown in FIG. 15, the operative image format of the codec is Y'CbCr 4:0:0 with a bit-depth of 8-bits and an image size of 65,535×65,535 pixels. Although the bit-depth of the source image is 8-bits and the bit-depth of the operative image format is 8-bits in the example shown in FIG. 15, the bit-depth of the source image may differ from the bit-depth of the operative image format. Although the image size of the source image is 65,535×65,535 pixels and the image size of the operative image format is 65,535×65,535 pixels in the example shown in FIG. 15, the image size of the source image may differ from the image size of the operative image format.

In the example shown in FIG. 15, the neuralized input image in the operative image format of the codec 1522 includes neural latent space image data that has low-frequency patterns that modulate the color information from the RGB 4:4:4 source image into the grayscale Y'CbCr 4:0:0 image format output by the neuralizer at 1520. The neuralized input image in the operative image format of the codec 1522 is shown in FIG. 15 without a border to indicate that the neuralized input image in the operative image format of the codec 1522 is a grayscale image. The neuralized input image in the operative image format of the codec 1522 output by the neuralizer at 1520 differs substantially from the source image in the source image format 1502.

Although not expressly shown in FIG. 15, the neuralized input image in the operative image format of the codec 1522 may include a deneuralization parameter, or parameters, identified, and included in the neuralized input image in the operative image format of the codec 1522, such as in a header for the image, by the neuralizer at 1520. In some implementations, the source image format data, or a portion thereof, from the source image in the source image format 1502 is omitted, by the neuralizer at 1520, from the neuralized input image in the operative image format of the codec 1522.

The neuralized input image in the operative image format of the codec 1522 is encoded, by the encoder of the codec, at 1530 to obtain encoded image data. The encoding at 1530 includes including, in the encoded image data, such as in a header for the image, the deneuralization parameter, or parameters, obtained from the neuralized input image in the operative image format of the codec 1522.

The encoded image data is decoded at 1540 to obtain a reconstructed neuralized image in the operative image format of the codec 1542, which is Y'CbCr 4:0:0. Although the codec, such as the encoding at 1530 and the decoding at 1540, may be lossy and may introduce distortion, the reconstructed neuralized image in the operative image format of the codec 1542 is otherwise substantially similar to the neuralized input image in the operative image format of the codec 1522. The reconstructed neuralized image in the operative image format of the codec 1542 is shown in FIG. 15 without a border to indicate that the reconstructed neuralized image in the operative image format of the codec 1542 is a grayscale (Y'CbCr 4:0:0) image. The reconstructed neuralized image in the operative image format of the codec 1542 includes the neural latent space image data, subject to information loss or distortion introduced by the codec, such as by encoding at 1530 and decoding at 1540, corresponding to the neural latent space image data of the neuralized input image in the operative image format of the codec 1522. Decoding at 1540 includes decoding, from the encoded bitstream, such as from a header for the encoded image, the deneuralization parameter, or parameters. Decoding at 1540 includes including, in the reconstructed neuralized image in the operative image format of the codec 1542, such as in a header thereof, the deneuralization parameter, or parameters.

The reconstructed neuralized image in the operative image format of the codec 1542 may omit image format data for image format conversion from the operative image format of the codec to the output image format corresponding to the source image format. In the absence of the image format data for image format conversion from the operative image format of the codec to the output image format corresponding to the source image format, accurate conversion from the operative image format of the codec to the output image format may be unavailable, other than as implemented by the deneuralization at 1550.

The reconstructed neuralized image in the operative image format of the codec 1542 is deneuralized at 1550 to obtain the deneuralized reconstructed image in the output image format 1552. The deneuralizing at 1550 uses the deneuralization parameter, or parameters. For example, the deneuralizer that implements deneuralizing at 1550 may read, or otherwise access, from the reconstructed neuralized image in the operative image format of the codec 1542, such as from the header thereof, the deneuralization parameter, or parameters.

The deneuralizer that implements deneuralizing at 1550 generates, configures, or both, the deneuralization neural network in accordance with the deneuralization parameter, or parameters and uses the deneuralization neural network to deneuralize the reconstructed neuralized image in the operative image format of the codec 1542. Deneuralizing the reconstructed neuralized image in the operative image format of the codec 1542 demodulates the neural latent space patterns to reconstruct the color image data. In some implementations, the reconstructed neuralized image in the operative image format of the codec 1542 may include blocking errors or other coding distortion that may be mitigated, such as reduced or removed, by the deneuralization at 1550, which may omit express coding distortion reduction.

As shown in FIG. 15, the deneuralized reconstructed image in the output image format 1552 is, and appears to be, an RGB 4:4:4 image. The deneuralized reconstructed image in the output image format 1552 is shown with a bold border to indicate that the deneuralized reconstructed image in the output image format 1552 is, and appears to be, a color image. For example, the deneuralized reconstructed image in the output image format 1552 includes color, such as red for the raspberries depicted, substantially similar to the color of the source image in a source image format 1502. The deneuralized reconstructed image in the output image format 1552 is substantially similar to, substantially similar to the source image in a source image format 1502.

Figure 16:
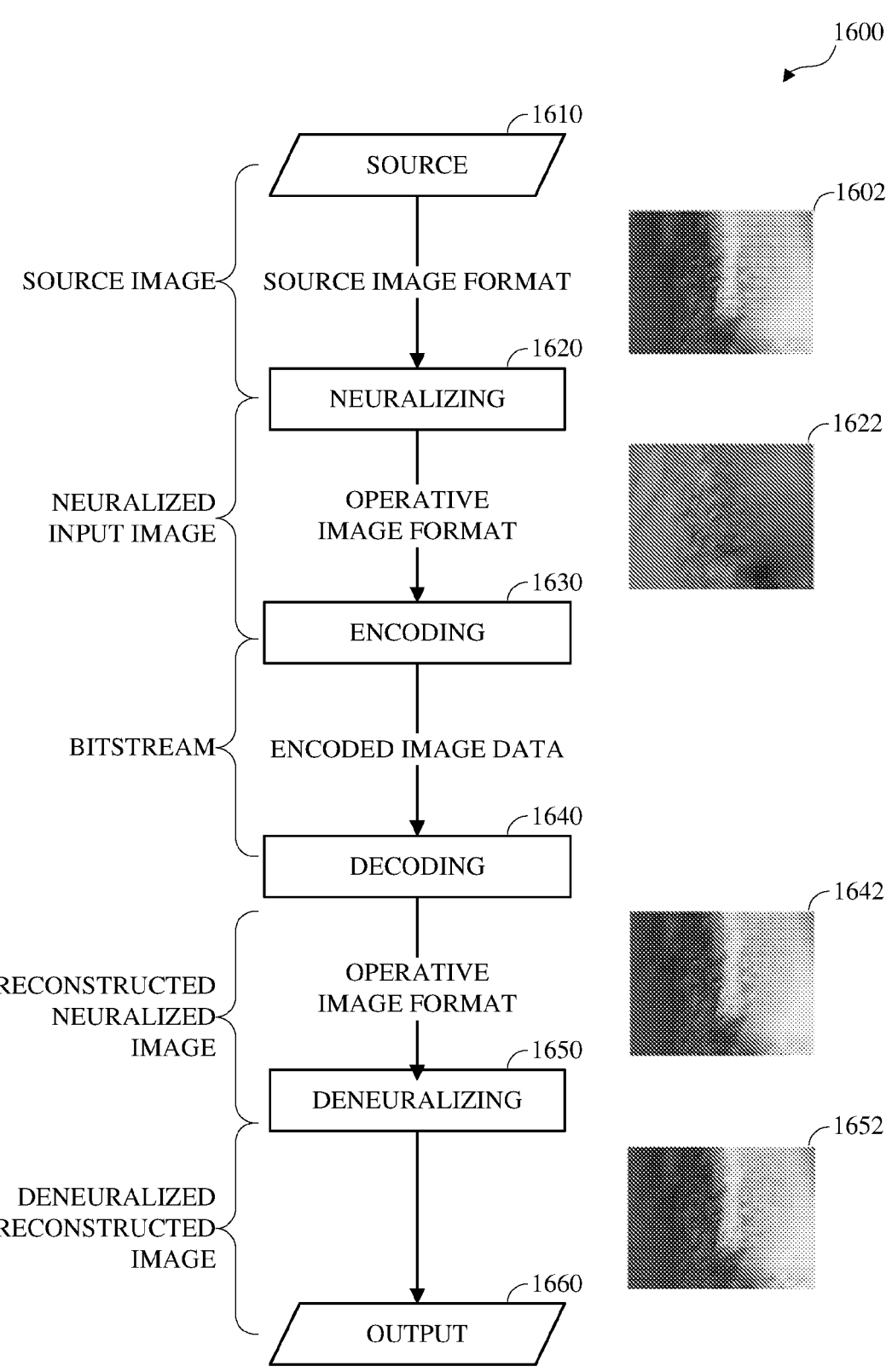
FIG. 16 is a flowchart diagram of another example of using neural peri-codec optimization with image coding in accordance with implementations of this disclosure.

FIG. 16 is a flowchart diagram of another example of using neural peri-codec optimization with image coding 1600 in accordance with implementations of this disclosure. The neural peri-codec optimization with image coding 1600 is similar to the neural peri-codec optimization with image coding 1500 shown in FIG. 15, except that the source image is a normal map image and the operative image format of the codec is RGB 4:4:4.

Neural peri-codec optimization with image coding 1600 includes obtaining a source image in a source image format 1602 at 1610, neuralizing the source image at 1620 to obtain a neuralized input image in the operative image format of the codec 1622, encoding the neuralized input image in the operative image format of the codec 1622 at 1630 to obtain encoded image data, decoding the encoded image data at 1640 to obtain a reconstructed neuralized image in the operative image format of the codec 1642, deneuralizing the reconstructed neuralized image in the operative image format of the codec 1642 at 1650 to obtain a deneuralized reconstructed image in an output image format 1652, and output at 1660. Although described with respect to an image, neural peri-codec optimization with image coding 1600 may be used for groups or sequences of images, such as for a video. Neural peri-codec optimization with image coding 1600 includes neural peri-codec optimization used with image coding. The image coding is represented in FIG. 16 by encoding at 1630 and decoding at 1640 in FIG. 16, and is implemented by a codec as described herein, including an encoder, such as the encoder 400 shown in FIG. 4, and a decoder, such as the decoder 500 shown in FIG. 5, operating in coordination.

Using neural peri-codec optimization, such as the neural peri-codec optimization with image coding 1600 shown in FIG. 16, may improve the efficiency of image coding, such as by 15-35 percent. For example, image coding, in the absence of neural peri-codec optimization, normal map images, wherein the operative image format of the codec is RGB 4:4:4 may have an aggregate signal-to-noise ratio of 32.2 dB at a bit rate of 0.8 bits per pixel, and neural peri-codec optimization with image coding 1600 of the normal map images may wherein the operative image format of the codec is RGB 4:4:4 may have an aggregate signal-to-noise ratio of 34.2 dB at a bit rate of 0.8 bits per pixel.

Figure 17:
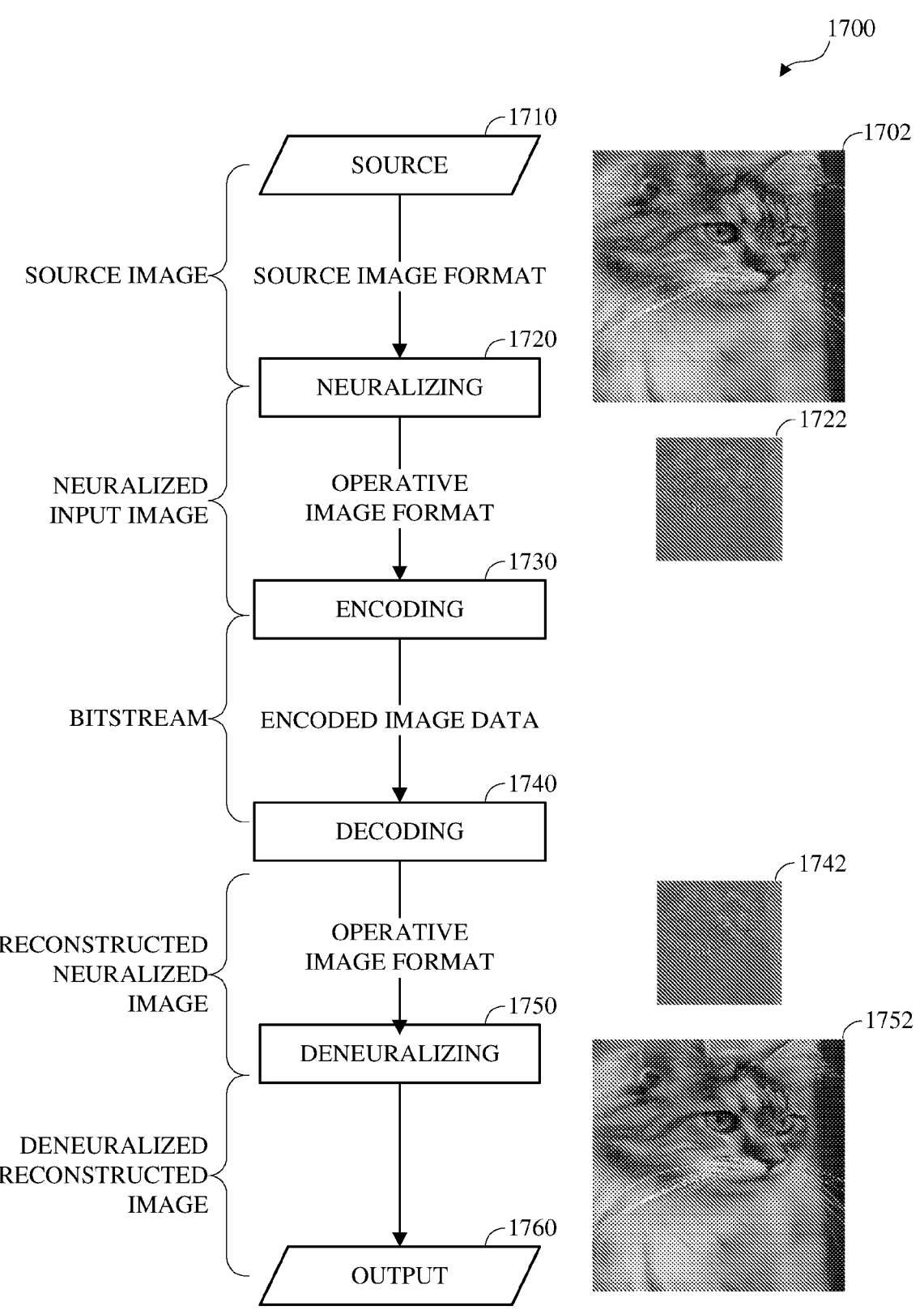
FIG. 17 is a flowchart diagram of another example of using neural peri-codec optimization with image coding in accordance with implementations of this disclosure.

FIG. 17 is a flowchart diagram of another example of using neural peri-codec optimization with image coding 1700 in accordance with implementations of this disclosure. The neural peri-codec optimization with image coding 1700 is similar to the neural peri-codec optimization with image coding 1500 shown in FIG. 15, except as is described herein or as is otherwise clear from context.

Neural peri-codec optimization with image coding 1700 includes obtaining a source image in a source image format 1702 at 1710, neuralizing the source image at 1720 to obtain a neuralized input image in the operative image format of the codec 1722, encoding the neuralized input image in the operative image format of the codec 1722 at 1730 to obtain encoded image data, decoding the encoded image data at 1740 to obtain a reconstructed neuralized image in the operative image format of the codec 1742, deneuralizing the reconstructed neuralized image in the operative image format of the codec 1742 at 1750 to obtain a deneuralized reconstructed image in an output image format 1752, and output at 1760. Although described with respect to an image, neural peri-codec optimization with image coding 1700 may be used for groups or sequences of images, such as for a video. Neural peri-codec optimization with image coding 1700 includes neural peri-codec optimization used with image coding. The image coding is represented in FIG. 17 by encoding at 1730 and decoding at 1740 in FIG. 17, and is implemented by a codec as described herein, including an encoder, such as the encoder 400 shown in FIG. 4, and a decoder, such as the decoder 500 shown in FIG. 5, operating in coordination.

The source image in the source image format 1702 has a defined color space, such as Y'CbCr 4:4:4. The source image in the source image format 1702 has a defined source image bit-depth, such as 8-bit. The source image in the source image format 1702 has a defined source image spatial size, such as resolution, aspect ratio, or both, which may be 65,535×65,535 pixels. Although the source image in the source image format 1702 is an Y'CbCr 4:4:4 image that includes color, a grayscale representation of the source image in the source image format 1702 is shown in FIG. 17.

For example, the pixels of the source image in the source image format 1702 are predominately shades of tan such that the average color value of the source image in the source image format 1702 is RGB (177, 128, 99).

In the example shown in FIG. 17, the operative image format of the codec is Y'CbCr 4:4:4 with a bit-depth of 8-bits and an image size that is substantially smaller that the spatial image size of the source image, such as half of the spatial size of the source image horizontally and vertically. Although the neuralized input image in the operative image format of the codec 1722 is an Y'CbCr 4:4:4 image that includes color, a grayscale representation of the neuralized input image in the operative image format of the codec 1722 is shown in FIG. 17. The neuralized input image in the operative image format of the codec 1722 differs substantially from the source image in the source image format 1702. The spatial size of the neuralized input image in the operative image format of the codec 1722 is half, horizontally and vertically, of the spatial size of the source image in the source image format 1702. The color values of the neuralized input image in the operative image format of the codec 1722 differ substantially from the color values of the source image in the source image format 1702. For example, the pixels of the neuralized input image in the operative image format of the codec 1722 are predominately shades of red and green such that the average color value of the source image in the source image format 1702 is RGB (122, 116, 126). The neuralized input image in the operative image format of the codec 1722 includes information for generating a reconstructed image having a relatively high quality, or low distortion, similar to encoding the source image in the source image format 1702 using a codec having an operative image format similar to the source image format, and the neuralized input image in the operative image format of the codec 1722 is perceptually unrecognizable, or nearly unrecognizable, as corresponding to the source image in the source image format 1702.

The reconstructed neuralized image in the operative image format of the codec 1742 is substantially similar to the neuralized input image in the operative image format of the codec 1722, subject to information loss or distortion introduced by the codec. Although the reconstructed neuralized image in the operative image format of the codec 1742 is an Y'CbCr 4:4:4 image that includes color, a grayscale representation of the reconstructed neuralized image in the operative image format of the codec 1742 is shown in FIG. 17.

The deneuralized reconstructed image in the output image format 1752 differs substantially from the reconstructed neuralized image in the operative image format of the codec 1742. The deneuralized reconstructed image in the output image format 1752 is substantially similar to the source image in the source image format 1702.

The spatial size of the deneuralized reconstructed image in the output image format 1752 is double, horizontally and vertically, of the spatial size of the neuralized input image in the operative image format of the codec 1722. The spatial size of the deneuralized reconstructed image in the output image format 1752 is equivalent to the spatial size of the source image in the source image format 1702.

The color values of the deneuralized reconstructed image in the output image format 1752 differ substantially from the color values of the neuralized input image in the operative image format of the codec 1722. The color values of the deneuralized reconstructed image in the output image format 1752 are substantially similar to the color values of the source image in the source image format 1702. For example, the average color value of the deneuralized reconstructed image in the output image format 1752 is the shade of tan, such as RGB (177, 128, 99). Although the deneuralized reconstructed image in the output image format 1752 is an Y'CbCr 4:4:4 image that includes color, a grayscale representation of the reconstructed deneuralized reconstructed image in the output image format 1752 is shown in FIG. 17.

Figure 18:
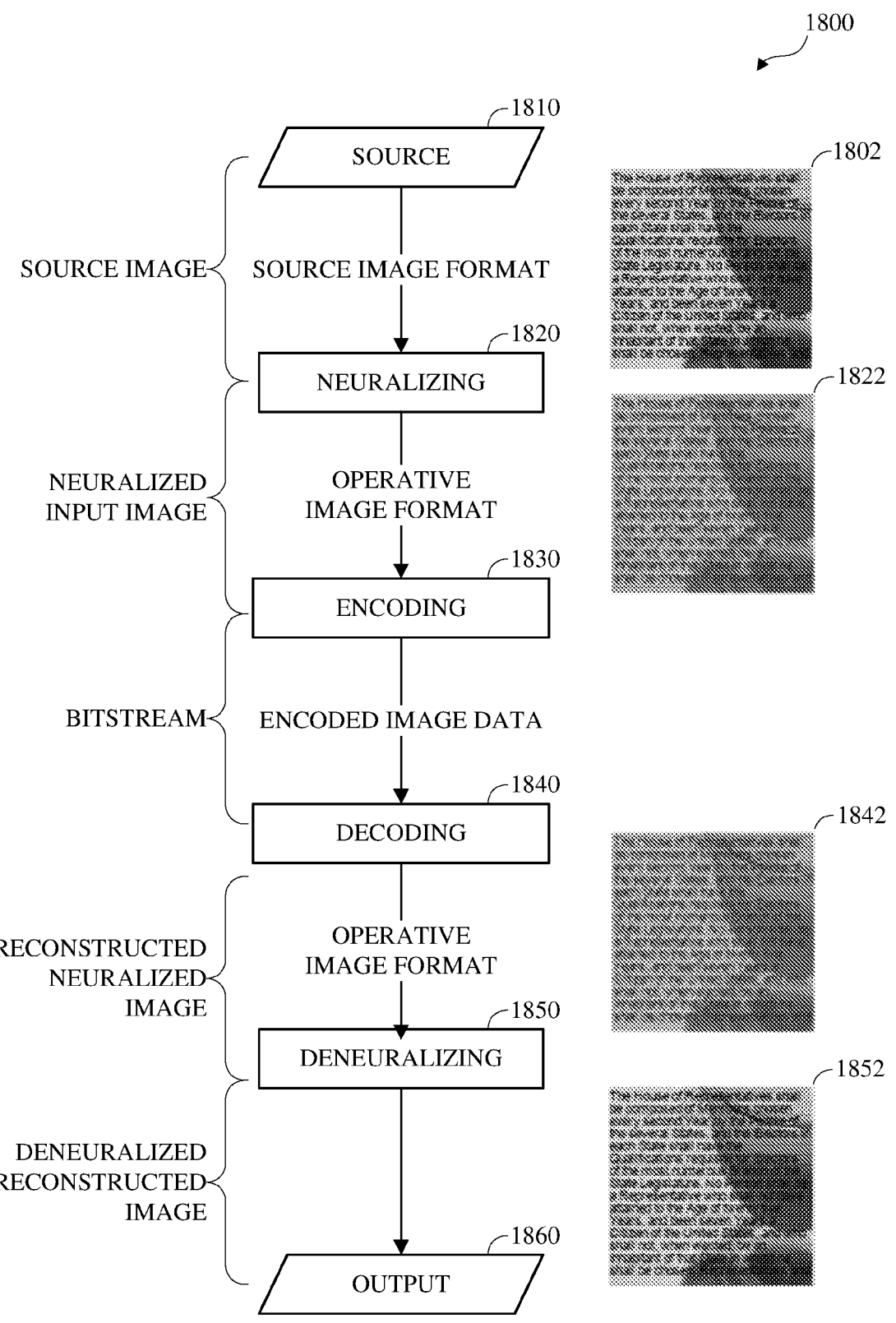
FIG. 18 is a flowchart diagram of another example of using neural peri-codec optimization with image coding in accordance with implementations of this disclosure.

FIG. 18 is a flowchart diagram of another example of using neural peri-codec optimization with image coding 1800 in accordance with implementations of this disclosure. The neural peri-codec optimization with image coding 1800 is similar to the neural peri-codec optimization with image coding 1500 shown in FIG. 15, except as is described herein or as is otherwise clear from context.

Neural peri-codec optimization with image coding 1800 includes obtaining a source image in a source image format 1802 at 1810, neuralizing the source image at 1820 to obtain a neuralized input image in the operative image format of the codec 1822, encoding the neuralized input image in the operative image format of the codec 1822 at 1830 to obtain encoded image data, decoding the encoded image data at 1840 to obtain a reconstructed neuralized image in the operative image format of the codec 1842, deneuralizing the reconstructed neuralized image in the operative image format of the codec 1842 at 1850 to obtain a deneuralized reconstructed image in an output image format 1852, and output at 1860. Although described with respect to an image, neural peri-codec optimization with image coding 1800 may be used for groups or sequences of images, such as for a video. Neural peri-codec optimization with image coding 1800 includes neural peri-codec optimization used with image coding. The image coding is represented in FIG. 18 by encoding at 1830 and decoding at 1840 in FIG. 18, and is implemented by a codec as described herein, including an encoder, such as the encoder 400 shown in FIG. 4, and a decoder, such as the decoder 500 shown in FIG. 5, operating in coordination.

The source image in the source image format 1802 has a defined color space, such as Y'CbCr 4:4:4. The source image in the source image format 1802 has a defined source image bit-depth, such as 8-bit. The source image in the source image format 1802 has a defined source image spatial size, such as resolution, aspect ratio, or both, which may be 65,535×65,535 pixels.

The source image in the source image format 1802 depicts legible black text over a predominantly tan background. Although the source image in the source image format 1802 is an Y'CbCr 4:4:4 image that includes color, a grayscale representation of the source image in the source image format 1802 is shown in FIG. 18. For example, the pixels of the source image in the source image format 1802 are predominately shades of tan such that the average color value of the source image in the source image format 1802 is RGB (136, 126, 119).

In the example shown in FIG. 18, the operative image format of the codec is the source image format. Although the neuralized input image in the operative image format of the codec 1822 is an Y'CbCr 4:4:4 image that includes color, a grayscale representation of the neuralized input image in the operative image format of the codec 1822 is shown in FIG. 18.

The neuralized input image in the operative image format of the codec 1822 differs substantially from the source image in the source image format 1802. The color values of the neuralized input image in the operative image format of the codec 1822 differ substantially from the color values of the source image in the source image format 1802. For example, the pixels of the neuralized input image in the operative image format of the codec 1822 are predominately shades of purple and green such that the average color value of the source image in the source image format 1802 is RGB (126, 127, 133).

The reconstructed neuralized image in the operative image format of the codec 1842 is substantially similar to the neuralized input image in the operative image format of the codec 1822, except for artifacts, loss of data, or distortion introduced by the encoding at 1830, the decoding at 1840, or the combination thereof. Although the reconstructed neuralized image in the operative image format of the codec 1842 is an Y'CbCr 4:4:4 image that includes color, a grayscale representation of the reconstructed neuralized image in the operative image format of the codec 1842 is shown in FIG. 18. The deneuralized reconstructed image in the output image format 1852 differs substantially from the reconstructed neuralized image in the operative image format of the codec 1842.

The deneuralized reconstructed image in the output image format 1852 is substantially similar to the source image in the source image format 1802, except for artifacts, loss of data, or distortion introduced by the neuralization at 1820, the encoding at 1830, the decoding at 1840, the deneuralization at 1850, or the combination thereof. The color values of the deneuralized reconstructed image in the output image format 1852 differ substantially from the color values of the neuralized input image in the operative image format of the codec 1822. The color values of the deneuralized reconstructed image in the output image format 1852 are substantially similar to the color values of the source image in the source image format 1802. For example, the average color value of the deneuralized reconstructed image in the output image format 1852 is the shade of tan, such as RGB (136, 126, 119). Although the deneuralized reconstructed image in the output image format 1852 is an Y'CbCr 4:4:4 image that includes color, a grayscale representation of the reconstructed deneuralized reconstructed image in the output image format 1852 is shown in FIG. 18.

Neural peri-codec optimization with image coding 1800 omits text specific processing. The neuralization at 1820 and the deneuralization at 18350 are implemented using a neuralization neural network and a corresponding deneuralization neural network trained using a training data set that omits images including text.

The text depicted in the source image in the source image format 1802 is legible. The neuralized input image in the operative image format of the codec 1822 and the reconstructed neuralized image in the operative image format of the codec 1842 are unrecognizable as including legible text. The deneuralized reconstructed image in the output image format 1852 includes legible text corresponding to the legible text in the source image in the source image format 1802.

As used herein, the terms "optimal", "optimized", "optimization", or other forms thereof, are relative to a respective context and are not indicative of absolute theoretic optimization unless expressly specified herein.

As used herein, the term "set" indicates a distinguishable collection or grouping of zero or more distinct elements or members that may be represented as a one-dimensional array or vector, except as expressly described herein or otherwise clear from context.

The words "example" or "exemplary" are used herein to mean serving as an example, instance, or illustration. Any aspect or design described herein as "example" or "exemplary" not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. As used herein, the terms "determine" and "identify", or any variations thereof, includes selecting, ascertaining, computing, looking up, receiving, determining, establishing, obtaining, or otherwise identifying or determining in any manner whatsoever using one or more of the devices shown in FIG. 1.

Further, for simplicity of explanation, although the figures and descriptions herein may include sequences or series of steps or stages, elements of the methods disclosed herein can occur in various orders and/or concurrently. Additionally, elements of the methods disclosed herein may occur with other elements not explicitly presented and described herein. Furthermore, one or more elements of the methods described herein may be omitted from implementations of methods in accordance with the disclosed subject matter.

The implementations of the transmitting computing and communication device 100A and/or the receiving computing and communication device 100B (and the algorithms, methods, instructions, etc. stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting computing and communication device 100A and the receiving computing and communication device 100B do not necessarily have to be implemented in the same manner.

Further, in one implementation, for example, the transmitting computing and communication device 100A or the receiving computing and communication device 100B can be implemented using a computer program that, when executed, carries out any of the respective methods, algorithms and/or instructions described herein. In addition, or alternatively, for example, a special purpose computer/processor can be utilized which can contain specialized hardware for carrying out any of the methods, algorithms, or instructions described herein.

The transmitting computing and communication device 100A and receiving computing and communication device 100B can, for example, be implemented on computers in a real-time video system. Alternatively, the transmitting computing and communication device 100A can be implemented on a server and the receiving computing and communication device 100B can be implemented on a device separate from the server, such as a hand-held communications device. In this instance, the transmitting computing and communication device 100A can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting computing and communication device 100A. Other suitable transmitting computing and communication device 100A and receiving computing and communication device 100B implementation schemes are available. For example, the receiving computing and communication device 100B can be a generally stationary personal computer rather than a portable communications device and/or a device including an encoder 400 may also include a decoder 500.

Further, all or a portion of implementations can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

It will be appreciated that aspects can be implemented in any convenient form. For example, aspects may be implemented by appropriate computer programs which may be carried on appropriate carrier media which may be tangible carrier media (e.g. disks) or intangible carrier media (e.g. communications signals). Aspects may also be implemented using suitable apparatus which may take the form of programmable computers running computer programs arranged to implement the methods and/or techniques disclosed herein. Aspects can be combined such that features described in the context of one aspect may be implemented in another aspect.

The above-described implementations have been described to allow easy understanding of the application are not limiting. On the contrary, the application covers various modifications and equivalent arrangements included within the scope of the appended claims, which scope is to be accorded the broadest interpretation to encompass all such modifications and equivalent structures as is permitted under the law.

What is claimed is:

1. An apparatus, comprising:
   a processor configured to:
   obtain a reconstructed image output by decoding, by a decoder, encoded image data from an encoded bitstream, wherein the reconstructed image includes reconstructed pixel values expressed in a first defined image sample space;
   identify the reconstructed image as a reconstructed neuralized image wherein the reconstructed pixel values are reconstructed neural latent space values;
   obtain, by a nonlinear post-codec image processor in response to the reconstructed neuralized image, a deneuralized reconstructed image including reconstructed pixel values in a second defined image sample space; and
   output the deneuralized reconstructed image as the reconstructed image.

2. The apparatus of claim 1, wherein to obtain the reconstructed image includes to obtain the reconstructed image such that:

the encoded image data is image data generated, prior to obtaining the reconstructed image, by an encoder by encoding an input image in an operative image format of the encoder corresponding to an operative image format of the decoder;

the input image is a neuralized image identified as the input image such that neural latent space values from the neuralized image are used as pixel values in the second defined image sample space;

the neuralized image is image data generated by a neuralizer representing a source image; and the source image includes pixel values expressed in the first defined image sample space.

3. The apparatus of claim 2, wherein to obtain the reconstructed image includes to obtain the reconstructed image such that:

the source image is an image captured by an electromagnetic sensor, a computer graphics image, or a normal map image.

4. The apparatus of claim 2, wherein to obtain the reconstructed image includes to obtain the reconstructed image such that:

the source image has a resolution that is greater than a maximum available resolution for the operative image format of the encoder, the input image has the maximum available resolution for the operative image format of the encoder, the reconstructed image has the maximum available resolution for the operative image format of the decoder, and the deneuralized reconstructed image has the resolution of the source image;

the source image has a bit-depth that is greater than a maximum available bit-depth for the operative image format of the encoder, the input image has the maximum available bit-depth for the operative image format of the encoder, the reconstructed image has the maximum available bit-depth for the operative image format of the encoder, and the deneuralized reconstructed image has the bit-depth of the source image; or the source image has a first cardinality of channels, the operative image format of the decoder has a second cardinality of channels, the input image has the second cardinality of channels, the reconstructed image has the second cardinality of channels, and the deneuralized reconstructed image has the first cardinality of channels, wherein the first cardinality is greater than the second cardinality.

5. The apparatus of claim 4, wherein to obtain the reconstructed image includes to obtain the reconstructed image such that:

the first cardinality of channels is greater than one, such that the source image is multichromatic and the deneuralized reconstructed image is multichromatic; and the second cardinality of channels is one such that the operative image format of the encoder is monochromatic, the input image is monochromatic, and the reconstructed image is monochromatic.

6. The apparatus of claim 2, wherein:

to decode the encoded image data includes to decode a deneuralization parameter from the encoded bitstream; and the processor is configured to:

obtain the nonlinear post-codec image processor in response to the deneuralization parameter, such that the nonlinear post-codec image processor implements a trained neural network model trained in conjunction with a trained neural network model, implemented by a nonlinear pre-codec image processor, trained to generate the neuralized image in response to the source image in a target defined image format that is compatible with the operative image format of the decoder.

7. The apparatus of claim 2, wherein to obtain the reconstructed image includes to obtain the reconstructed image such that:

the encoder is compliant with a defined image coding standard; and the decoder is compliant with the defined image coding standard.

8. A method of nonlinear peri-codec optimization for image coding, the method comprising:

obtaining a source image, wherein the source image includes pixel values expressed in a first defined image sample space;

generating, by a neuralizer, a neuralized image representing the source image, wherein the neuralized image includes pixel values that are expressed as neural latent space values;

identifying the neuralized image as an input image for image coding such that the neural latent space values are used as pixel values in a second defined image sample space;

generating, by an encoder, encoded image data by encoding the input image, wherein the input image is in an operative image format of the encoder;

generating an output bitstream including the encoded image data; and outputting the output bitstream.

9. The method of claim 8, wherein outputting the output bitstream includes outputting the output bitstream such that:

subsequent to outputting the output bitstream, a decoder decodes the encoded image data to obtain a reconstructed image, wherein the reconstructed image includes reconstructed pixel values corresponding to the pixel values in the second defined image sample space;

the reconstructed image is identified as a reconstructed neuralized image wherein the reconstructed pixel values are reconstructed neural latent space values corresponding to the neural latent space values; and a deneuralized reconstructed image is obtained, by a nonlinear post-codec image processor in response to the reconstructed neuralized image, the deneuralized reconstructed image including reconstructed pixel values in the first defined image sample space.

10. The method of claim 9, wherein obtaining the source image includes obtaining the source image such that:

the source image is an image captured by an electromagnetic sensor, a computer graphics image, or a normal map image.

11. The method of claim 9, wherein obtaining the source image includes obtaining the source image such that:

the source image has a resolution that is greater than a maximum available resolution for the operative image format of the encoder, the input image has the maximum available resolution for the operative image format of the encoder, the reconstructed image has the maximum available resolution for the operative image format of the encoder, and the deneuralized reconstructed image has the resolution of the source image;

the source image is multichromatic, the operative image format of the encoder is monochromatic, the input image is monochromatic, the reconstructed image is monochromatic, and the deneuralized reconstructed image is multichromatic; or the source image has a bit-depth that is greater than a maximum available bit-depth for the operative image format of the encoder, the input image has the maximum available bit-depth for the operative image format of the encoder, the reconstructed image has the maximum available bit-depth for the operative image format of the encoder, and the deneuralized reconstructed image has the bit-depth of the source image.

12. The method of claim 9, wherein:

generating the neuralized image includes including, in the neuralized image, a deneuralization parameter such that encoding the input image includes including, in the encoded image data, the deneuralization parameter such that the decoder decodes the encoded image data to obtain a decoded deneuralization parameter corresponding to the deneuralization parameter such that the nonlinear post-codec image processor is obtained in response to the decoded deneuralization parameter.

13. The method of claim 9, wherein:

the neuralizer is a nonlinear pre-codec image processor that implements a trained neural network model to generate the neuralized image in response to the source image, wherein the trained neural network model is trained to output the neuralized image in a target defined image format that is compatible with the operative image format of the encoder.

14. The method of claim 9, wherein:

the encoder is compliant with a defined image coding standard; and the decoder is compliant with the defined image coding standard.

15. An apparatus for nonlinear peri-codec optimization for image coding, the apparatus comprising:

a processor configured to:

obtain a source image, wherein the source image includes pixel values expressed in a first defined image sample space;

generate, by a neuralizer, a neuralized image representing the source image, wherein the neuralized image includes pixel values that are expressed as neural latent space values;

identify the neuralized image as an input image for image coding such that the neural latent space values are used as pixel values in a second defined image sample space;

generate, by an encoder, encoded image data by encoding the input image, wherein the input image is in an operative image format of the encoder;

generate an output bitstream including the encoded image data; and output the output bitstream.

16. The apparatus of claim 15, wherein to output the output bitstream includes to output the output bitstream such that:

subsequent to output of the output bitstream, a decoder decodes the encoded image data to obtain a reconstructed image, wherein the reconstructed image includes reconstructed pixel values corresponding to the pixel values in the second defined image sample space;

the reconstructed image is identified as a reconstructed neuralized image wherein the reconstructed pixel values are reconstructed neural latent space values corresponding to the neural latent space values; and a deneuralized reconstructed image is obtained, by a nonlinear post-codec image processor in response to the reconstructed neuralized image, the deneuralized reconstructed image including reconstructed pixel values in the first defined image sample space.

17. The apparatus of claim 16, wherein to obtain the source image includes to obtain the source image such that:

the source image is an image captured by an electromagnetic sensor, a computer graphics image, or a normal map image.

18. The apparatus of claim 16, wherein to obtain the source image includes to obtain the source image such that:

the source image has a resolution that is greater than a maximum available resolution for the operative image format of the encoder, the input image has the maximum available resolution for the operative image format of the encoder, the reconstructed image has the maximum available resolution for the operative image format of the encoder, and the deneuralized reconstructed image has the resolution of the source image;

the source image is multichromatic, the operative image format of the encoder is monochromatic, the input image is monochromatic, the reconstructed image is monochromatic, and the deneuralized reconstructed image is multichromatic; or the source image has a bit-depth that is greater than a maximum available bit-depth for the operative image format of the encoder, the input image has the maximum available bit-depth for the operative image format of the encoder, the reconstructed image has the maximum available bit-depth for the operative image format of the encoder, and the deneuralized reconstructed image has the bit-depth of the source image.

19. The apparatus of claim 16, wherein:

to generate the neuralized image includes to include, in the neuralized image, a deneuralization parameter such that encoding the input image includes including, in the encoded image data, the deneuralization parameter such that the decoder decodes the encoded image data to obtain a decoded deneuralization parameter corresponding to the deneuralization parameter such that the nonlinear post-codec image processor is obtained in response to the decoded deneuralization parameter.

20. The apparatus of claim 16, wherein:

the neuralizer is a nonlinear pre-codec image processor that implements a trained neural network model to generate the neuralized image in response to the source image, wherein the trained neural network model is trained to output the neuralized image in a target defined image format that is compatible with the operative image format of the encoder.

* * * * *